(12) United States Patent
He

(10) Patent No.: US 11,641,981 B2
(45) Date of Patent: May 9, 2023

(54) STIRRING MOTION MECHANISM FOR COOKING APPARATUS

(71) Applicant: Zhengxu He, Reno, NV (US)

(72) Inventor: Zhengxu He, Reno, NV (US)

( * ) Notice: Subject to any disclaimer, the term of this patent is extended or adjusted under 35 U.S.C. 154(b) by 286 days.

(21) Appl. No.: 16/997,196

(22) Filed: Aug. 19, 2020

(65) Prior Publication Data

US 2020/0375406 A1    Dec. 3, 2020

Related U.S. Application Data

(63) Continuation-in-part of application No. 15/839,600, filed on Dec. 12, 2017, now Pat. No. 10,799,064, and a continuation-in-part of application No. 15/706,136, filed on Sep. 15, 2017, now Pat. No. 10,980,372, which is a continuation of application No. 13/607,712, filed on Sep. 8, 2012, now abandoned.

(60) Provisional application No. 62/480,334, filed on Mar. 31, 2017.

(51) Int. Cl.
*A47J 44/02*    (2006.01)

(52) U.S. Cl.
CPC .................................. *A47J 44/02* (2013.01)

(58) Field of Classification Search
CPC ............. A47J 44/02; A47J 37/12; A47J 37/04
See application file for complete search history.

(56) References Cited

U.S. PATENT DOCUMENTS

| | | | | |
|---|---|---|---|---|
| 7,485,830 B2* | 2/2009 | Wang | ........................ | F24C 1/00 |
| | | | | 219/385 |
| 8,066,427 B2* | 11/2011 | Wong | ...................... | B01F 27/70 |
| | | | | 366/279 |
| 8,707,862 B1* | 4/2014 | Oliver | ................... | A47J 36/165 |
| | | | | 99/348 |
| 2014/0069282 A1* | 3/2014 | He | .......................... | A47J 44/02 |
| | | | | 99/348 |

* cited by examiner

*Primary Examiner* — Brian W Jennison

(57)    ABSTRACT

The present application discloses an automated cooking apparatus that includes a cooking container to contain or otherwise hold food or food ingredients and a stirring motion mechanism to move the cooking container by fast speed yet points on the internal surface of the container are displaced by properly small distance. The stirring motion mechanism may comprise one or more kinematic mechanisms or pairs, each comprising a first mating part and a second mating part whose movement is constrained relative the first mating part, wherein the first mating part is connected to the cooking container.

20 Claims, 46 Drawing Sheets

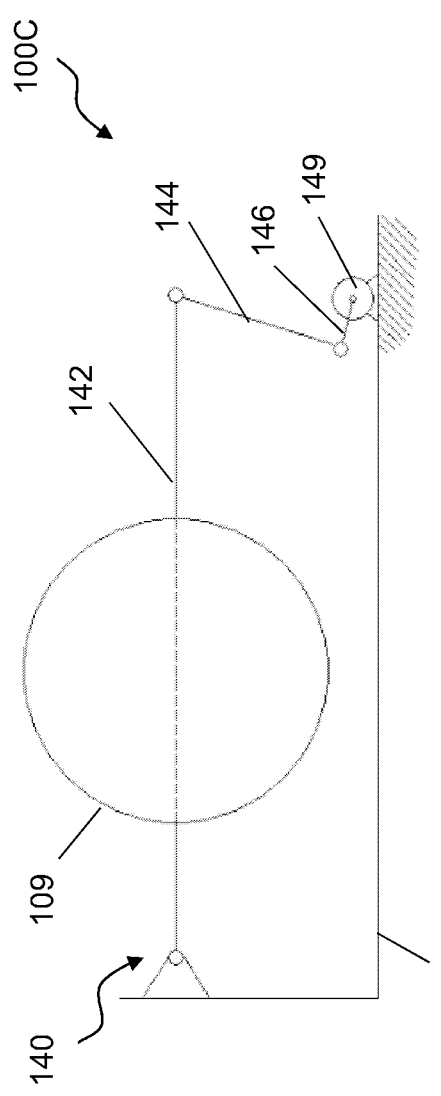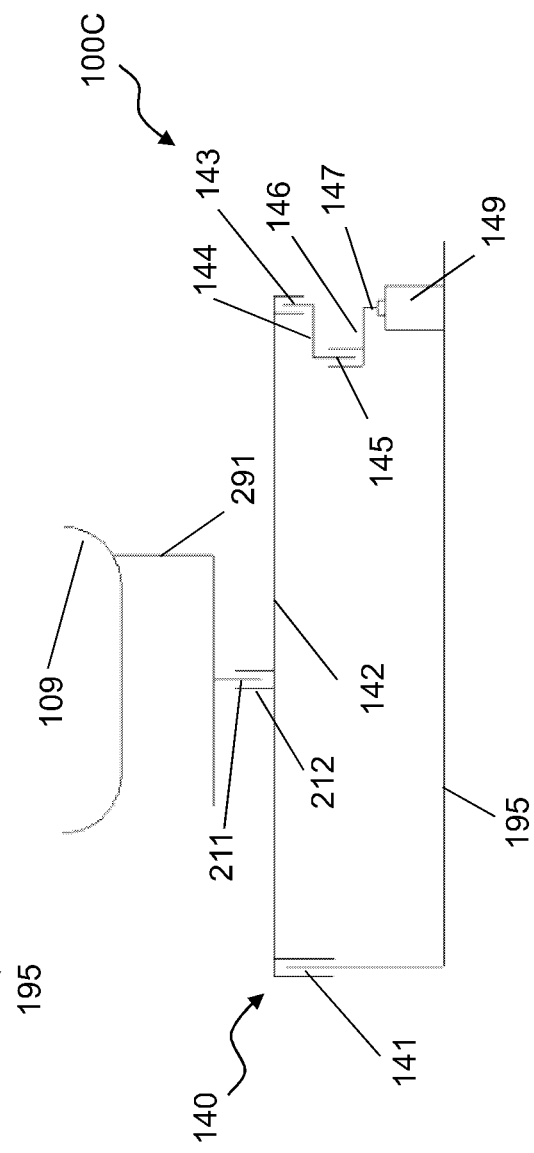

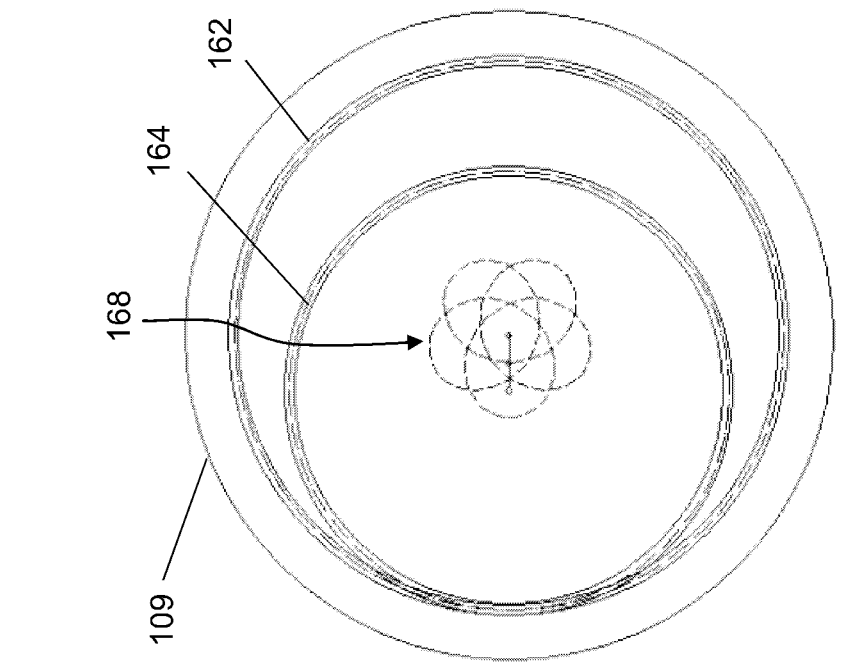
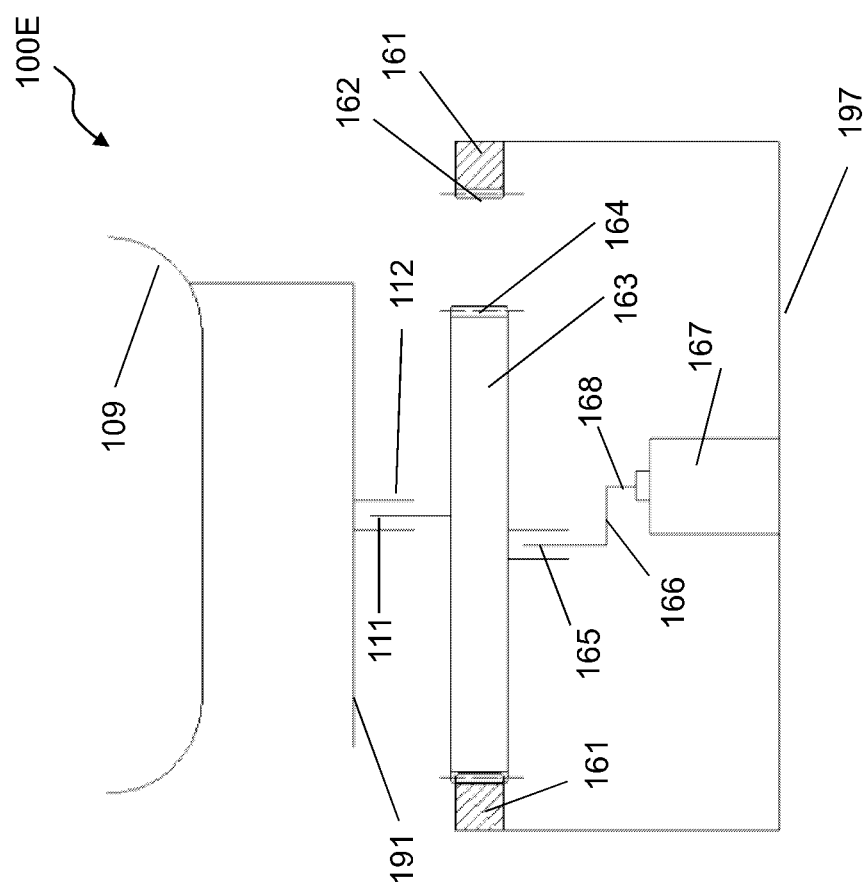
Figure 5B
Figure 5A

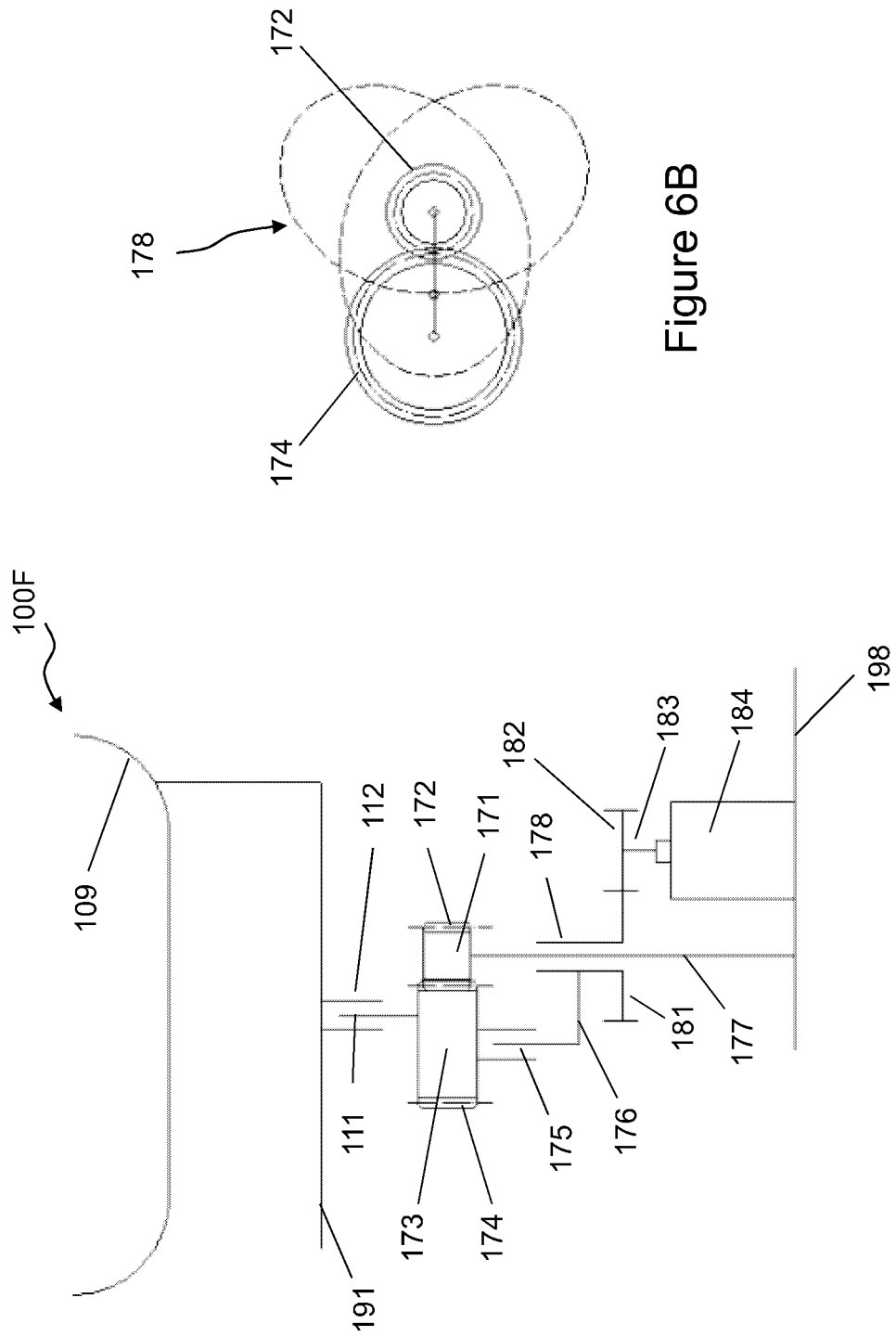

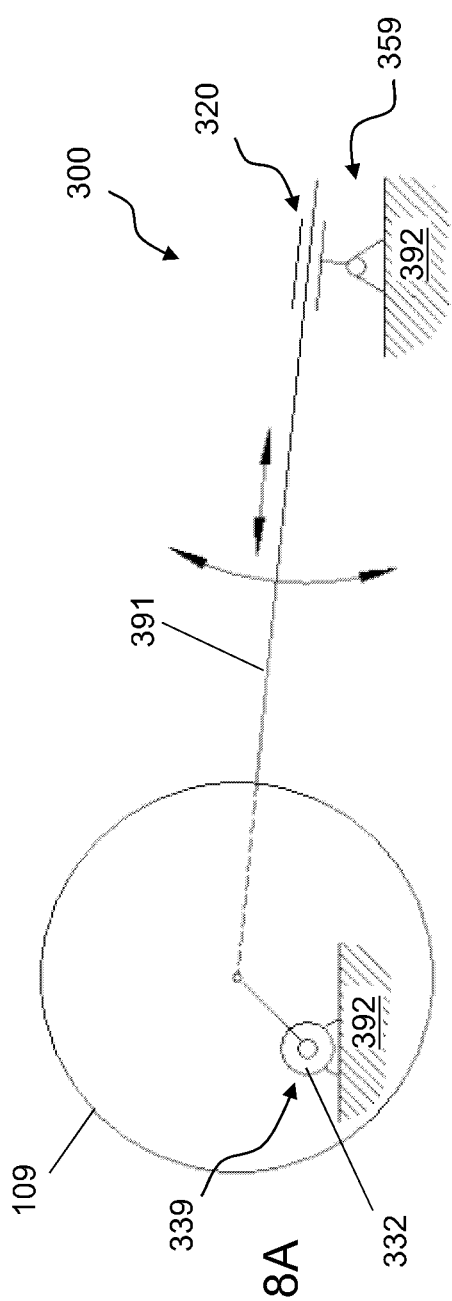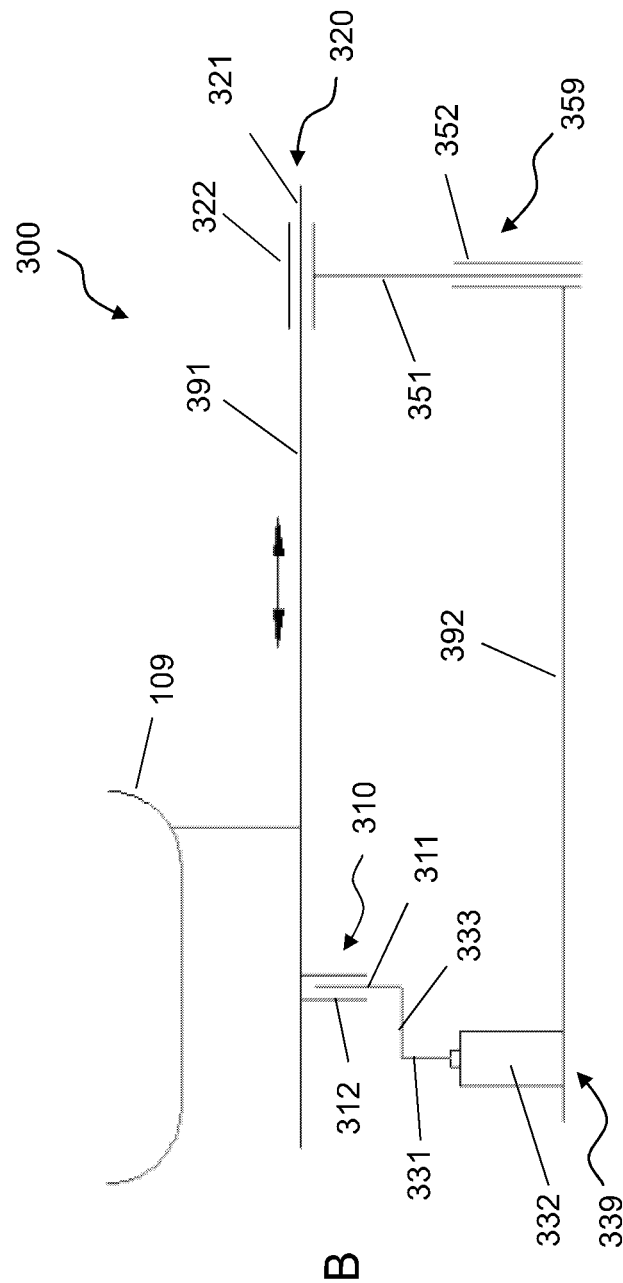

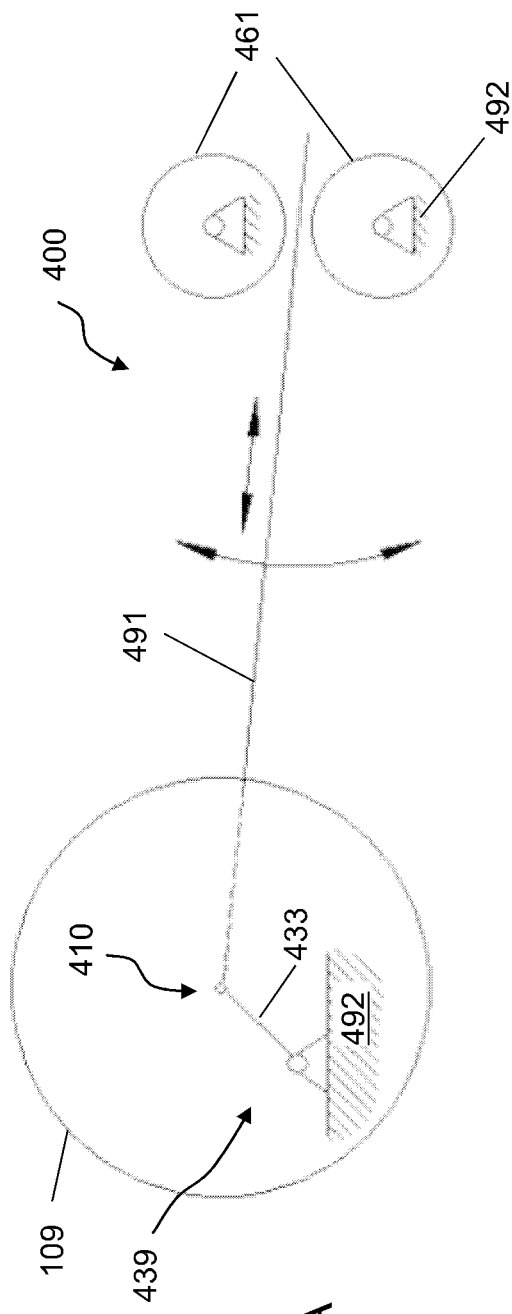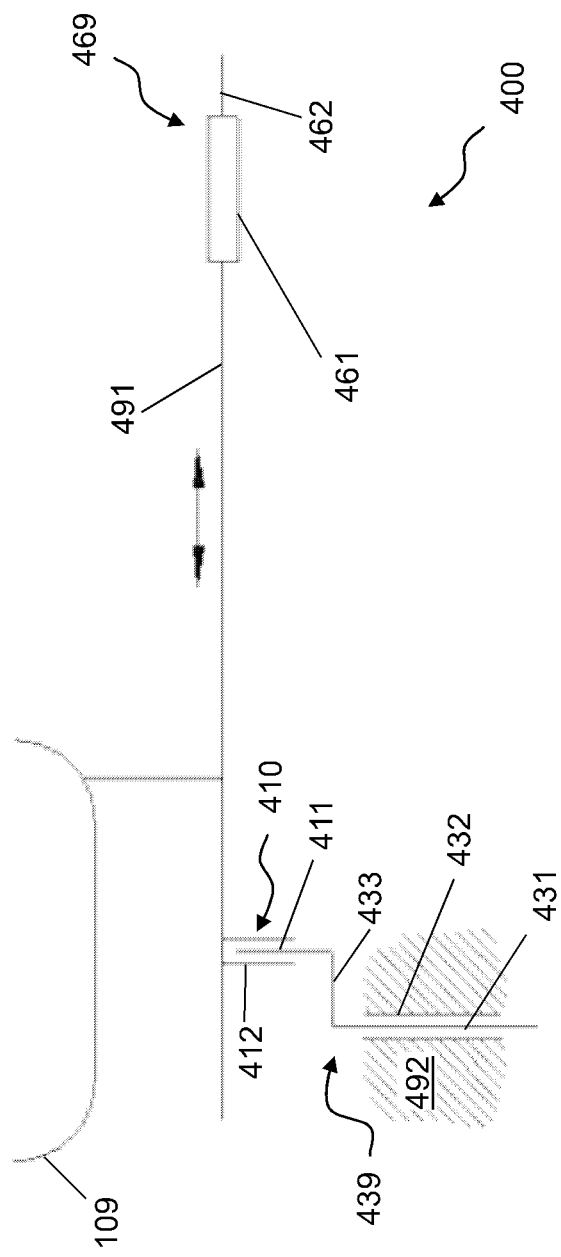
Figure 9A
Figure 9B

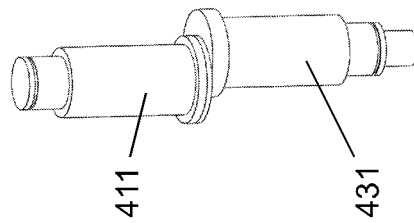
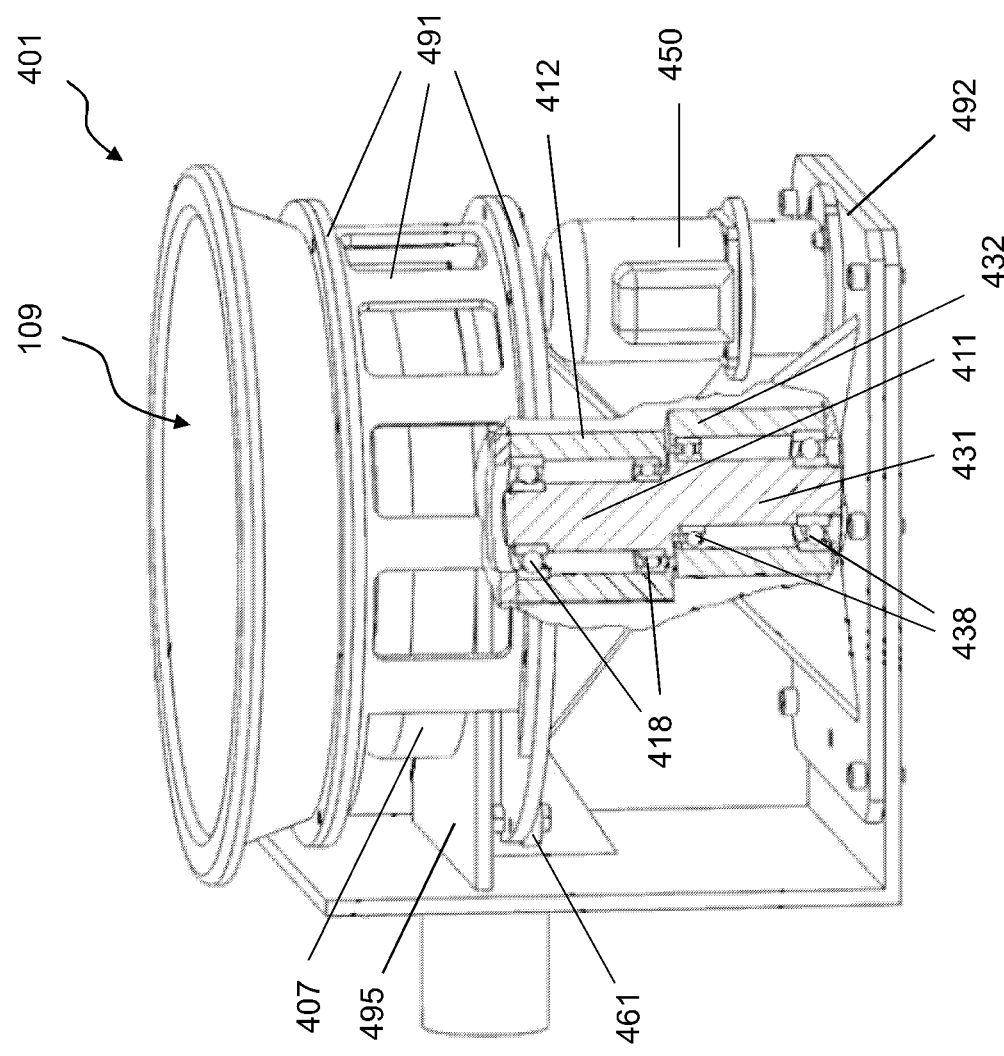

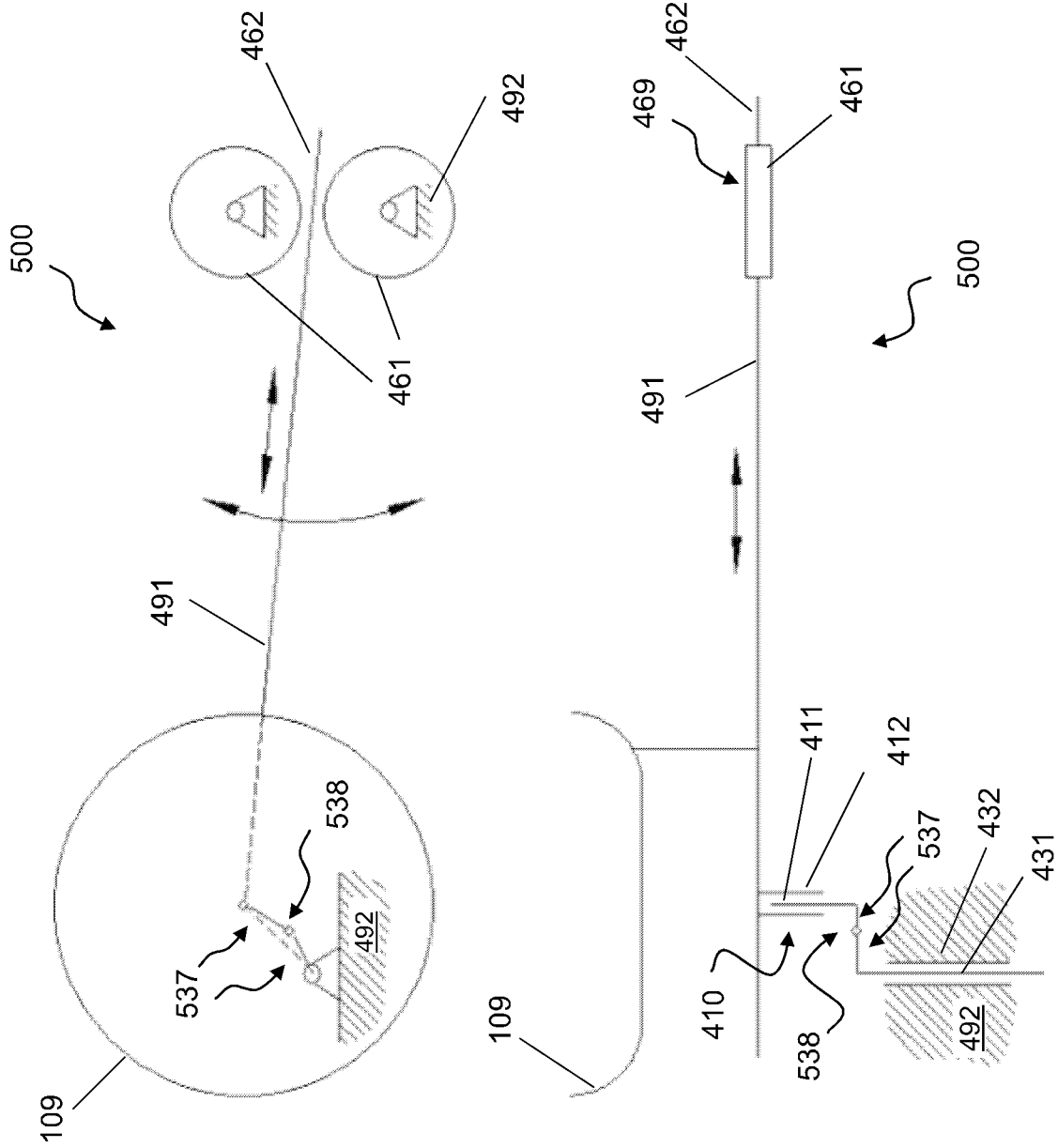

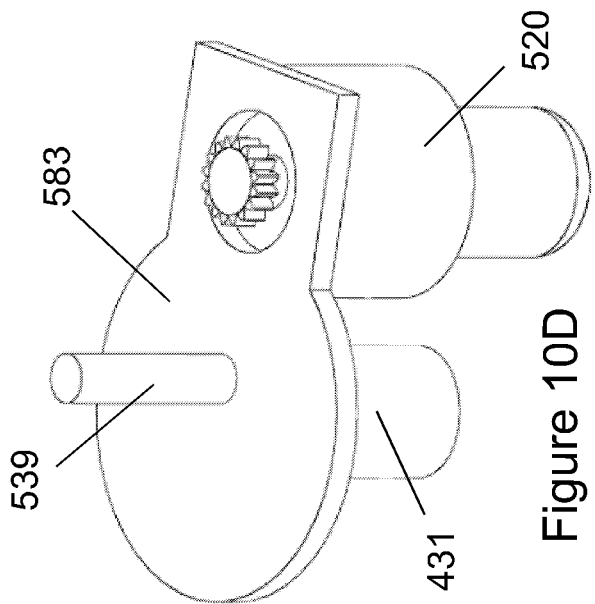
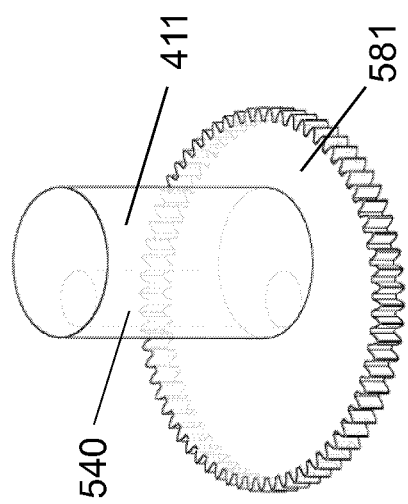
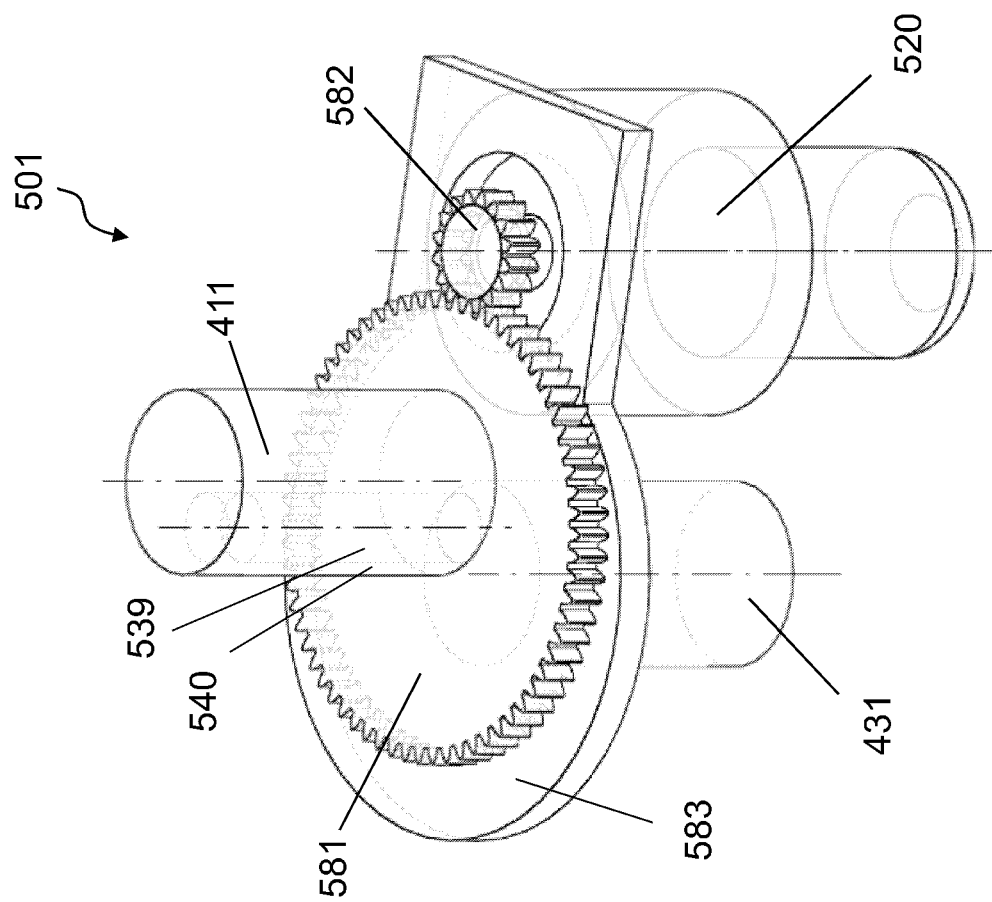
Figure 10D
Figure 10E
Figure 10C

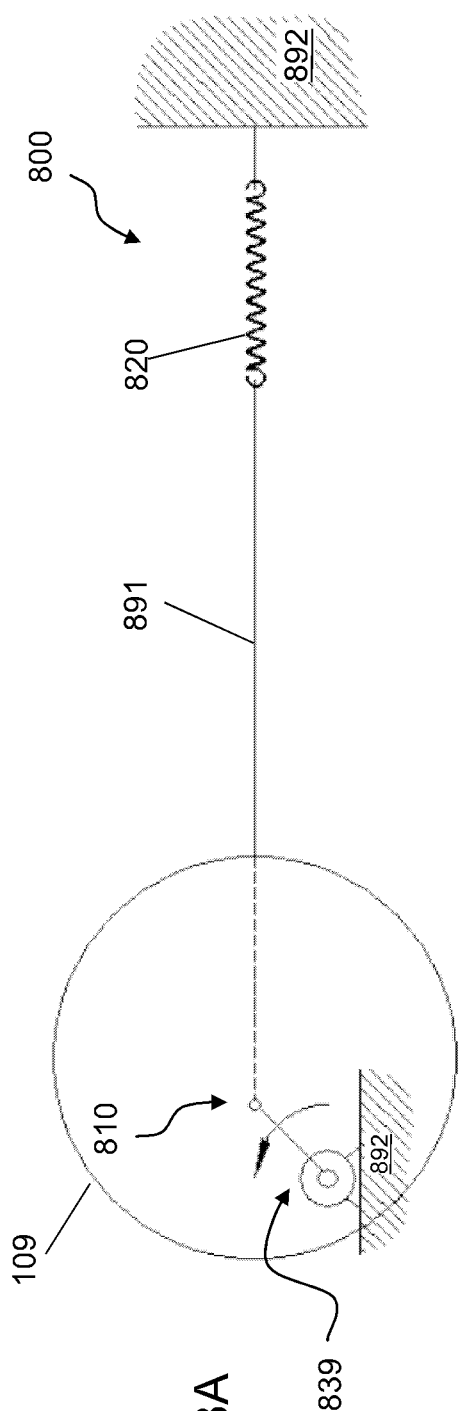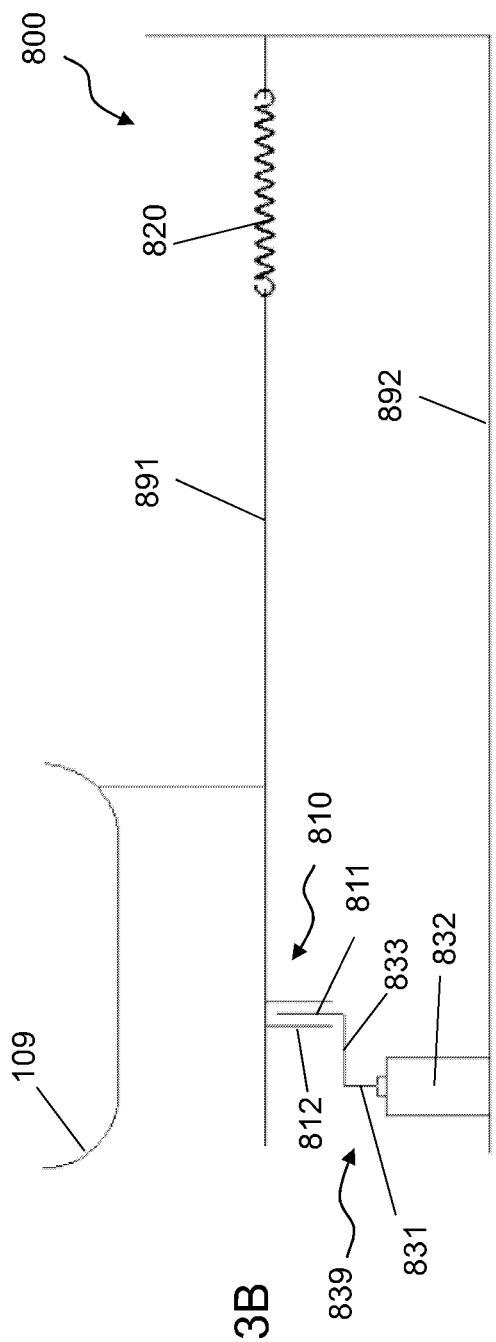

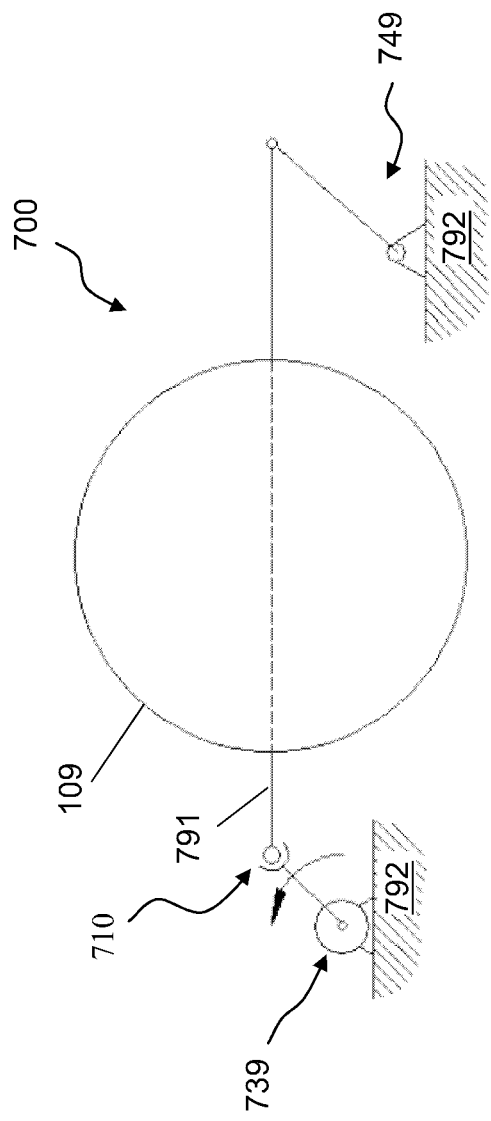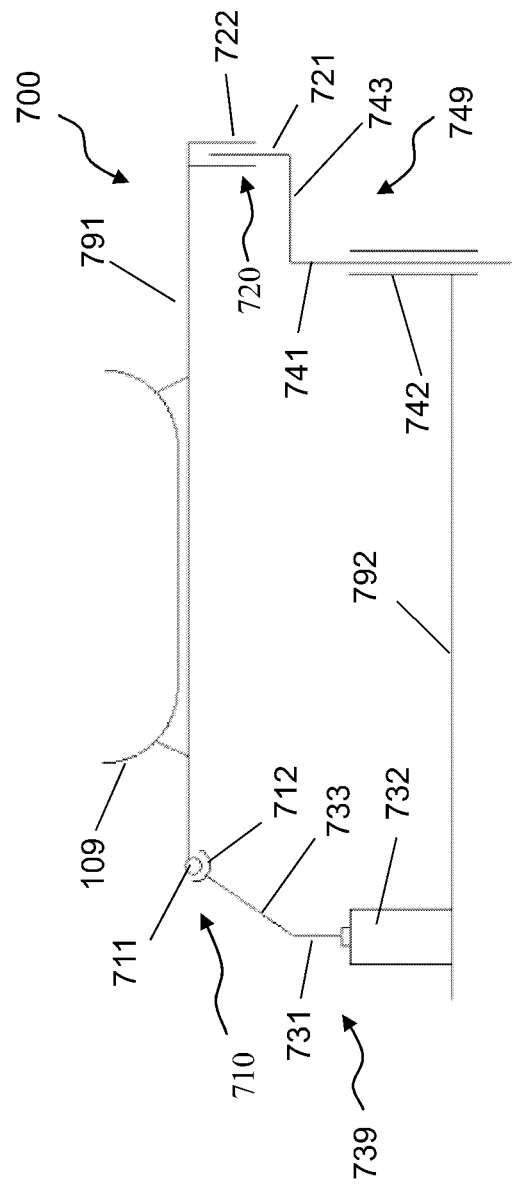
Figure 17A
Figure 17B

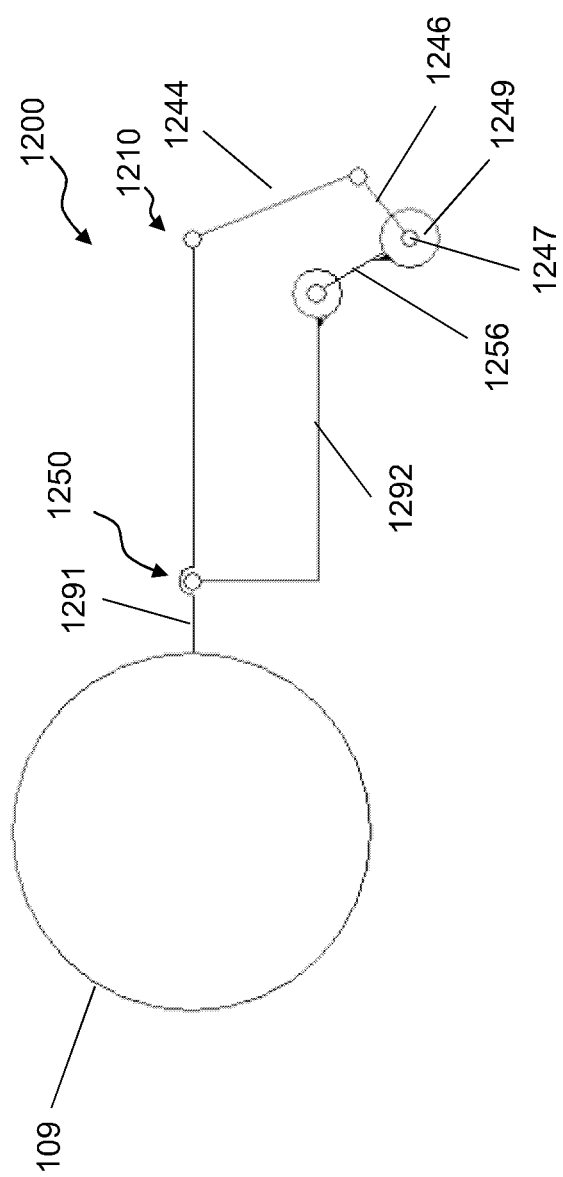
Figure 23A
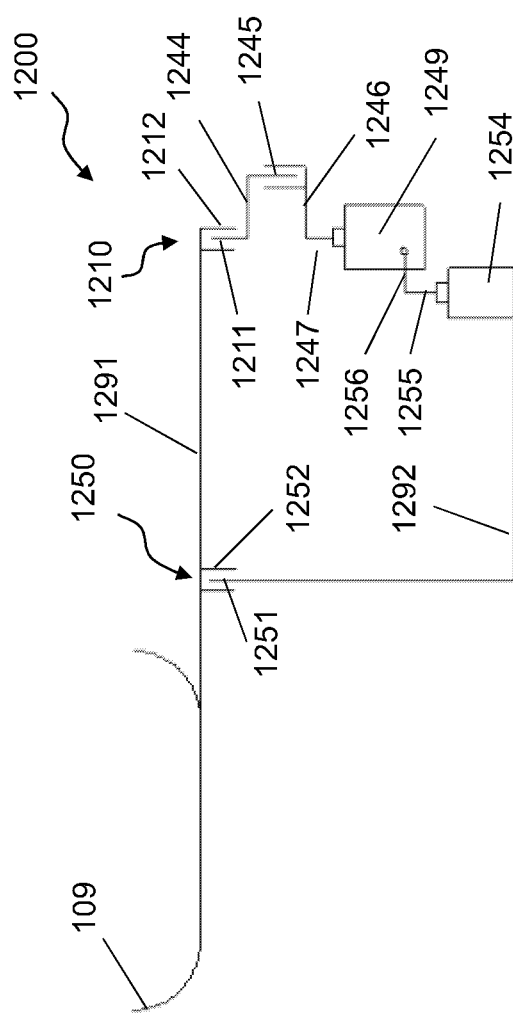
Figure 23B

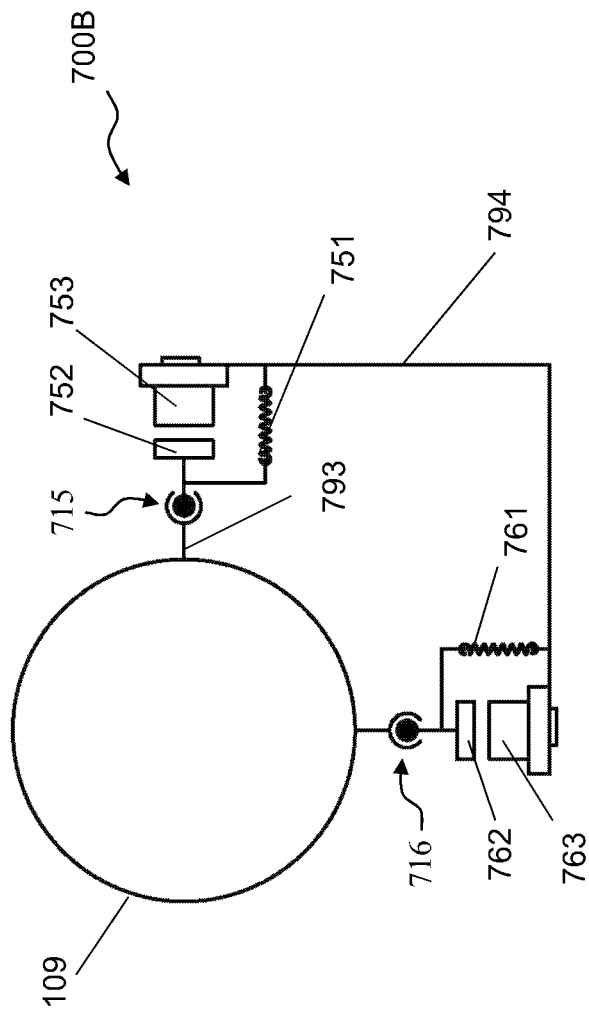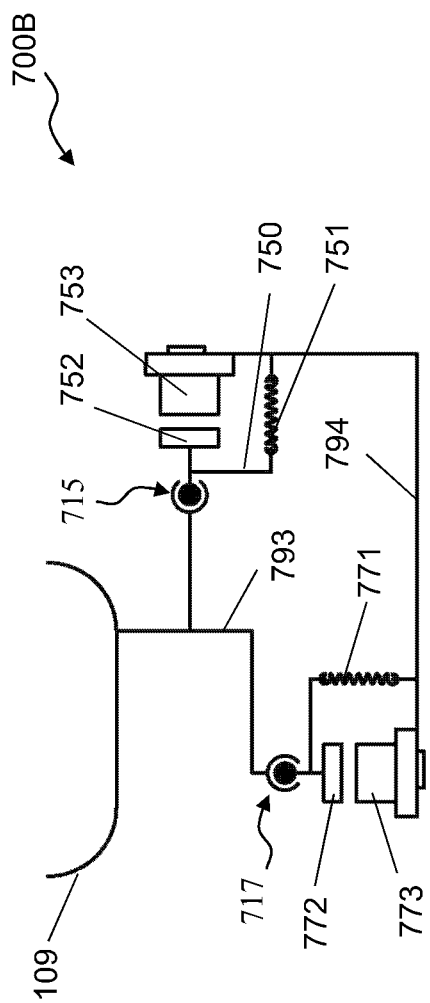
Figure 33A
Figure 33B

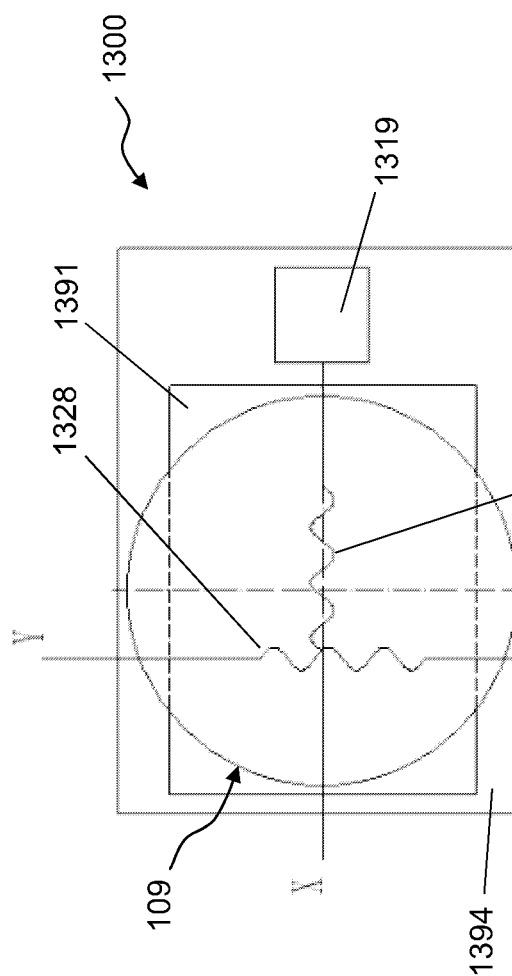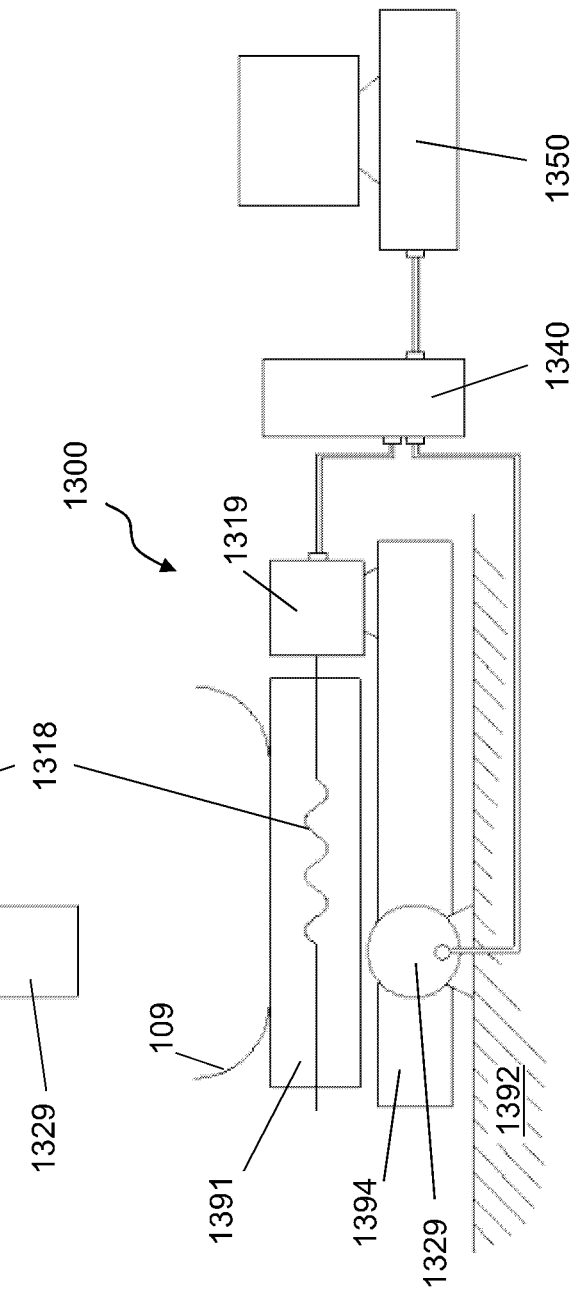
Figure 36A
Figure 36B

STIRRING MOTION MECHANISM FOR COOKING APPARATUS

This application is a continuation-in-part of U.S. application Ser. No. 15/706,136 filed Sep. 15, 2017, which was a continuation of the U.S. application Ser. No. 13/607,712 filed Sep. 8, 2012. This application is a continuation-in-part of the U.S. patent application Ser. No. 15/839,600 filed Dec. 12, 2017, which claims the benefit of U.S. Provisional Application Ser. No. 62/480,334 filed Mar. 31, 2017. Entire contents of these applications are hereby incorporated herein by reference.

CROSS-REFERENCE TO RELATED APPLICATIONS

US Patent Applications:
Ser. No. 13/607,712, Filed: Sep. 8, 2012, Inventor: Zhengxu He
Ser. No. 13/892,254, Filed May 11, 2013, Inventor: Zhengxu He
Ser. No. 15/706,136, Filed Sep. 15, 2017, Inventor: Zhengxu He
Ser. No. 15/839,600; Filed Dec. 12, 2017; Inventor: Zhengxu He
US Provisional Patent Application:
Serial No. 62/480,334; Filed Mar. 31, 2017, Inventor: Zhengxu He

BACKGROUND OF THE INVENTION

The present application relates to automated kitchen equipment, and specifically to automated method and equipment for stirring, mixing, and distributing food ingredients during cooking.

Considerable amount of research and experiments have been conducted on the automation of stirring and mixing of food ingredients during cooking. The existing solutions comprise the following approaches: the first approach utilizes spatula or pedals of different shapes to stir, mix and turn food ingredients; the second approach simulates human's stirring actions during cooking; and the third approach uses cooking container or cookware in the shapes of rolling cylinders to turn and mix food ingredients.

A drawback of existing mixing and stirring systems is that they tend to move food ingredients to a particular side of the cooking container, which produces scattered and unbalanced distribution in the food ingredients. In some cases, food ingredients may be pushed out of the cooking container. The spatula in some conventional cooking systems rotates around an axis vertical a round cooking container. The spatula can push food ingredients into an unbalanced distribution, with some areas having thicker food ingredients accumulation than other areas.

Some existing approach teaches producing some movements in a cooking container as to mix the food ingredients held in the cooking container. The motion of the cooking container usually has a large magnitude in a practical realization of these methods.

There is therefore a need for effective and efficient automated apparatus that provide stirring and mixing food ingredients during cooking and can provide making and maintaining a balanced distribution of food ingredients in the cooking container.

SUMMARY OF THE INVENTION

The present application discloses a cooking apparatus capable of automated stirring and mixing of food ingredients, which overcomes the drawbacks in the conventional cooking devices. The disclosed automated cooking apparatus is more effective in stirring and mixing food or food ingredients and is energy efficient. The stirring mechanisms in the disclosed automated cooking apparatus are simpler and more reliable. The disclosed automated cooking apparatus can achieve more effective and uniform stirring and mixing during cooking without breaking food ingredients. In addition, the present disclosed apparatus has the advantage of producing and maintaining a balanced distribution in the food ingredients contained or held in the cooking container.

In one general aspect, the present invention relates to an automated cooking apparatus that comprises a cooking container configured to contain or otherwise hold food or food ingredients for cooking and a stirring motion mechanism configured to move the cooking container as to stir, mix or distribute the food or food ingredients held in the cooking container. The stirring motion mechanism may comprise: (1) a first kinematic mechanism comprising a first mating part and a second mating part and a mechanism configured to constrain the relative movement of the mating parts; wherein the first mating part is connected to the cooking container; (2) a motion (sub-)mechanism configured to move the second mating part of the first kinematic mechanism relative to a support component; and (3) a connection mechanism configured to constrain or restrict the movement of the cooking container; wherein the connection mechanism is configured to constrain or restrict the movement of the cooking container relative to the support component; wherein the first kinematic mechanism, the motion mechanism and the connection mechanism in combination are configured to produce a motion of the cooking container as to stir, mix and/or distribute the food or food ingredients held in the cooking container.

Implementations of the system may comprise one or more of the following. A first kinematic mechanism may comprise a rotational mechanism where the motion of the mating parts are configured to be a rotation, either around a point or around an axis. A first kinematic mechanism may comprise a sliding pair. A first kinematic mechanism may comprise a universal joint. The first mating parts of a first kinematic mechanisms may be rigidly connected to the cooking container. The first mating parts of a first kinematic mechanisms may be connected to the cooking container via elastic or non-rigid connectors. The motion mechanism can move the second mating part of a first kinematic mechanism in a rotational movement. The motion mechanism can move the second mating part of a first kinematic mechanism in a vibratory or oscillatory movement. The automated cooking apparatus may further comprise an adjustment mechanism configured to adjust the frequency and magnitudes of the motion of the cooking container. The motion mechanism may be configured to move the second mating part of a first kinematic mechanism in a linear, planar, or spherical movement. The motion mechanism may be configured to move the second mating part of the first kinematic mechanism by a translation along a cyclic curve.

Implementations of the system may comprise one or more of the following. A connection mechanism may comprise: a second kinematic mechanism comprising a third mating part, a second mating part and a mechanism configured to constrain the relative motion of the mating parts, wherein the third mating part is configured to be fixedly or elastically connected to a cooking container; and a corresponding motion mechanism configured to move the second mating part of the second kinematic mechanism. A connection mechanism may alternatively comprise: a second kinematic mechanism comprising a third mating part and a second mating part (and a mechanism configured to constrain the relative motion of the mating parts) wherein the third mating part is configured to be fixedly or elastically connected; and a mechanism configured to link the motion of the second mating part of a first kinematic mechanism with that of the second mating part of the second kinematic mechanism.

Implementations of the system may comprise one or more of the following. A connection mechanism may be configured to constrain the movements of one or more parts of the cooking container, or one or more objects connected to the cooking container. The automated cooking apparatus may further comprise an adjustment mechanism that are configured to dynamically adjust the directions, speeds, and frequencies of a rotational, cyclic, vibratory or oscillatory movements produced by the motion mechanism on the second mating part of a first kinematic mechanism. A computer may control the motion mechanism, a connection mechanism, and/or an adjustment mechanism.

In some applications, a connection mechanism is configured to constrain or restrict the movement of the cooking container even if a first kinematic mechanism is removed from the apparatus.

Implementations of the system may require one or more of the following. The second mating part of a first kinematic is configured to not be fixedly connected to any component of the connection mechanism. Each of the components of a connection mechanism is configured to not constantly touch the second mating part of a first kinematic mechanism. Each of the components of a connection mechanism is configured to not constantly touch any component in the automated cooking apparatus which is fixedly connected to the second mating part of a first kinematic mechanism. Any component of the cooking apparatus, except possibly the first mating part of the first kinematic mechanism, which is fixedly connected to a rigid component of a connection mechanism, is configured to not constantly touch the second mating part of a first kinematic mechanism. Any component of the cooking apparatus, except possibly the first mating part of the first kinematic mechanism, which is fixedly connected to a rigid component of a connection mechanism, is configured to not constantly touch any component in the automated cooking apparatus which is fixedly connected to the second mating part of a first kinematic mechanism.

In another general aspect, the present invention relates to automated cooking apparatus that comprises a driver or controller configured to control the motion mechanism as to produce a sum of cyclic or oscillatory forces on the cooking container, wherein the forces by the motion mechanism are configured to move the cooking container or the object connected to the cooking container, to produce accelerations in the cooking container to stir, mix, and distribute the food ingredients contained in the cooking container.

In another general aspect, the present invention relates to automated cooking apparatus that comprises a cooking container configured to contain or otherwise hold food or food ingredients; and a motion mechanism that produces a combination of an oscillatory movement and another movement of the cooking container, as to stir, mix and distribute the food ingredients.

In another general aspect, the present invention relates to automated cooking apparatus that comprises a cooking container configured to contain or otherwise hold food or food ingredients; and a vibration mechanism configured to produce vibrations in the cooking container as to move the food ingredients in a helical pattern.

In another general aspect, the presently disclosed automated cooking apparatus comprises a cooking container that can contain or otherwise hold food or food ingredients for cooking; and a motion mechanism that can produce movements in the cooking container with a fast change of moving directions, resulting in a fast acceleration for the cooking container. This induces a relative movement between the non-accelerated food ingredients and the accelerated cooking container, and the cooking container's internal surface can obstruct the relative movement of the food ingredients by friction or other forces. The movement of the food ingredients relative to the cooking container, together with the obstruction forces by the cooking container's internal surface and other forces, can produce stirring and mixing in the food ingredients. Moreover, the movements of the food ingredients may make and maintain a consistent, balanced pattern in the distribution of food ingredients in the cooking container. The disclosed stirring mechanism is special in that the cooking container can only be displaced by a small distance from its original position in the movement. Thus, the cooking container can still be heated by a stove or other heating source when the food ingredients are stirred, mixed, and turned. Examples of the movements comprise: circular movement of relatively small radius (tens of millimeters is most applications), linear or rotational oscillations of small displacements or the composition of two oscillations of small displacements, or vibrations that are capable of producing a movement pattern.

These and other aspects, their implementations and other features are described in detail in the drawings, the description, and the claims.

BRIEF DESCRIPTION OF THE SEVERAL VIEWS OF THE DRAWING

FIGS. 3A-3B respectively show top and side views of an automated cooking apparatus that can produce rotational oscillatory movement of a cooking pan.

FIG. 5A shows a side view of another automated cooking apparatus that can produce hypocycloidal movements in a cooking pan. FIG. 5B shows an exemplified movement path for the cooking pan produced by the automated cooking apparatus in FIG. 5A.

FIG. 6A shows a side view of another automated cooking apparatus that can produce epicycloidal movements in a cooking pan. FIG. 6B shows an exemplified movement path for the cooking pan produced by the automated cooking apparatus in FIG. 6A.

FIGS. 8A-8B respectively show top and side views of another implementation of an automated cooking apparatus that can produce a different cyclic movement of a cooking pan.

FIGS. 9A-9B respectively show top and side views of another implementation of an automated cooking apparatus that can produce a different cyclic movement of a cooking pan.

FIGS. 9C-9G show detailed perspective views of the automated cooking apparatus in FIGS. 9A-9B.

FIGS. 10A-10B respectively show top and side views of another automated cooking apparatus which includes mechanisms to produce controlled cyclic movements in a cooking pan. FIG. 10C-10E are perspective views of components in the automated cooking apparatus shown in FIG. 10A-10B.

FIGS. 13A-13B respectively show top and side views of another automated cooking apparatus that can produce a different cyclic movement of a cooking pan.

FIGS. 17A-17B respectively show top and side views of another automated cooking apparatus that can produce a cyclic movement of a cooking pan.

FIGS. 23A-23B respectively show top and side views of an automated cooking apparatus that can produce rotational oscillations in a cooking pan where amplitude of the oscillations can be adjusted.

FIGS. 33A-33B respectively show top and side views of an automated cooking apparatus in where three magnetic oscillators produce a three-dimensional movement of a cooking pan.

FIGS. 36A-36B respectively show top and side views of another automated cooking apparatus that can produce a composition of two linear oscillations along X and Y axes in a cooking pan.

DETAILED DESCRIPTION OF THE INVENTION

Figure 2:
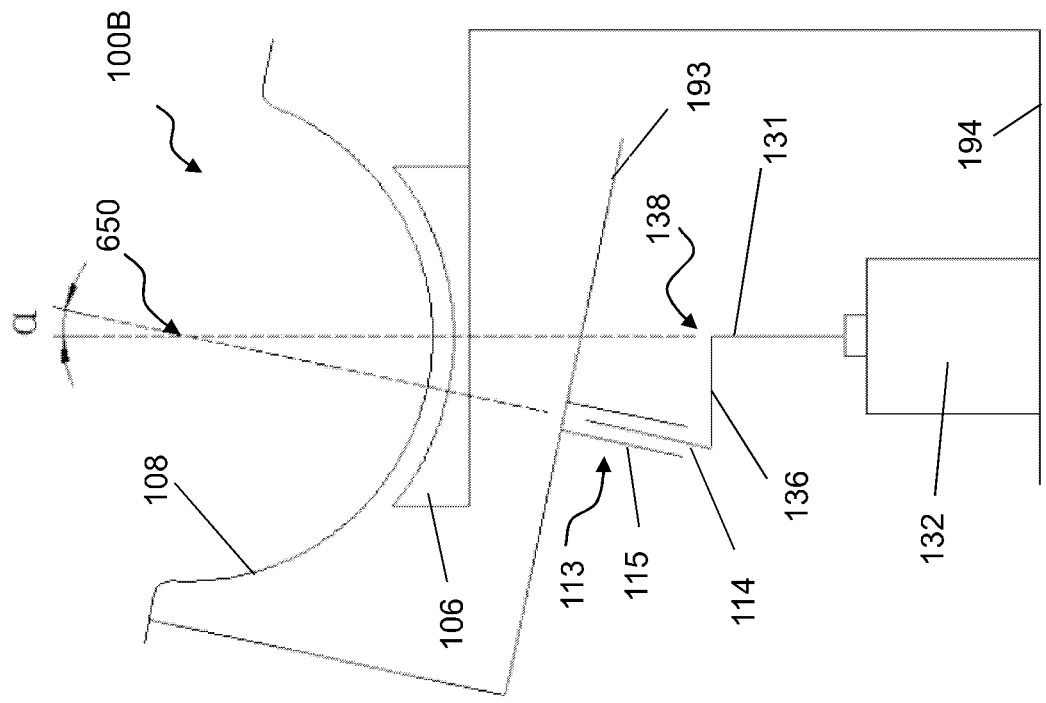
FIG. 2 shows a schematic view of an automated cooking apparatus that can produce spherical cyclic movements in a cooking pan.

The present application discloses a cooking apparatus that can automatically stir, mix, and/or distribute food or food ingredients held in a cooking container, while overcoming the drawbacks in the conventional cooking devices. The disclosed cooking apparatus comprises a cooking container and a stirring mechanism that can produce specially configured movements and accelerations in the cooking container as to stir, mix, turn, and/or distribute the food or food ingredients held in the cooking container.

For the purpose of present patent application, unless otherwise mentioned, a shaft always has an axis of rotation. A shaft may rotate around its own axis or rotate around a different axis.

For the purpose of present patent application, a "motion mechanism" refers to a mechanism comprising: a stationary member referred to as support component; a moving member; and a driving mechanism (e.g., a motor) configured to produce a motion of the moving member relative to the stationary member. The driving mechanism can optionally be powered by electricity, oil, or other energy sources. The stationary member is referred to as the support component of the motion mechanism. In many applications, the support component provides a base support on which some other parts of the motion mechanism may be mounted.

It should be noted that a support component may comprise a frame, a board, a plate, a shell, a rigid component, a bearing housing, a shaft, or any solid of any shape, etc. In many applications, a support component is a rigid component.

It should be noted that a rigid component is only relatively rigid. Any material or shape can have a certain degree of elastic, thermal, or other deformations. Same applies to rigid connectors.

For the purpose of the present patent application, a rotational motion mechanism refers to a motion mechanism wherein the produced motion is a rotation. The rotation may be around a point, or around an axis, wherein the point or axis is fixed relative to the support component of the motion mechanism. Similarly, a linear motion mechanism is a motion mechanism configured to move the moving member component linearly relative to the stationary member.

For the purpose of the present patent application, a kinematic mechanism refers to a mechanism which comprises: two members referred to as mating parts; and a connection configured to connect the mating parts as to constrain the relative movement of the mating parts. Said connection may comprise bearings and accessories in some applications. The two mating parts may or may not touch each other. The mating parts can be rigid.

For the purpose of the present patent application, a rotational mechanism refers to a kinematic mechanism wherein the mating parts are constrained to rotate around each other. The rotation can be around an axis or around a point, wherein the axis or point is fixed relative to either mating part. An axial rotational mechanism refers to a rotational motion mechanism wherein the produced rotation is around an axis.

A typical rotational mechanism comprises a shaft with a central axis and a bearing housing as mating parts, wherein the shaft and the bearing housing are connected by bearings and accessories so that the shaft is constrained to rotate relative to the bearing housing around the central axis of the shaft.

As another example of a kinematic mechanism, a sliding pair may comprise a linear or curve rack and a slider which is constrained to move on the track, wherein the main body of the slider and the track are two mating parts.

A kinematic mechanism may comprise a kinematic mechanism A kinematic mechanism may be considered as a kinematic mechanism.

Figure 1:
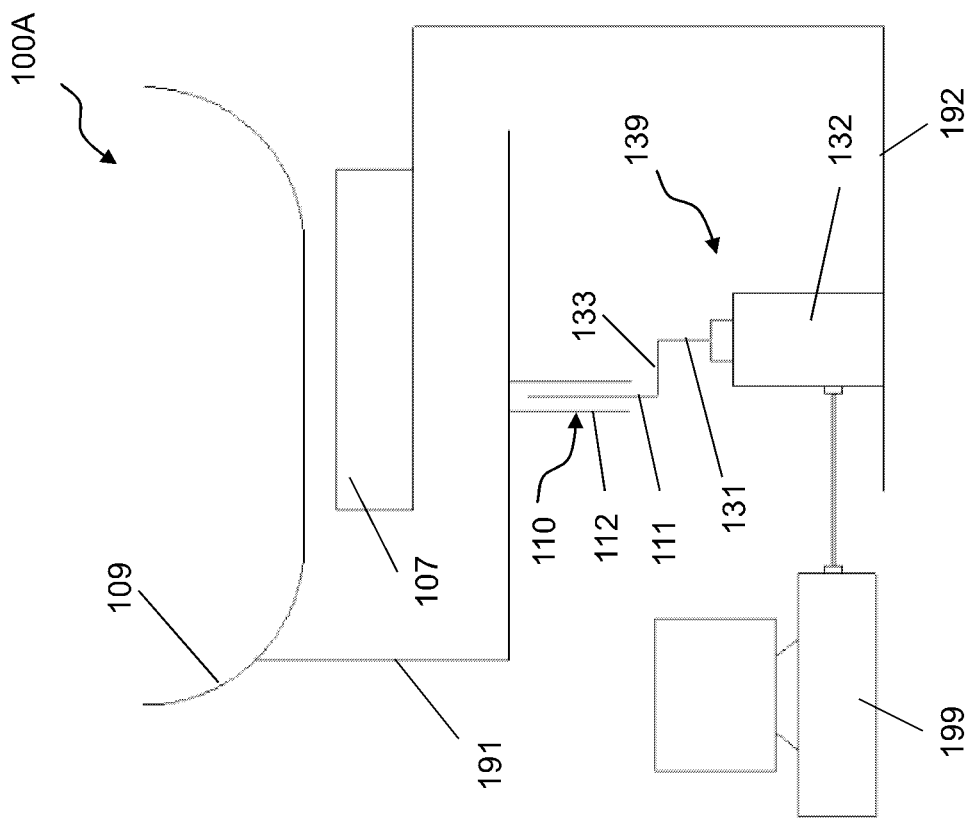
FIG. 1 shows a schematic view of an automated cooking apparatus that can produce cyclic movements in a cooking pan in accordance with the present invention.

In some embodiments, referring to FIG. 1, an automated cooking apparatus 100A includes a cooking pan 109, and a connector 191 which is rigidly or fixedly connected to the cooking pan 109. A rotational mechanism 110, as a first kinematic mechanism, includes a shaft 111 and a sleeve 112 as mating parts, wherein said shaft is constrained to rotate relative to said sleeve. The sleeve 112 is rigidly or fixedly connected to the connector 191. A motion mechanism 139 includes a motor 132 which can rotate a shaft 131 around its axis, and a connector 133 that rigidly or fixedly connects the shafts 111 and 131. The motor 132 is mounted on a support frame 192, as a support component. The axis of the shaft 131 is fixedly relative to the support frame 192. A computer 199 controls the motor 132. The motor 132 can produce a rotational movement of the shaft 111 relative to the support frame 192. The shafts 111 and 131 are parallel to each other. The radius of rotational movement of the mechanism 139, which is equal to the distance between the axes of the shafts 111 and 131, is designed to be properly small. A heater 107 is mounted on the support frame 192 below the cooking pan 109. The heater 107 may be rotationally symmetric around the shaft 131 for the best heating result, although this is not a requirement. The rotational movement of the shaft 111 together with the rotational mechanism 110 produces movements of the cooking pan. The point of the internal surface of the cooking pan intersected with the axis of the shaft 111 can be a center point on the cooking pan. The center point is displaced by a properly small distance at all times (equal to double the distance between the axes of the shafts 111 and 131). The inclination of any axis of the cooking pan is changed by a small enough angle. In fact, (without counting the effects of vibrations) the inclination of any axis of the cooking pan does not change if the axes of the shafts 111 and 131 are designed to be vertical. Except a self-rotation around the rotational mechanism 110, the cooking pan as a whole body is displaced relative to the support frame (or relative to the heater) by a properly small distance and by a small inclination change at all times, so the food ingredients contained in the cooking pan can be heated by the heater while the cooking pan is moved.

In some embodiments, referring to FIG. 2, an automated cooking apparatus 100B includes a connector 193 which rigidly or fixedly connected to a spherically shaped (or partially spherically shaped) cooking pan 108. A first rotational mechanism 113, as a first kinematic mechanism, includes a shaft 114 and a sleeve 115 as mating parts, wherein said shaft is constrained to rotate relative to said sleeve (around the axis of the shaft). The sleeve 115 is rigidly or fixedly connected to the connector 193. A motion mechanism 138 includes a motor 132 which can rotate a shaft 131 (around the axis of the shaft), and a rigid connector 136 that connects the shafts 131 and 114. The motor 132 is mounted on a support frame 194, as a support component. The axis of the shaft 131 is fixedly relative to the support frame 194. A computer (not shown) controls the motor that can produce a rotational movement of the shaft 114 relative to the support frame 194. The shaft 114 and the shaft 131 are aligned at an oblique angle α (i.e. not parallel) relative to each other. The axes of shafts 114 and 131 meet at a center point 650, which is approximately at the spherical center of the spherical shaped cooking pan. The angle of rotational movement of the mechanism 138, equal to the angle α between the axes of the shafts 114 and 131, is designed to be properly small. A heater 106, mounted on the support frame 194, lies below the cooking pan 108. The point of the internal surface of the cooking pan intersected with the axis of the shaft 114 can be a center point on the cooking pan. Since the angle of the rotational movement is properly small, the center point is displaced by a properly small distance at all times. The inclination of any axis of the cooking pan is changed by a small angle. Except a self-rotation around the rotational mechanism 113, the cooking pan as a whole is only displaced by a small distance and by a small inclination change at all times, and the food ingredients contained in the cooking pan may be heated by the heater while the cooking pan is moved.

It should be noted that the connectors 193, 193 in FIGS. 1 and 2 can respectively hold the cooking pan 109, 108 in different ways during cooking. For example, the cooking pan can be fixed to the connector by a mechanism (clamps, screws, etc.) or by a magnet.

In some embodiments, referring to FIGS. 3A and 3B, an automated cooking apparatus 100C includes a cooking pan 109, and a connector 291 which is rigidly or fixedly connected to pan 109. A first rotational mechanism, as a first kinematic mechanism, includes a shaft 211 and a sleeve 212 as mating parts, wherein said shaft is constrained to rotate relative to said sleeve. The shaft 211 is rigidly or fixedly connected to the connector 291, and the sleeve 212 is rigidly connected to a rod 142, as a rigid connector. A rotational mechanism 140 comprises a shaft 141 and a sleeve (not marked) wherein said shaft is constrained to rotate (around the axis of the shaft) relative to said sleeve around the axis of said shaft, wherein said sleeve is rigidly connected to the rod 142, wherein the shaft is rigidly connected to a support frame 195, as a support component. A rigid connector 144 rigidly connect a shaft 143 to a shaft 145. The shaft 143 is constrained to rotate (around the axis of the shaft) relative to a sleeve which is rigidly connected to the rod 142. The shaft 145 is constrained to rotate (around the axis of the shaft) relative to a sleeve which is rigidly connected to a rigid connector 146. The rigid connector 146 is rigidly connected to the shaft 147; and a motor 149, mounted on the support frame 195, can rotate the shaft 147 around its axis. The axis of the shaft 147 is fixedly relative to the support frame 195. The shafts 141, 143, 145 and 147 have parallel axes; and the distance between the axes of the shafts 145 and 143 is longer than the distance between the axes of the shafts 145 and 147. The motor 149 can produce a rotational movement of the shaft 145 around the shaft 147 and can result in a rotational oscillation of the shaft 143 and hence of the rod 142 around the rotational mechanism 140. Thus, the shaft 211 makes a rotational oscillatory movement around the rotational mechanism 140. It should be noted that the parallel shafts 141, 143, 145 and 147 may or may not be parallel to the shaft 211. The magnitudes of the rotational oscillation are designed to be properly small, by adjusting the distance between the axes of the shafts 145 and 147. Then the point of the internal surface of the cooking pan intersected with the axis of the shaft 211 can be a center point on the cooking pan. The center point is only displaced by a properly small distance at all times. In addition, the inclination of any axis of the cooking pan is changed by a small enough angle. Except a self-rotation around the axis of the shaft 211, the cooking pan as a whole is displaced by a small distance and by a small inclination change during the movements.

Figure 4:
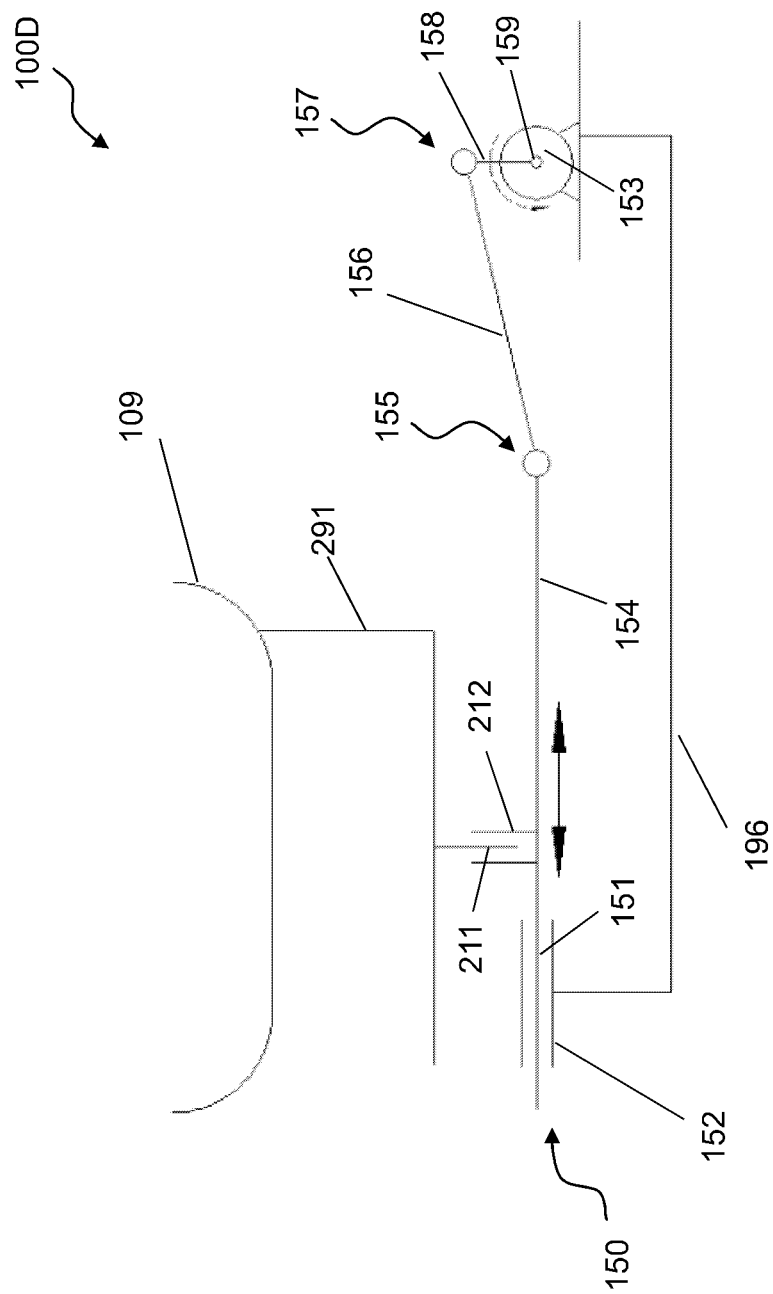
FIG. 4 shows an automated cooking apparatus that can produce linear oscillatory movement of a cooking pan.

In some embodiments, referring to FIG. 4, an automated cooking apparatus 100D includes a cooking pan 109, and a connector 291 which is rigidly or fixedly connected to the pan 109. A first rotational mechanism, as a first kinematic mechanism, includes a shaft 211 and a sleeve 212 as mating parts, wherein said shaft is constrained to rotate relative to said sleeve (around the axis of the shaft), where the shaft 211 is rigidly or fixedly connected to the connector 291. A sliding mechanism 150 comprises a first mating part 151 comprising a sliding track and a second mating part 152 comprising a slider which is constrained to slide relative to the first mating part. The relative motion of the two mating parts may optionally be constrained to be a linear motion. The second mating part 152 is rigidly connected to a support frame 196, as a support component. A rigid extension 154 of the first mating part 151 is joined to a rigid connector 156 by a first mating part of a rotational mechanism 155, so that the first mating part 151 is constrained to rotate relative to the rigid connector 156. The rigid connector 156 is joined to another rigid connector 158 via a rotational mechanism 157 so that the rigid component 156 is constrained to rotate relative to the rigid component 158. The connector 158 is rigidly connected to the shaft 159; and a motor 153, mounted on the support frame 196, can rotate the shaft 159 around its axis. The axis of the shaft 159 is fixedly relative to the support frame 196. The rotational mechanisms 155, 157 and the shaft 159 have parallel axes that are perpendicular to the direction of the linear motion of the sliding mechanism 150; and the distance between the axes of the rotational mechanisms 157 and 155 is longer than the distance between the axes of the rotational mechanism 157 and the shaft 159. The motor can produce a movement of the rotational mechanism 157, resulting in a linear oscillation of the extension 154 and hence of the sleeve 212. The magnitudes of the linear oscillation are designed to be properly small, by adjusting the distance between the axes of the shafts 157 and 159. The point of the internal surface of the cooking pan intersected with the axis of the shaft 211 can be a center point of the cooking pan. The center point is only displaced by a properly small distance at all times. In addition, the inclination of any axis of the cooking pan is changed by a small enough angle. Except a self-rotation around the axis of the shaft 211, the cooking pan as a whole is displaced by a small distance and by a small inclination change during the movements.

In some embodiments, referring to FIG. 5A, an automated cooking apparatus 100E includes a cooking pan 109, and a connector 191 which is rigidly or fixedly connected to the pan 109. A first rotational mechanism, as a first kinematic mechanism, includes a shaft 111 and a sleeve 112 as mating parts, wherein said shaft is constrained to rotate relative to said sleeve around the axis of the shaft. The sleeve 112 is rigidly or fixedly connected to the connector 191. The shaft 111 is rigidly connected to a gear 163 with cogs 164 but the shaft 111 is not concentric with the gear 163. A shaft 165 is constrained to rotate around its axis relative to a sleeve, which is rigidly connected to the gear 163 so the shaft 165 and the gear 163 have a same axis. A rigid connector joins the shaft 165 to a shaft 168 which can be rotated by a motor 167 around a fixed axis, wherein the motor is mounted on a support frame 197, as a support component. The axis of the shaft 168 is fixedly relative to the support frame 197. An internal gear 161 with cogs 162 is rigidly or fixedly connected to the support frame 197. The axis of the internal gear 161 is the same as the axis of the shaft 168; and the cogs 164 and the cogs 162 are engaged. The shafts 111, 165, 168 and both gears have parallel axes. As the motor rotates continuously, the shaft 111 moves along a hypocycloid. FIG. 5B shows an exemplified movement path 168 of the axis of the shaft 111 (as projected onto a plane). The magnitudes of the hypocycloidal movement of the shaft 111 can be designed to be properly small, by adjusting the distance between the axes of the shafts 165 and 168 as well as the position of the shaft 111 on the gear 163. The point of the internal surface of the cooking pan intersected with the axis of the shaft 111 can be a center point on the cooking pan. The center point is only displaced by a properly small distance at all times. In addition, the inclination of any axis of the cooking pan is changed by a small angle. Except a self-rotation around the shaft 111, the cooking pan as a whole is displaced by a small distance and by a small inclination change during the movements.

In some embodiments, referring to FIGS. 6A, an automated cooking apparatus 100F includes a cooking pan 109, and a connector 191 which is rigidly or fixedly connected to the pan 109. A first rotational mechanism, as a first kinematic mechanism, includes a shaft 111 and a sleeve 112 as mating parts, wherein said shaft is constrained to rotate relative to said sleeve around the axis of said shaft. The sleeve 112 is rigidly or fixedly connected to the connector 191. The shaft 111 is rigidly mounted on a gear 173 with cogs 174. A rotational mechanism comprises a shaft 175 and a sleeve so that the shaft is constrained to rotate around the axis of the shaft relative to the sleeve; wherein the sleeve is rigidly connected to the gear 173, so that the axis of the gear 173 and the axis of the shaft 175 are identical. A rigid connector 176 rigidly connects the shaft 175 and a sleeve 178. A shaft 177 is constrained to rotate around its own axis relative to the sleeve 178. (Thus, the shaft 177 and the sleeve 178 are the mating parts of a rotational mechanism.) A gear 181 is rigidly connected to and is concentric with the sleeve 178. The shaft 177 is mounted on and is rigidly connected to a support frame 198, as a support component; and a gear 172 with cogs 172 is rigidly connected to the shaft 177 so that the gear 172 and the shaft 177 have identical axis. A motor 184 is mounted on the support frame 198 and can drive the rotation of a shaft 183 around the axis of the shaft, wherein the axis of the shaft 183 is fixed relative to the support component 198. Another gear 182 is rigidly connected to the shaft 183. The gear 182 and the shaft 183 have a same axis. The gears 171 and 173 are engaged. The gears 181 and 182 are engaged. The shafts 111, 175,177, 183 and all four gears have parallel axes. As the motor rotates the gear 182, the gear 181 and hence the sleeve 178 rotate around the axis of the shaft 177, and thus produce a rotational movement of the gear 173 and of the shaft 175 around the axis of the shaft 177. Since the gear 171 is rigidly connected to the support frame 198, the gear 173 is rotated relative to the shaft 175, which is in a rotational movement around the axis of the shaft 177. The axis of the shaft 111 moves along an epicycloid. FIG. 6B shows an exemplified movement path 178 of the axis of the shaft 111 (projected to a plane). The magnitudes of the epicycloidal movement of the shaft 111 can be designed to be properly small, by adjusting the distance between the axes of the shafts 175 and 177 as well as the position of the shaft 111 on the gear 173. The point of the internal surface of the cooking pan intersected with the axis of the shaft 111 can be a center point on the cooking pan. The center point is only displaced by a properly small distance at all times. In addition, the inclination of any axis of the cooking pan is changed by a small angle. Except a self-rotation around the shaft 111, the cooking pan as a whole is displaced by a small distance and by a small inclination change during the movements.

The motion mechanism in FIGS. 3A-3B, 5A or 6A moves the shaft 111 in a planar movement path. Each one of the three motion mechanisms can be modified so the axes of all shafts and gears intersect at a center point (comparable with point 650 in FIG. 2). Then the shaft 111 can move along a spherical movement path. The same comment can be applied to many of the automated cooking apparatus in the subsequent figures.

It should be noted that the motion mechanisms moving the shaft 111 or 211 in FIGS. 1-5A, 6A can be substituted by motion mechanisms producing other than rotational, oscillatory, hypocycloidal or epicycloidal motions. Broadly, the motion mechanism can be substituted by any motion mechanism that is capable of frequent change of moving directions. The first rotational mechanism 110 can include a sleeve and a shaft as descried above but can also include a ball and a cap (or sleeve), as well as other kinematic mechanisms.

It should be noted that in the cooking apparatus shown in FIGS. 1-5A, or 6A, the center point of the internal surface of the cooking pan intersected with the axis of the first rotational mechanism is a center point of the cooking pan with respect to the cooking pan's self-rotation. It is possible but not required for the axis of the first rotational mechanism to be a central axis of the cooking pan in a geometric or other sense.

Each sleeve in FIGS. 1-5A, 6A may be substituted by a bearing housing. Bearing and accessories may be installed to constrain the motion of the respective shaft relative to the bearing housing.

It should be noted that in the cooking apparatus shown in FIGS. 1-5A, 6A, the cooking pan can have a self-rotation relative to the shaft 111 or 211 around the axis of the shaft. The self-rotations is uncontrolled while the shaft is moved by the respective motion mechanism. In FIGS. 7A-16D below, a connection mechanism are added to constrain, restrain, limit, and/or control the self-rotation of the cooking pan around the axis of the shaft 111 or 211.

For the purpose of present patent application, a connection mechanism is a non-rigid connection configured to connect two separate (physical) objects. For example, a connection mechanism may comprise: an elastic connector such as a spring which is hooked up to two objects, a connection comprising a bearing and accessories to connect a shaft and a bearing housing so that the shaft is constrained to rotate relative to the bearing housing, a connection of a slider and a sliding track which constrains the movement of the slider relative to the sliding track to a linear motion, a connection comprising a kinematic mechanism which comprises two mating parts wherein the relative motion of the mating parts is constrained, a magnetic connection between a magnet and an iron (or ferromagnetic component). A connection mechanism may or may not comprise a powered mechanism. If two objects are connected by a connection mechanism, then the two objects may not be moved arbitrarily far away from each other.

Figure 7A:
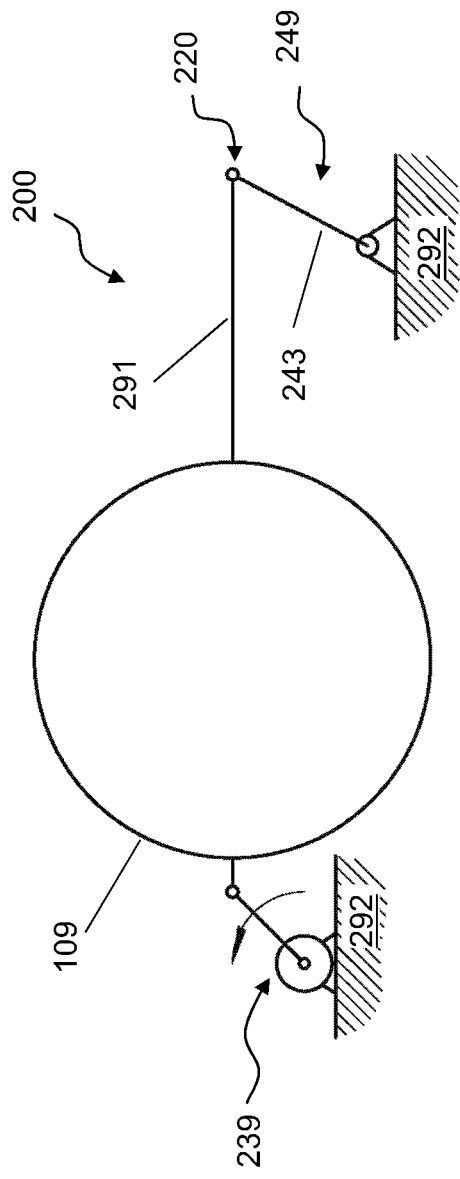
FIGS. 7A-7B respectively show top and side views of another automated cooking apparatus that can produce cyclic movements in a cooking pan.
Figure 7B:
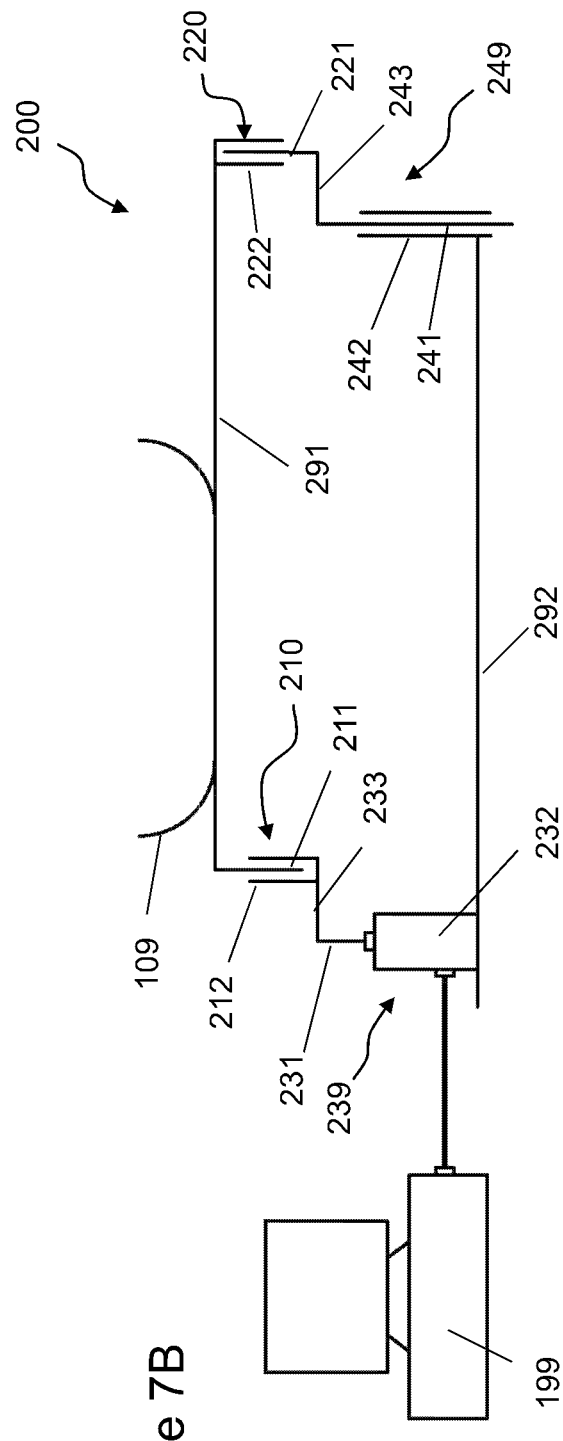

In some embodiments, referring to FIGS. 7A and 7B, an automated cooking apparatus 200 comprises a cooking container (or cookware) 109 configured to contain or hold food or food ingredients during a cooking process, and a stirring motion mechanism that includes the following parts:

(1) A first rotational mechanism 210, as a first kinematic mechanism, comprising a shaft 211 and a bearing housing 212 as mating parts, wherein the shaft is constrained to rotate relative to the bearing housing 212 around the axis of the shaft;

(2) A motion mechanism 239 comprising: a support component 292; a shaft 231; a rigid connector 233 that rigidly connects the shaft 231 and the bearing housing 212; and a motor 232 configured to rotate the shaft 231 around the axis of the shaft 231 relative to the support component 292; wherein the axis of the shaft 231 is fixed relative to the support component 292. A computer 199 is configured to control the motor 232;

(3) A connection mechanism 249 comprising: (a) a second rotational mechanism 220 (as a second kinematic mechanism) comprising a shaft 221 and a bearing housing 222 as mating parts; wherein the shaft is constrained to rotate around the axis of the shaft relative to the bearing housing. (b) a connector 291 is configured to rigidly, elastically, or fixedly connect the bearing housing 222 which is a first mating part of the second rotational mechanism, the shaft 211 which is a first mating part of the first rotational mechanism, and the cooking container 109; (c) a third rotational mechanism (as a third kinematic mechanism) comprising a shaft 241 and a bearing housing 242 as mating parts, and a bearing (not shown in Figure) configured to link the shaft 241 and bearing housing 242, so that the shaft is constrained to rotate relative to the bearing housing around the axis of the shaft; and (d) a connector 243 configured to connect the shaft 221, as the second mating part of the second rotational mechanism, and the shaft 241, as the first mating part of the third rotational mechanism; and (e) a connection of the bearing housing 244, as the second mating part of the third rotational mechanism, with the support component 292.

The motion mechanism 239 can produce a rotational movement of the bearing housing 212, as the second mating part of the first rotational mechanism, around the axis of the shaft 231, thus moving the bearing housing 212, connector 291 and cooking container 109. The connection mechanism 249 allows the shaft 221 to be rotatable around the axis of shaft 241. The four shafts 211, 221, 231 and 241 may be configured to be parallel to each other.

The distance between the axes of the shafts 211 and 231 may be configured to be properly small, so any point of the cooking container is only displaced by a properly small distance. Similarly, the inclination of any axis of the cooking container may be changed by a small enough angle. (In fact, the inclination of any axis of the cooking container does not change if the axes of the shafts 211, 231, 221 and 241 are configured to be vertical.) In particular, the cooking container as a whole may be displaced by a small distance and by a small inclination change at all times, so the food ingredients contained in the cooking container may be heated by the heater while the cooking container is moved. On the other hand, the rotation speed of the motor 232 may be properly large, as to produce a properly large acceleration in the movement of any point on the internal surface of the cooking container.

In some applications, the distance between the axes of the shafts 211 and 231 is configured to be smaller than the distance between the axes of the shafts 221 and 241 in the apparatus 200. Then, the rotation of the shaft 241 may be a back-and-forth rotation, while the rotation of the shaft 231 may be non-stop and continuous.

In some other applications, the distance between the axes of the shafts 211 and 231 in the cooking apparatus 200 may be the same as the distance between the axes of the shafts 221 and 241. In this case, a motor may drive the rotation of the shaft 241 around its own axis. The rotation of the shaft 231 (around the axis of the shaft 231) and the rotation of the shaft 241 (around the axis of the shaft 241) may be configured to be synchronous or anti-synchronous. It should be noted that the rotation of the shaft 231 and the rotation of the shaft 241 may be linked by a transmission mechanism as to be synchronous or anti-synchronous; so that both rotations may be driven by a same motor.

The stirring motion mechanism of the cooking apparatus 200 can produce a cyclic motion of the cooking container 109 as to stir, mix or distribute food or food ingredients held in the cooking container.

The connection mechanism 249 connects the connector 291 to the support component 292, wherein the connector 291 is rigidly or fixedly connected to the first mating part 211 of the first rotational mechanism. The motion of the connector 291 relative to the support component 292 is constrained by the connection mechanism. Thus, the motion of the first mating part 211 relative to the support component is also constrained.

It should be noted that each component of the connection mechanism in the apparatus 200 is not fixedly connected to 212, the second mating part of the first rotational mechanism.

In some embodiments, referring to FIGS. 8A and 8B, an automated cooking apparatus 300 comprises a cooking container 109 and a stirring motion mechanism comprising following parts:

(1) A first rotational mechanism (as a first kinematic mechanism) 310 comprising: a shaft 311; a bearing housing 312 as mating parts; and a bearing (not shown in Figure) configured to link the shaft 311 and bearing housing 312 so that the shaft is constrained to rotate relative to the bearing housing around the axis of the shaft;

(2) A motion mechanism 339 comprising: a support component 392; a shaft 331 which is rigidly connected to the shaft 311 via a connector 333; a motor 332 mounted on a support component 392, where the motor 332 is configured to rotate the shaft 331 around the axis of the shaft 331, relative to the support component 392; wherein the axis of the shaft 331 is fixed relative to said support component;

(3) A connection mechanism 359 comprising: (a) a sliding pair 320 (as a second kinematic mechanism) comprising a linear track 321 and a slider 322 which is constrained to slide on the linear track 321; where the linear track 321 is rigidly connected to the connector 391; (b) a connector 391 configured to rigidly, elastically, or fixedly connect the linear track 321 which is a first mating part of the second kinematic mechanism, the bearing housing 312 which is a first mating part of the first rotational mechanism, and the cooking container 109; (c) a rotational mechanism (as a third kinematic mechanism) comprising a shaft 351 and a bearing housing 352 as mating parts and a bearing (not shown in Figure) configured to link the shaft 351 and bearing housing 352 so that the shaft is constrained to rotate relative to the bearing housing around the axis of the shaft; wherein the shaft 351 and a rigid component of the slider 322 are configured to be rigidly connected; wherein the bearing housing 352 is rigidly connected to the support component 392. The direction of the linear track 321 and the axis of the shaft 351 are configured to be perpendicular to each other. The axes of the shafts 311, 331 and 351 are configured to be parallel to each other.

The amplitude of the movement of the cooking container in the apparatus 300 may be configured to be properly small by adjusting the distance between the axes of the shafts 311 and 331. Then the cooking container as a whole is displaced by a small distance and by small change in inclination angle. On the other hand, the rotation speed of the motor 332 may be properly large, as to produce a properly large acceleration in the movement of any point on the internal surface of the cooking container.

The stirring motion mechanism of the cooking apparatus 300 can produce a cyclic motion of the cooking container 109 as to stir, mix or distribute food or food ingredients held in the cooking container.

The connection mechanism 359 connects the connector 391 to the support component 392, wherein the connector 391 is rigidly or fixedly connected to the first mating part 312 of the first rotational mechanism. The motion of the connector 391 relative to the support component 392 is constrained by the connection mechanism. Thus, the motion of the first mating part 312 relative to the support component is also constrained.

It should be noted that each component of the connection mechanism in the apparatus 300 is not fixedly connected to 311, the second mating part of the first rotational mechanism.

In some embodiments, referring to FIGS. 9A and 9B, an automated cooking apparatus 400 comprises a cooking container 109 and a stirring motion mechanism comprising the following parts:

(1) A first rotational mechanism 410, as a first kinematic mechanism, comprising: a shaft 411; and a bearing housing 412 as mating parts so that the shaft is constrained to rotate relative to the bearing housing around the axis of the shaft;

(2) A motion mechanism 439 comprising: a support component 492; a first rotational mechanism comprising a shaft 431 and a bearing housing 432 so that the shaft is constrained to rotate relative to the bearing housing around the axis of the shaft; a rigid connection of the bearing housing 432 with the support component 492; a rigid connector 433 configured to connect the shafts 431 and 411; and a motor (not shown in figure) which drives the rotation of shaft 431 around the axis of the shaft 431. The motion mechanism 439 is configured to produce a rotation of the shaft 411 around the axis of the shaft 431, relative to the support component 492;

(3) A connection mechanism 469 comprising: a pair of ball bearings 461 whose inner rings are fixedly connected to the support component 492 via some shafts; a connector 491 which is rigidly, fixedly or otherwise connected to the bearing housing 412 which is a first mating part of the first rotational mechanism and the cooking container 109. The outer rings of the bearings 461 loosely constrain a solid part 462 which is rigidly connected to the connector 491.

In some important applications, the axes of the shafts 411 and 431 are configured to be coplanar. That is, the axes of the shafts 411 and 431 may be parallel to each other, or they may intersect at a point.

The stirring motion mechanism of the cooking apparatus 400 can produce a cyclic motion of the cooking container 109 as to stir, mix or distribute food or food ingredients held in the cooking container.

It should be noted that the connection mechanism 469 connects the connector 491 to the support component 492, wherein the connector 491 is rigidly or fixedly connected to the first mating part 412 of the first kinematic mechanism. The motion of the connector 491 relative to the support component is constrained by the connection mechanism. Thus, the motion of the first mating part 412 relative to the support component is also constrained.

It should be noted that in case the axes of the shafts 411 and 431 are sufficiently close to each other (i.e., the shortest distance between the two axes is small enough and the angle between the directions of the axes is also small enough), then the cooking container as a whole may be displayed by a small distance and by a small inclination change. On the other hand, the rotation speed of the motor driving the rotation of the shaft 431 may be properly large, as to produce a properly large acceleration in the movement of any point on the internal surface of the cooking container.

Figure 9E:
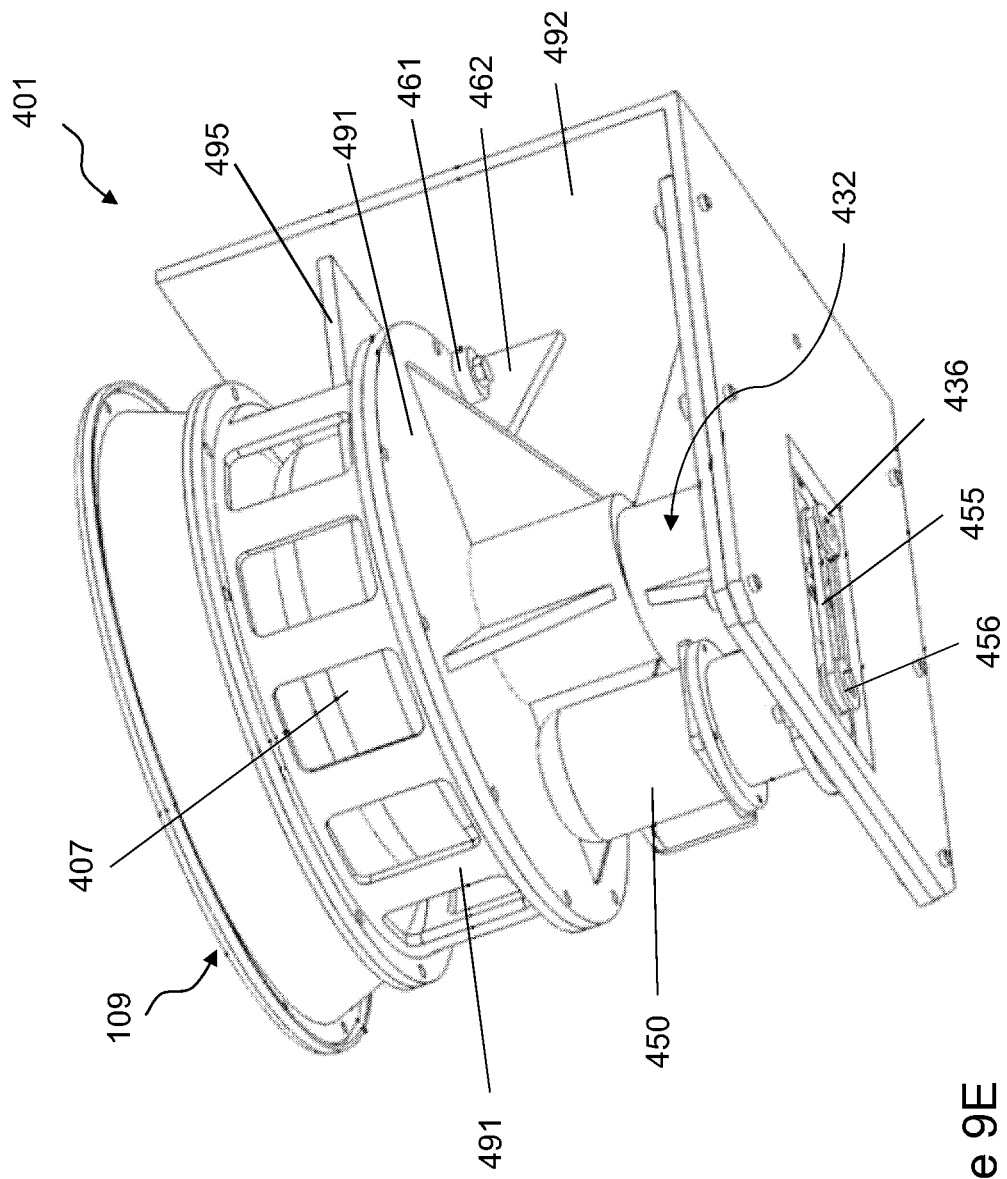
Figure 9G:
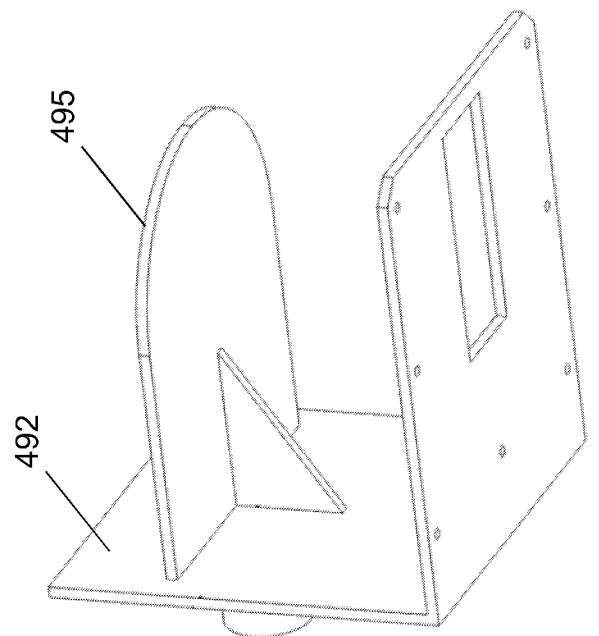
Figure 9F:
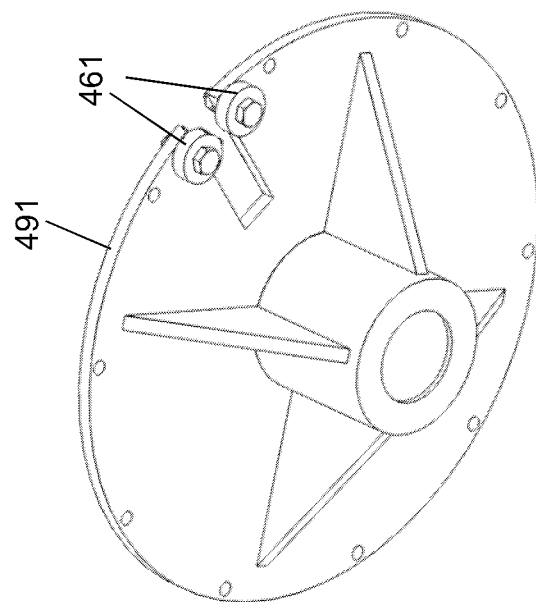

FIGS. 9C-9G display details of an exemplified mechanical implementation 401 of the automated cooking apparatus 400. Referring to FIG. 9C, the connector 491 has a top part in the shape of a ring which is rigidly connected to a cooking container 109, and a lower part which is rigidly connected to a bearing housing 412 (FIG. 9C). Bearings 418 are configured to link the bearing housing 412 and a shaft 411 so that the shaft is constrained to rotate relative to the bearing housing around the axis of the shaft. The shaft 411, a shaft 431, and a connector 433 are joined together to form a single part (FIG. 9D). A bearing housing 432 is rigidly connected to a support component 492. Bearings 438 are configured to link the shaft 431 and the bearing housing 432 so that the shaft is constrained to rotate relative to the bearing housing around the axis of the shaft. A motor 450 is mounted on the support component 492 and drives the axial rotation of a belt wheel 456 (FIG. 9E). Another belt wheel 436 is fixedly connected, and concentric with the shaft 431, and a belt 455 is configured to wrap around the belt wheels 436 and 456 as to link their rotations. The motor 450 thus produces a rotation of the shaft 431 through the belt transmission. On the other part, the inner rings of ball bearings 461 are rigidly connected to the support component 491 via some shafts (FIG. 9F). The outer rings of the ball bearings 461 are configured to loosely limit the movement of a vertical plate 462 and the vertical plate 462 is a rigid extension of the connector 491 (FIG. 9E). In addition, a stove 407 is mounted on a horizontal plate 495 which is rigidly connected to the support component 492 (FIG. 9E and FIG. 9G).

In some embodiments, referring to FIGS. 10A and 10B, an automated cooking apparatus 500 comprises the same components as the automated cooking apparatus 400, except that the motion mechanism 439 comprises an adjustable connector 537 instead of a rigid connector 433, for the purpose of connecting the shafts 411 and 431. The adjustable connector 537 comprises two separate parts which are connected by a hinge joint 538 such that the two parts are constrained to rotate relative to each other around the axis of the hinge joint; wherein the two parts are respectively, rigidly connected to the shafts 411 and 431. The relative position of the two parts in the adjustable connector 537 may be changed by a motor configured to rotate one part relative to the other around the axis of the hinge joint. Thus, the relative position of the shafts 411 and 431 may be adjusted. The change in the relative position of the shafts 411 and 431 affects the amplitude of the motion of the cooking container.

An advantage of the design of the cooking apparatus 500 is that the amplitude of the movement of the cooking container 109 may be varied based on the type of food ingredients being cooked and also based on time in the cooking process. Movements with smaller amplitudes may be used for food ingredients that are easily broken so the shape and appearance of the food ingredients may be preserved during cooking. For food ingredients that are not easily broken, they may be more vigorously stirred, mixed, and aerated by selecting high amplitude.

In the cooking apparatus 500 in FIG. 10A-10B, a computer may also control the directions and speeds of the motor that produces a rotation of the shaft 431, and to control the motor configured to rotate the connectors 537 relative to each other, around the axis of the hinge joint 538, as to adjust the amplitude of the rotational movement of the shaft 411 produced by the motion mechanism. Both motors may rotate at different times, or at the same time.

For the present patent application, a point is said to move by a composition of oscillatory movements, if the X, Y and Z coordinates of the point (in a three dimensional orthonormal coordinate system, relative to a support component), if moved, is moved in oscillation. The frequency of the sign change in the velocity of a coordinate of the point defines a frequency in the combination of oscillatory movements. A composition of oscillatory movements may have more than one frequency. Moreover, the magnitudes and frequencies in a composition of oscillations may be variable over time. The movement of a body is a composition of oscillatory movements, if any point marked on the body moves by a composition of oscillatory movements. In this sense, the motion mechanism in the cooking apparatus 500 produces a combination of oscillations in the shaft 411.

In some embodiments, referring to FIGS. 10C-10E, the adjustable connector 538 connecting the shafts 411 and 431 in the apparatus 500 may be realized by an exemplified mechanism 501, in the special case when the axes of the shafts 411 and 431 are coplanar. The hinge joint 538 (of FIG. 10B) comprises a shaft 539 and a sleeve 540, wherein the sleeve 540 is obtained by removing a cylindrical hole from the shaft 411. A gear 581 is rigidly connected to the shaft 411 and is configured to be concentric with the sleeve 540 (FIG. 10E), so the gear 581 can rotate around the axis of the shaft 539. A connector 583 (in the shape of a plate) rigidly joins the shaft 539, the shaft 431 and a support base of a motor 520; wherein the motor 520 drives the rotation of a gear 582. The gear 582 is engaged with the gear 581. The axes of shafts 411, 431 and 539, and the axis of rotation of the motor 520 are configured to be either parallel to each other, or to meet at a same point. The relative position of the shafts 411 and 431 may be adjusted by the rotation of the motor 520.

The mechanism 501 can also be added to the apparatus in other apparatus to adjust the relative position of the axis of the first rotational mechanism and the axis of rotation of the motion mechanism.

It should be noted that no component of the connection mechanism in the apparatus 400, 400A or 500 is fixedly connected to the second mating part of the first rotational mechanism 410.

Figure 11:
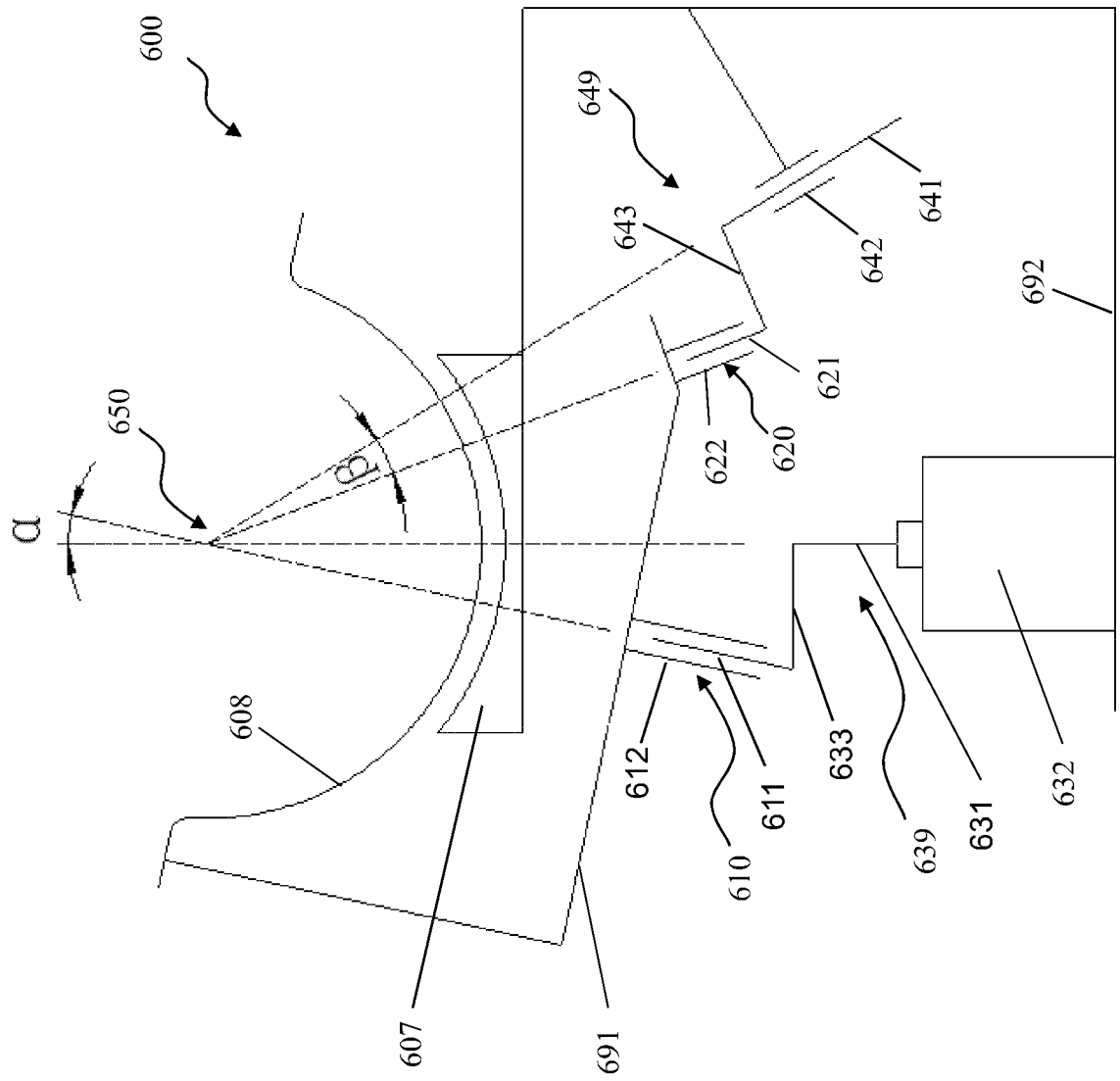
FIG. 11 shows an automated cooking apparatus in which a cooking pan is moved by a spherical mechanism.

In FIG. 11, an automated cooking apparatus 600 comprises a cooking container 608 (optionally a cookware of spherical shape) configured to contain or hold food or food ingredients during a cooking process and a stirring motion mechanism comprising the following parts:

(1) A first rotational mechanism 610 (as a first kinematic mechanism) comprising a shaft 611 and a bearing housing 612 as mating parts, and a bearing configured to link the shaft 611 and bearing housing 612 so that the shaft is constrained to rotate relative to the bearing housing around the axis of the shaft;

(2) A motion mechanism 639 comprising: a support component 692, a shaft 631, and a motor 632 mounted on the support component 692 wherein the motor 632 is configured to produce a rotation in the shaft 631 around the axis of the shaft 631, relative to the support component 692; and a connector 633 configured to rigidly connect the shaft 611, as the second mating part of the first rotational mechanism, and the shaft 631, wherein the axis of the shaft 631 is fixedly relative to the support component. Thus, the rotation of the shaft 631 in the motion mechanism results in a rotation of the shaft 611 around the axis of the shaft 631;

(3) a connection mechanism 649 comprising: (a) a second rotational mechanism 620 (as a second kinematic mechanism) comprising shaft 621, bearing housing 622, and a bearing configured to link the shaft 621 and bearing housing 622 so that the shaft is constrained to rotate relative to the bearing housing around the axis of the shaft; (b) a connector 691 which is configured to rigidly or fixedly connect the bearing housing 612 as a first mating part of the first rotational mechanism 610, the bearing housing 622 as a first mating part of the second rotational mechanism 620, and the cooking container 608; (c) a third rotational mechanism (as a third kinematic mechanism) comprising a shaft 641, a bearing housing 642 and a bearing configured to link the shaft 641 and bearing housing 642 so that the shaft is constrained to rotate relative to the bearing housing around the axis of the shaft; wherein the shaft 641, as the first mating part of the third rotational mechanism, is rigidly connected to shaft 621, the second mating part of the second rotational mechanism; (d) a rigid connection between the bearing housing 642 and support component 692.

The apparatus 600 further comprises a heater 607 which is mounted on the support component 692; wherein the heater 607 is configured to lie under the cooking container 608. It should be noted that the motion mechanism 639 can produce a rotation in the shaft 611 around the axis of the shaft 631. The connection mechanism 649 constrains the shaft 621 to a rotation around the axis of the shaft 641. The axes of the shafts 611, 621, 631, 641 are configured to intersect at the point 650; where the point 650 may optionally be the spherical center 650 of an optional spherical shaped cooking container 608. The angle $\alpha$ between the axes of the shafts 611 and 631 is configured to be smaller than the angle $\beta$ between the axes of the shafts 621 and 641.

It should be noted that the shaft 631 can rotate continuously in one direction but the shaft 641 has to rotate back and forth by less than 180 degrees. Thus, the connection mechanism 649 can restrict the movement of the shaft 621, hence constraining the cooking container's self-rotation around the shaft 612.

The angle between the axes of the shafts 611 and 631 in the apparatus 600 may be configured to be properly small. Then the cooking container as a whole is displayed by a small distance and by a small inclination change. On the other hand, the rotation speed of the motor 632 may be properly large, as to produce a properly large acceleration in the movement of any point on the internal surface of the cooking container.

The stirring motion mechanism of the cooking apparatus 600 can produce a cyclic motion of the cooking container 608 as to stir, mix or distribute food or food ingredients held in the cooking container.

It should be noted that the connection mechanism 649 connects the connector 691 to the support component 692, wherein the connector 691 is rigidly or fixedly connected to the first mating part 611 of the first kinematic mechanism. The motion of the connector 691 relative to the support component 692 is constrained by the connection mechanism. Thus, the motion of the first mating part 611 relative to the support component is also constrained.

Another cooking apparatus may be built the same way as the apparatus 600 simply by letting $\alpha$ and $\beta$ be equal to each other. Then both the shafts 631 and 641 can rotate continuously in one direction or in mutually opposite directions; and the rotation of the shaft 641 must be in strict coordination of the rotation of the shaft 631 so that the angle between the axes of the shafts 611 and 621 stays unchanged. In this case, the apparatus may further comprise a motor mounted on the support component 692 which may produce a rotation in the shaft 641 around the axis of the shaft 641. It should be further noted that a transmission or linkage mechanism can link both motion mechanisms so they may be driven by a same motor. It should be cautioned that the rotation of the shaft 631 and the rotation of the shaft 641 may not have equal speed at all times.

Figure 12:
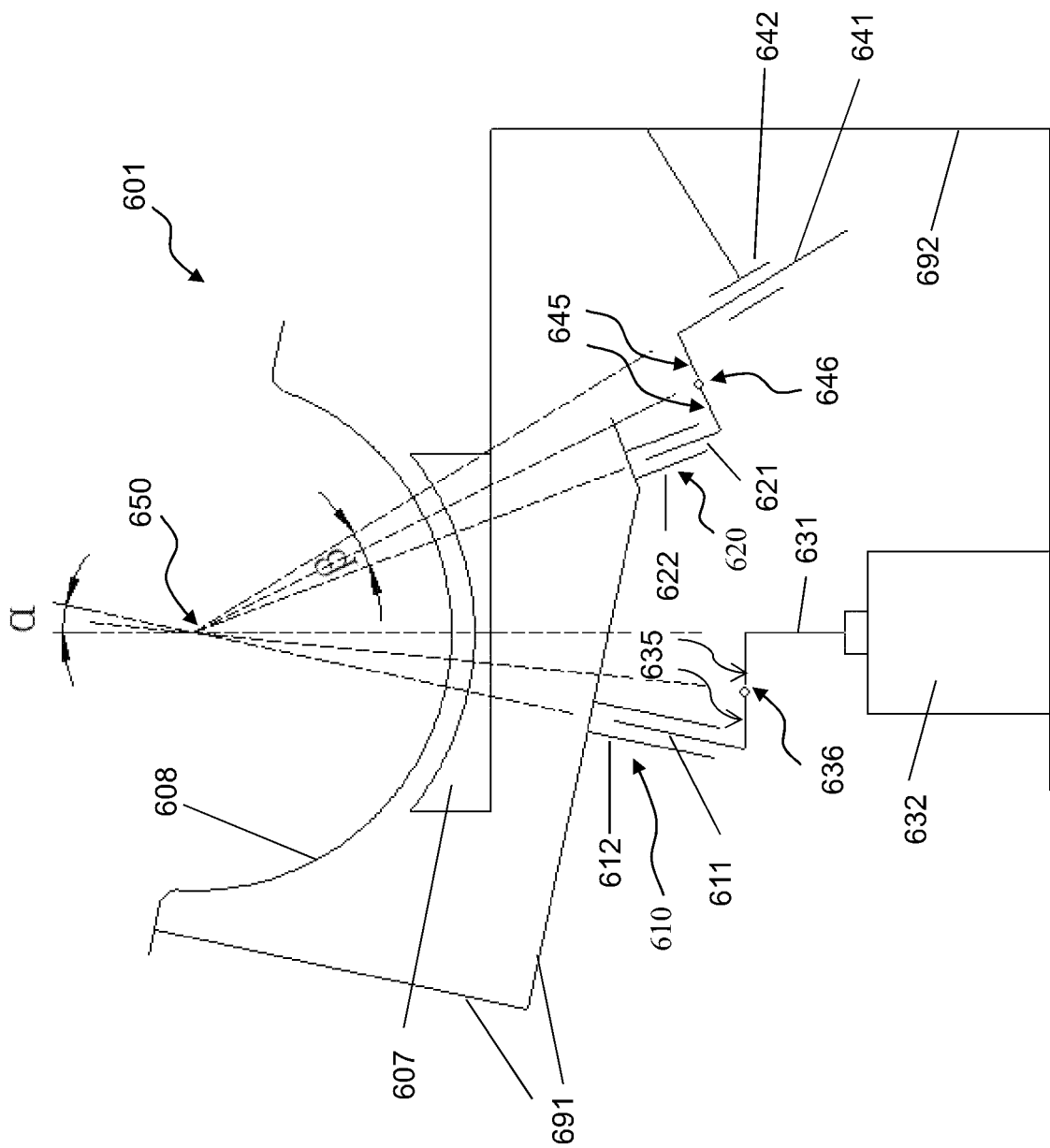
FIG. 12 shows another automated cooking apparatus in which a cooking pan is moved by a spherical mechanism.

In some embodiments, referring to FIG. 12, an automated cooking apparatus 600A comprises the same components as the apparatus 600, except: (a) the connector 633 in the apparatus 600 is substituted by an adjustable connector 635 for the purpose of connecting the shafts 611 and 631; (b) the connector 643 is substituted by an adjustable connector 645 for the purpose of connecting the shafts 621 and 641. The angle $\alpha$ between the axes of the shafts 611 and 631 may be controlled by adjusting the relative position of the two parts of the connector 635; wherein the two parts are connected by a hinge joint 636 so that they are constrained to rotate relative to each other around the axis of the hinge joint 636; wherein the two parts of connector 635 are respectively, rigidly connected to the shafts 611 and 631. Similarly, the angle $\beta$ between the axes of the shafts 621 and 641 may be adjusted by adjusting the relative position of the two parts of connector 645 which are connected by a hinge joint 646 such that the two parts are constrained to rotate relative to each other around the axis of the hinge joint 646; wherein the two parts of connector 645 are respectively, rigidly connected to the shafts 621 and 641. The axes of shafts 611, 621, 631 and 641, and the axes of hinge joints 636 and 646 all pass through the point 650.

It should be noted that no component of the connection mechanism in the apparatus 600 or 600A is fixedly connected to the second mating part of the first rotational mechanism 610. The connection mechanism may constrain the motion of the connector 691 (and of the cooking container 608) whether the first rotational mechanism 610 is present or removed in the apparatus.

In some embodiments, referring to FIGS. 13A-13B, an automated cooking apparatus 800 comprises a cooking container 109 and a stirring motion mechanism comprising the following parts:

(1) A first rotational mechanism (as a first kinematic mechanism) 810 comprising: a shaft 811; a bearing housing 812 as mating parts; and a bearing configured to link the shaft 811 and the bearing housing 812 so that the shaft is constrained to rotate relative to the bearing housing around the axis of the shaft;

(2) A rotational motion mechanism 839 comprising: a support component 892; a shaft 831; a connector 833 configured to rigidly join the shafts 811 and 831; and a motor 832 mounted on the support component 892 wherein the motor 832 is configured to drive a rotation in the shaft 831 around the axis of the shaft 831; wherein the axis of the shaft 831 is fixed relative to the support component;

(3) A connection mechanism comprising: (a) an elastic connector 820 which is a spring which is hooked to the support component 892; (b) an additional connector 891 configured to rigidly, fixedly or otherwise connect the bearing housing 812 as a first mating part of the first rotational mechanism, a hook of said elastic connector 820, and the cooking container 109, as to restrict the movement of the connector 891 and hence that of the cooking container 109.

In the apparatus 800, the axes of the shafts 811 and 831 may optionally be co-planar.

The stirring motion mechanism of the cooking apparatus 800 can produce a cyclic motion of the cooking container 109 as to stir, mix or distribute food or food ingredients held in the cooking container.

It should be noted that the connection mechanism connects the connector 891 to the support component 892, wherein the connector 891 is rigidly or fixedly connected to the first mating part 812 of the first kinematic mechanism. The motion of the connector 891 relative to the support component 892 is constrained by the connection mechanism. Thus, the motion of the first mating part 812 relative to the support component is also constrained.

It should be noted that no component of the connection mechanism in the apparatus 800 is fixedly connected to the second mating part of the first rotational mechanism 810. The connection mechanism may still restrict the motion of the connector 891 (and of the cooking container 109) even if the first rotational mechanism 810 is removed in the apparatus.

It should be noted that the elastic connector 820 in the cooking apparatus may be substituted by any non-rigid connector, such as a loose rope with ends tied to the connector 891 and to the support component 892, or a loose connector such as a chain with ends hooked to the connector 891 and to the support component 892.

Figure 14:
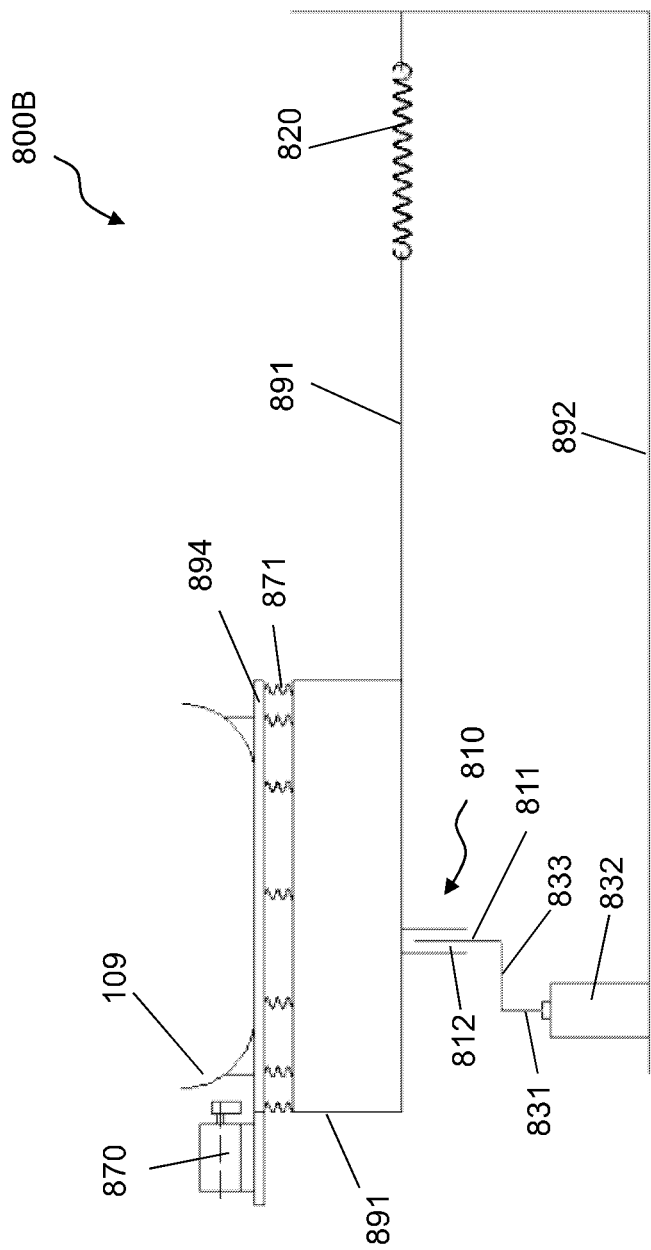
FIG. 14 shows another automated cooking apparatus including a mechanism for vibrating the cooking pan.

In some embodiments, referring to FIG. 14, an automated cooking apparatus 800B comprises a frame 894 which is rigidly connected to a cooking container 109, and an elastic connection comprising springs 871 joining the frame 894 and a connector 891. A motion mechanism and connection mechanism identical to that in the automated cooking apparatus 800 moves the connector 891. A mechanism 870 is mounted on the frame 894 to produce vibration in the cooking container 109.

It should be noted that, the mechanism 870 in the apparatus 800B may be removed from the apparatus in some applications.

Figure 15A:
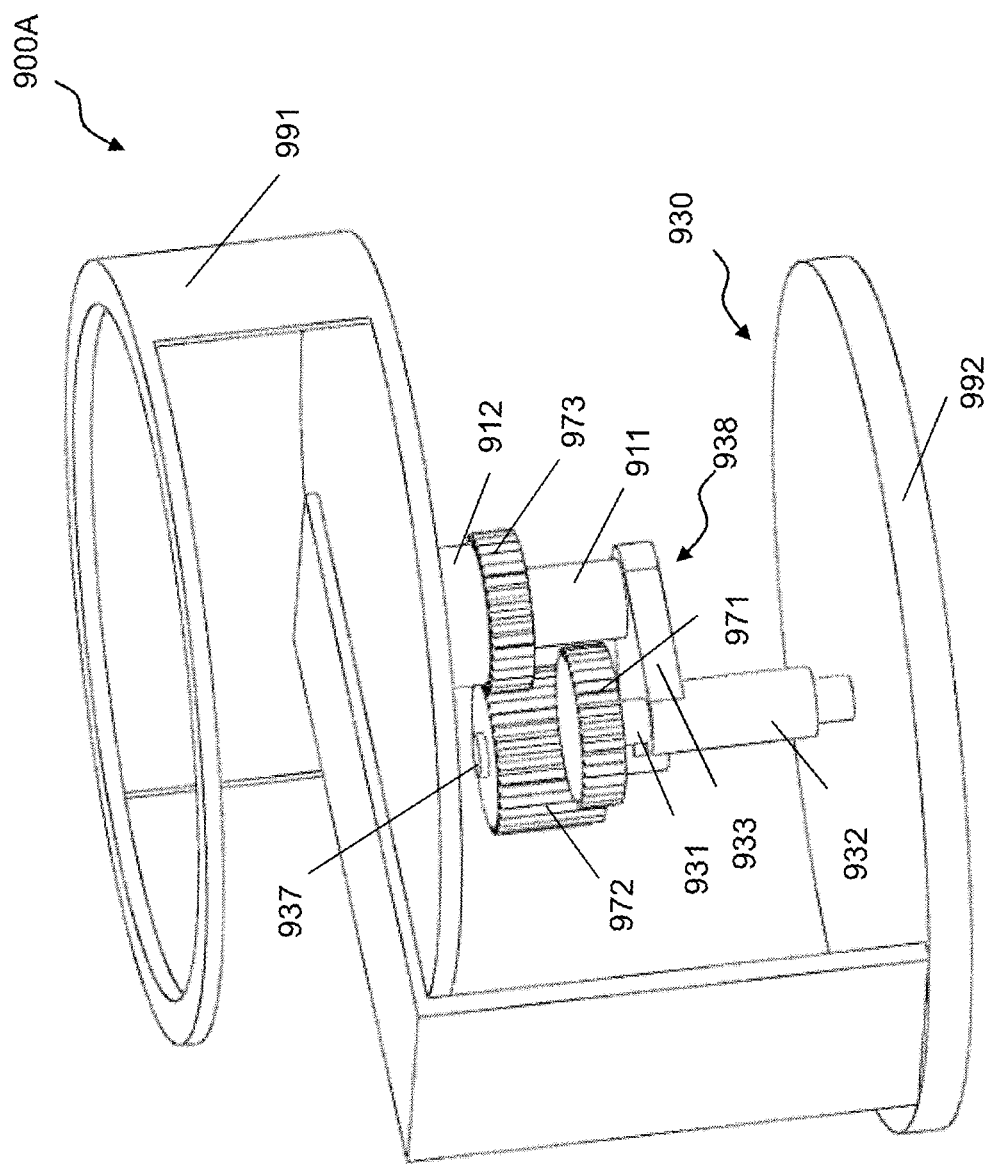
FIG. 15A shows an automated cooking apparatus that can produce circular movements with no self-rotation in a cooking pan.
Figure 15D:
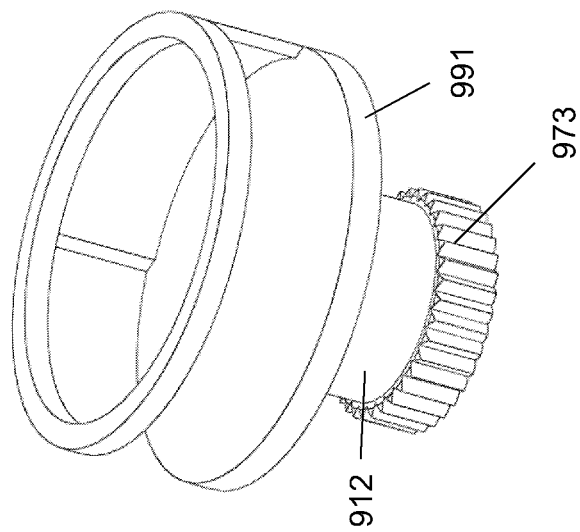
FIGS. 15B-15D are perspective views of components in the automated cooking apparatus shown in FIG. 15A.
Figure 15C:
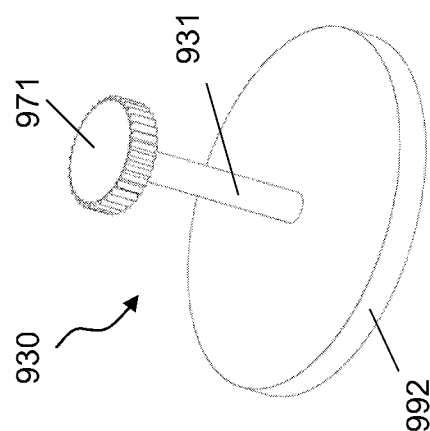

In some embodiments, referring to FIGS. 15A-15D, an automated cooking apparatus 900A comprises: a cooking container (not shown in Figures); and a stirring motion mechanism comprising the following parts:

(1) A first rotational mechanism, as a first kinematic mechanism, comprising: a shaft 911; a bearing housing 912 as mating parts; and a pair of bearings (hidden in FIG. 15A) configured to link the shaft 911 and bearing housing 912 so that the shaft is constrained to rotate relative to the bearing housing around the axis of the shaft;

(2) A motion mechanism comprising: (a) a rotational mechanism comprising a shaft 931 and a bearing housing 932 as mating parts, and two bearings (hidden in Figure) configured to link the shaft 931 and bearing housing 932 so that the shaft is constrained to rotate relative to the bearing housing around the axis of the shaft; wherein the bearing housing 932 is rigidly connected to shaft 911, the second mating part of the first rotational mechanism; (b) a support component 992 configured to be rigidly connected to the shaft 931 (FIG. 15C); (c) a motor or motorized mechanism (not shown in Figure) configured to produce a rotation in the bearing housing 932 around the axis of the shaft 931, relative to the support component 992; wherein the axis of the shaft 931 is fixed relative to the support component. The motion mechanism moves the shaft 911 by a rotational movement around the axis of the shaft 931, relative to the support component 992.

Figure 15B:
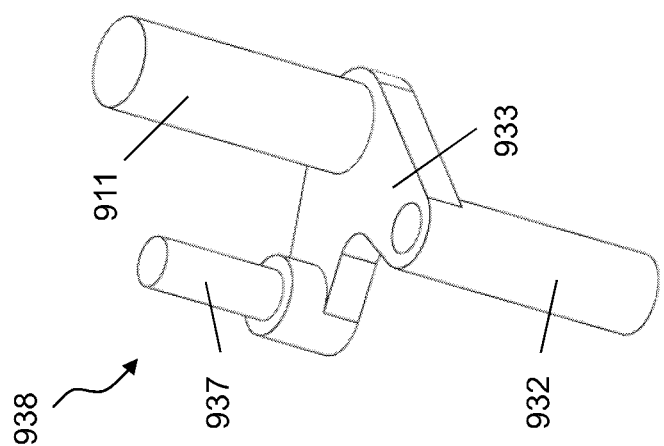

(3) A transmission mechanism comprising: (a) a gear 971 configured to be fixedly connected to, and concentric with the shaft 931 (FIG. 15C); (b) a gear 973 configured to be fixedly connected to, and concentric with the bearing housing 912 (FIG. 15D); (c) a shaft 937 and a connector 933 configured to rigidly connect the shaft 937 with the bearing housing 932 and the shaft 911 (FIG. 15B); (d) an axial rotational mechanism comprising a gear 972 and the shaft 937 as mating parts, such that the gear 972 is constrained to rotate around the axis of the shaft 937, relative to the shaft (FIG. 15A); wherein the gear 972 is engaged with the gear 971, and the gear 972 is engaged with the gear 973. The axes of the shafts, 911, 931 and 937, and the axis of the gears 971, 972 and 973 are either configured to be parallel to each other or configured to intersect at a same point.

(4) A connector 991 which is configured to rigidly or fixedly connect the bearing housing 912, as a first mating part of the first rotational mechanism, and the cooking container (not shown in Figures).

In some important applications, the gears 973 and 971 in the apparatus 900A may be configured to have the same diameter (equivalently, the same number of teeth) so that they may rotate by a same speed relative to the connector 933, or equivalently, relative to the shaft 911. When the motor produces a rotation of the bearing housing 932 around the axis of the shaft 931, the connector 991 (and hence the cooking container) makes a circular movement with no self-rotation.

It should be noted that the distance between the axes of the shafts 911 and 931 in the apparatus 900A may be configured to be properly small, so the cooking container as a whole is displayed by a small distance and by a small inclination change. On the other hand, the rotation speed of the motor driving the axial rotation of the bearing housing 932 may be properly large, as to produce a properly large acceleration in the movement of any point on the internal surface of the cooking container.

As the motion mechanism in the apparatus 900A produces an axial rotation in the second mating part 911 of the first rotational mechanism, the support component 992 is thus rotated relative to the second mating part 911 of the first rotational mechanism by the motion mechanism. The axis of the rotation is the same as the axis of the shaft 931, not the axis of the shaft 911. The transmission mechanism links the rotation of the first mating part 912 of the first rotational mechanism relative to the second mating part 911 of the first rotational mechanism with the rotation of the support component 992 relative to the second mating part 911 of the first rotational mechanism.

It should also be noted the gears 971 and 973 in the apparatus 900A may both be external gears, in which case, the gear 972 may be either an external or an internal gear. In some applications, the gears 971 and 973 may be both internal gears, in which case, the gear 972 may be an external gear. A gear here may be of any type, including but not limited to involute gears, roller gears, needle gears, etc.

The stirring motion mechanism of the cooking apparatus 900A can produce a motion in the cooking container as to stir, mix or distribute food or food ingredients held in the cooking container.

Figure 16:
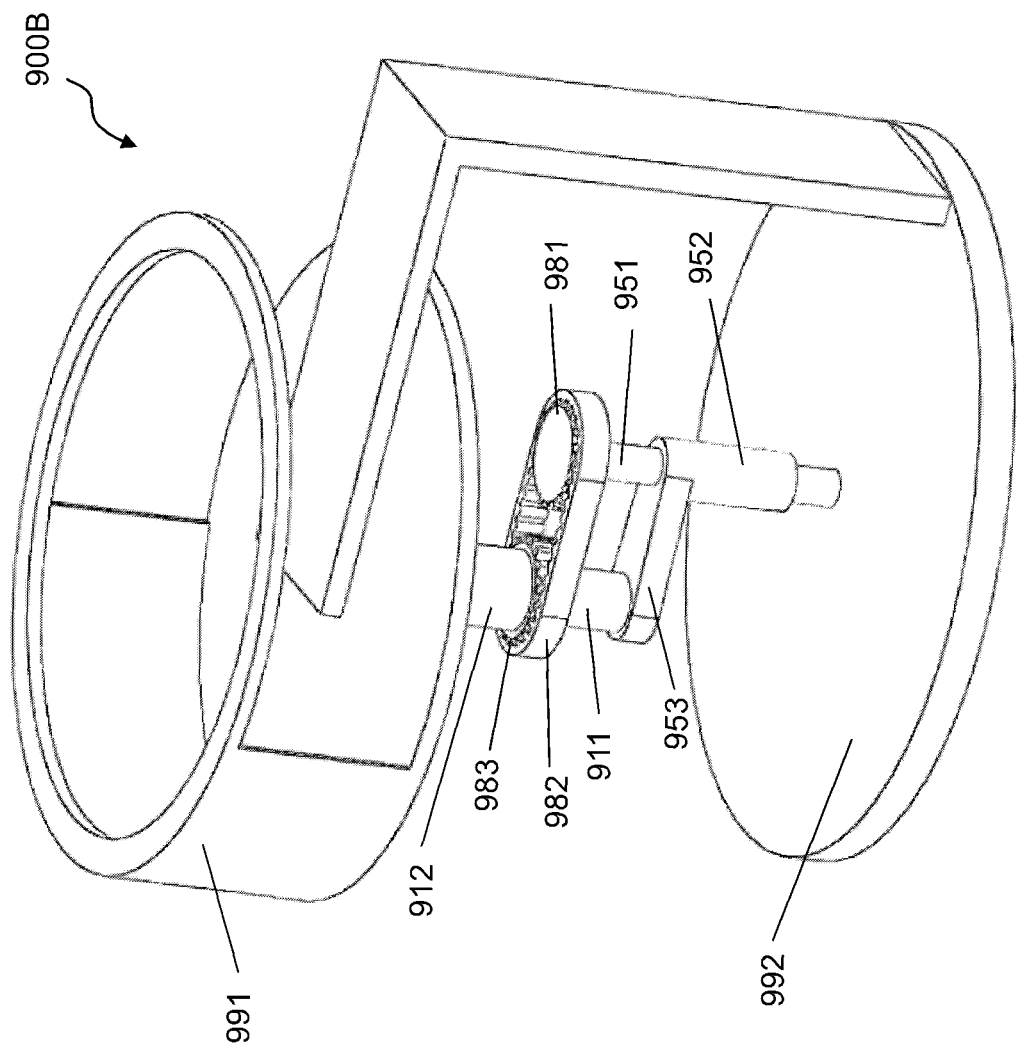
FIG. 16 shows an automated cooking apparatus similar to that in FIG. 15A.

In some embodiments, referring to FIG. 16, an automated cooking apparatus 900B includes a cooking container (not shown in Figure); and a stirring motion mechanism comprising the following parts:

(1) A first rotational mechanism, as a first kinematic mechanism, comprising a shaft 911 and a bearing housing 912 as mating parts, and two bearings (hidden in Figure) configured to link the shaft 911 and bearing housing 912 so that the shaft is constrained to rotate relative to the bearing housing around the axis of the shaft;

(2) A motion mechanism comprising: (a) a rotational mechanism comprising a shaft 951 and a bearing housing 952 as mating parts, and two bearing (hidden in Figure) configured to link the shaft 951 and bearing housing 952 so that the shaft is constrained to rotate relative to the bearing housing around the axis of the shaft; (b) a rigid connector 953 configured to connect the bearing housing 952 with the shaft 911, as the second mating part of the first rotational mechanism; (c) a support component 992 configured to be rigidly connected to the shaft 951; (d) a motor (not shown) configured to drive the rotation of the bearing housing 952 around the axis of the shaft 951, relative to the support component 992. The motion mechanism moves the shaft 911 by a rotational movement around the axis of the shaft 951, relative to the support component 992.

(3) A transmission mechanism comprises: (a) a belt wheel 981 configured to be rigidly connected to, and concentric with the shaft 951; (b) a belt wheel 983 configured to be rigidly connected to, and concentric with the bearing housing 912; (c) a timing belt 982 configured to envelope the belt wheels 981 and 983 as to link their rotations. The shafts 911 and 951, and hence the belt wheels 983 and 981 have parallel axes. The motion mechanism produces a rotation in the bearing housing 952 around the axis of the shaft 951, relative to the support component 992.

(4) A connector 991 which is configured to rigidly or fixedly connect the bearing housing 912, as a first mating part of the first rotational mechanism, and the cooking container (not shown in Figures).

In some important applications, the belt wheels 981 and 983 may be configured to have identical radius. Then the speeds of rotation of the shaft 951 and of the bearing housing 911, relative to the connector 953 (or equivalently, relative to the shaft 911) are equal to each other. The connector 991 (and hence the cooking container) may make a circular movement without any self-rotation.

It should be noted that the distance between the axes of the shafts 911 and 951 in the apparatus 900B may be configured to be properly small, so the cooking container as a whole is displayed by a small distance and by a small inclination change. On the other hand, the rotation speed of the motor driving the axial rotation of the bearing housing 952 may be properly large, as to produce a properly large acceleration in the movement of any point on the internal surface of the cooking container.

It should be noted that the transmission mechanism in the apparatus 900B links the axial rotation of the first mating part 912 of the first rotational mechanism relative to the second mating part 911 of the first rotational mechanism with the axial rotation of the support component 992 relative to the second mating part 911 of the first rotational mechanism; where the relative rotation between the support component 992 and the second mating part 911 is produced by the motion mechanism.

The stirring motion mechanism of the cooking apparatus 900B can produce a motion in the cooking container as to stir, mix or distribute food or food ingredients held in the cooking container.

In some embodiments, referring to FIGS. 17A-17B, an automated cooking apparatus 700 comprises a cooking container 109 and a stirring motion mechanism comprising the following parts:

(1) A spherical motion mechanism (as a first rotational mechanism, or a first kinematic mechanism) 710 comprising a ball 711 and a cap 712 as mating parts, and a connection configured to constrain the ball 711 and cap 712 to a rotational around the center of the ball 711; wherein the rotation may not necessarily be axial;

(2) A rotational motion mechanism 739 comprises support component 792, a shaft 731, and a motor 732 mounted on the support component 792 configured rotate the shaft 731 around the axis of the shaft 731, relative to the support component 792; wherein the shaft 731 and the cap 712 are rigidly connected.

(3) A connection mechanism 749 comprising: (a) an axial rotational mechanism (as a second kinematic mechanism) 720 comprising a shaft 721, a bearing housing 722 and a bearing (now shown in Figure) configured to link the shaft 721 and bearing housing 722 so that the shaft is constrained to rotate relative to the bearing housing around the axis of the shaft; (b) a connector 791 configured to rigidly, fixedly, or otherwise connect the ball 711 which is a first mating part of the first rotational mechanism, the bearing housing 722 which is a first mating part of the second kinematic mechanism, and the cooking container 109; (c) an axial rotational mechanism (as a third kinematic mechanism) comprising a shaft 741, a bearing housing 742 and a bearing configured to link 741 and 742 so that the shaft is constrained to rotate relative to the bearing housing around the axis of the shaft; and (d) a connector 743 configured to rigidly connect the shafts 721 and 741, and a rigid connection of the bearing housing 742 with the support component 792.

The distance from the center of the ball 711 to the axis of the shaft 731 is smaller than the distance between the axes of the shafts 721 and 741. The motion mechanism 739 can produce a rotational movement of the cap 712 around the axis of the shaft 731. The connection mechanism 749 allows a rotation of the shaft 721 around the axis of the shaft 741.

It should be noted that the distance between the center of the ball 711 and the axis of the shaft 731 may be configured to be properly small, so the cooking container as a whole is displayed by a small distance and by a small inclination change. On the other hand, the rotation speed of the motor 732 may be properly large, as to produce a properly large acceleration in the movement of any point on the internal surface of the cooking container.

The stirring motion mechanism of the cooking apparatus 700 can produce a cyclic motion of the cooking container 109 as to stir, mix or distribute food or food ingredients held in the cooking container.

It should be noted the connection mechanism 749 connects the connector 791 to the support component 792, wherein the connector 791 is rigidly or fixedly connected to the mating part 711 of the first rotational mechanism. The motion of the connector 791 relative to the support component 792 is constrained by the connection mechanism. Thus, the motion of the mating part 711 relative to the support component is also constrained.

In apparatus 700, the spherical joint 710 (comprising the ball 711 and cap 712 as mating parts) may be substituted by a universal joint.

In apparatus 700, the spherical joint 710 may also be substituted by other type of spherical joint, such as a spherical rolling joint. The spherical joint 710 may be substituted by any rotational mechanism comprising two mating parts and a mechanism configured to constrain the mating parts to a rotation around a point.

Figure 18:
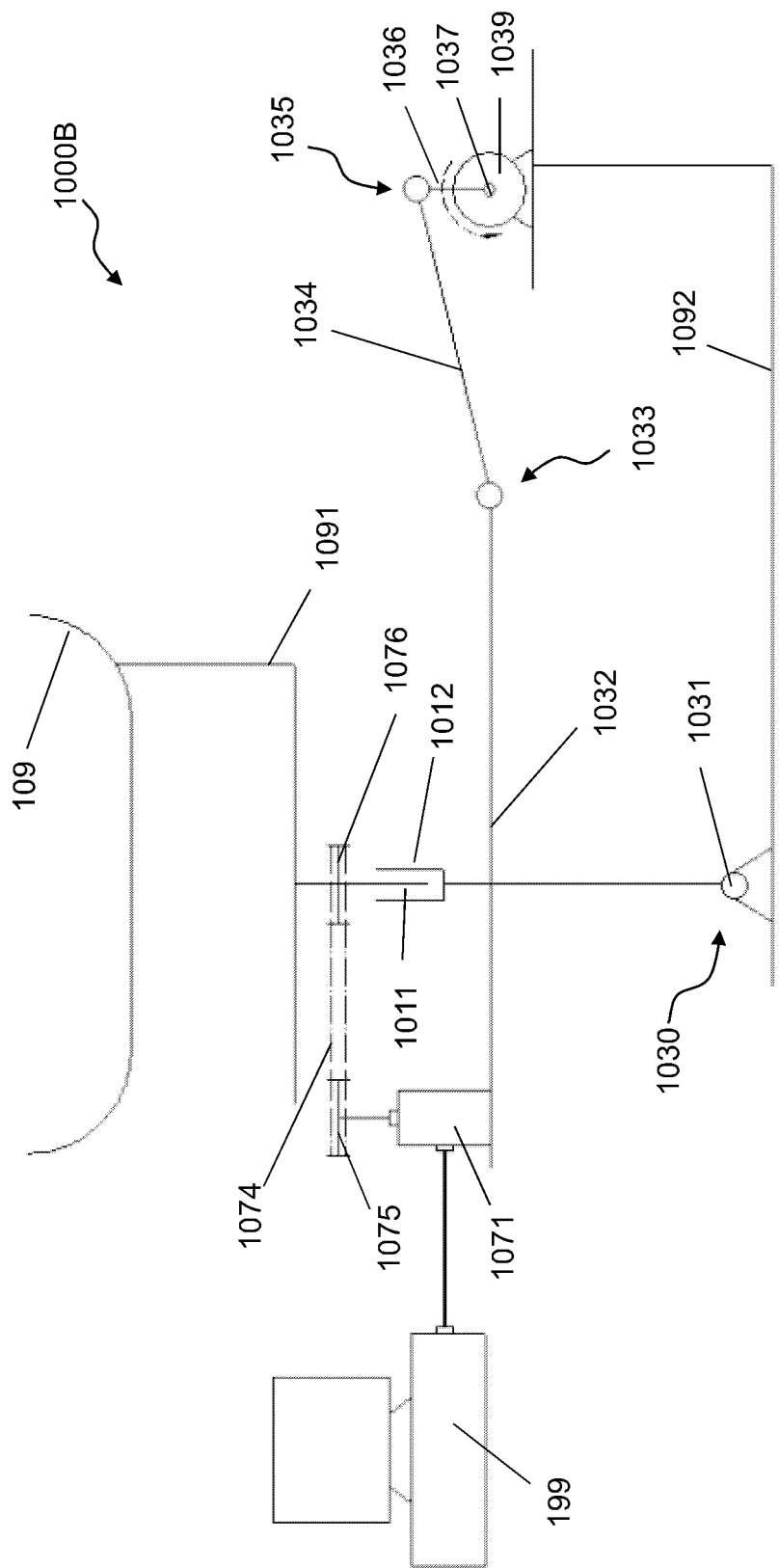
FIG. 18 shows a side view of an automated cooking apparatus that can produce a combination of oscillatory movements and a controlled self-rotation in a cooking pan.

In some embodiments, referring to FIG. 18, an automated cooking apparatus 1000B includes a cooking container 109 and a stirring motion mechanism comprising the following parts:

(1) A first rotational mechanism (as a first kinematic mechanism) comprising a shaft 1011 and a bearing housing 1012 as mating parts and a bearing (not shown in Figure) configured to link the shaft 1011 and bearing housing 1012 so that the shaft is constrained to rotate relative to the bearing housing around the axis of the shaft;

(2) A first motion mechanism comprising: (a) a frame 1032 configured to be rigidly connected to the second mating part 1012 of the first rotational mechanism; (b) a support component 1092; (c) an axial rotational mechanism 1030 configured to link the frame 1032 and the support component 1092 (so the frame 1032 is rotatable relative to the support component 1092 around the axis of the rotational mechanism 1030); (d) a first connector 1032 and an axial rotational mechanism 1033 configured to link the frame 1032 and the connector 1034; (e) a second connector 1036 and an axial rotational mechanism 1035 configured to link the connectors 1036 and 1034; (f) a shaft 1037 configured to be rigidly connected to the connector 1036; (g) a motor 1039 mounted on the support component 1092, configured to produce a rotation in the shaft 1037 around the axis of the shaft 1037. The axes of the rotational mechanisms 1030, 1033 and 1035 and the axis of the shaft 1037 are configured to be parallel to each other; and the distance between the axis of the rotational mechanism 1035 and the axis of the shaft 1037 is shorter than the distance between the axes of the rotational mechanisms 1035 and 1033. As the motor 1039 produces a continuous rotation in the shaft 1037, the axis of the rotational mechanism 1035 makes a rotational movement around the axis of the shaft 1037, resulting in an oscillatory rotation of the frame 1032 around the axis of the rotational mechanism 1030.

(3) a second motion mechanism comprising: (a) a belt wheel 1076 which is fixedly connected, and concentric with the shaft 1011; (b) a belt wheel 1074; (c) a motor 1071, mounted on the frame 1032, is configured to produce a rotation in the belt wheel 1075; wherein the axis of the belt wheel 1075 is configured to be parallel to the axis of the belt wheel 1076; (d) a belt 1074 configured to envelope the belt wheels 1075 and 1076 as to link their rotations. A computer 199 is configured to control the motors 1071 and 1039;

(4) A connector 1091 which is configured to rigidly, fixedly, or otherwise connect the shaft 1011 as the first mating part of the first rotational mechanism and the cooking container 109.

The stirring motion mechanism of the cooking apparatus 1000B can produce a combination of an oscillatory movement and a rotation in the cooking container 109 as to stir, mix or distribute food or food ingredients held in the cooking container.

In the apparatus 1000B, the distance between the axes of the shafts 1035 and 1037 may be configured to be properly small. A point of the internal surface of the cooking container intersected with the axis of the shaft 1011 may be a center point of the cooking container. Then the center point is displaced by a properly small distance and by a small inclination change. On the other hand, the rotation speed of the motor 1039 may be properly large, as to produce a properly large acceleration in the movement of any point on the internal surface of the cooking container.

Usually the frequency of the rotational motion of the cooking container around the shaft 1011 produced by the motor 1071 in the apparatus 1000B may be much smaller compared with the frequency of the oscillation produced by the motor 1039. The rotational oscillation produced by the motor 1039 can cause acceleration in the cooking container for the purpose of stirring and mixing the food ingredients contained in the cooking container. The movement directions of the rotational oscillations are constant (in time) relative to the support component 1092 but are changing relative to the cooking container due to the controlled self-rotation driven by the motor 1071. Thus, the food ingredients may be evenly stirred and mixed without accumulation along any particular direction.

The axis of the rotational mechanism 1030 may be horizontal. In other applications, the axis of the rotational mechanism 1030 may be vertical or in other direction; and be positioned by some horizontal distance away from a center point of a cooking container 109.

Figures 19A, 19B:
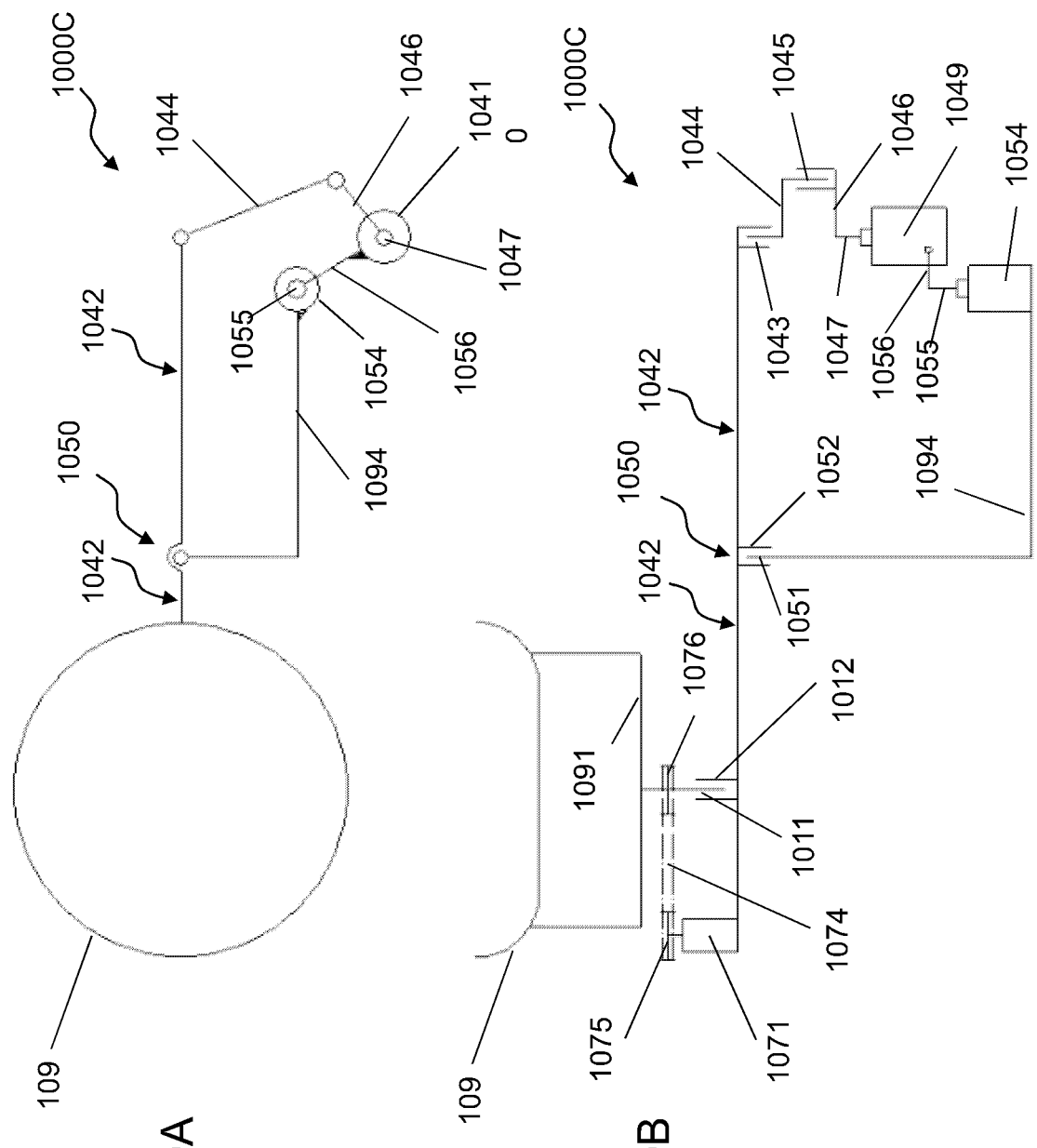
FIGS. 19A-19B respectively show top and side views of another automated cooking apparatus that can produce a combination of oscillatory movements and a controlled self-rotation in a cooking pan, where the amplitude of the oscillation may be further adjusted.

In some embodiments, referring to FIGS. 19A-19B, an automated cooking apparatus 1000C comprises a cooking container 109 and a stirring motion mechanism comprising following parts:

(1) A first rotational mechanism (as a first kinematic mechanism) comprising a shaft 1011 and a bearing housing 1012 as mating parts so that the shaft is constrained to rotate relative to the bearing housing around the axis of the shaft;

(2) A connector 1091 which is configured to rigidly or fixedly connect the shaft 1011, as the first mating part of the first rotational mechanism and the cooking container 109;

(3) A first motion mechanism comprising: (a) a frame 1042 configured to be rigidly connected to the second mating part 1012 of the first rotational mechanism; (b) a support component 1094; (c) an axial rotational mechanism 1050 comprising a shaft 1051 and bearing housing 1052 as mating parts so that the shaft is constrained to rotate relative to the bearing housing around the axis of the shaft, wherein the bearing housing 1052 is configured to be rigidly connected to the frame 1042 and the shaft 1051 is rigidly connected to the support component 1094 (so the frame 1042 is rotatable relative to the support component 1094 around the axis of the rotational mechanism 1050); (d) connectors 1044 and 1046; (e) an axial rotational mechanism comprising a shaft 1043 and a bearing housing as mating parts so that the shaft is constrained to rotate relative to the bearing housing around the axis of the shaft, wherein the bearing housing is rigidly connected to the frame 1042 and the shaft 1043 is configured to be rigidly connected to the connector 1034; (0 an axial rotational mechanism comprising a shaft 1045 and a bearing housing as mating parts so that the shaft is constrained to rotate relative to the bearing housing around the axis of the shaft, wherein the bearing housing is configured to be rigidly connected to the connector 1046 and the shaft 1045 is configured to be rigidly connected to the connector 1044; (g) a shaft 1047 configured to be rigidly connected to the connector 1046; (h) a motor 1048 comprising a support base, configured to produce a rotation in the shaft 1047 around the axis of the shaft 1047, relative to the support base; (i) a shaft 1055 and a connector 1056 configured to rigidly connect the shaft 1055 with the support base of the motor 1047; (j) a second motor 1054 mounted on the support component 1094, wherein the second motor 1054 is configured to produce or brake a rotation of the shaft 1055 around the axis of the shaft 1055, relative to the support component 1094. All shafts 1051, 1043, 1045, 1047 and 1055 have parallel axes; and the distance between the axes of the shafts 1045 and 1047 is shorter than the distance between the axes of the shafts 1045 and 1043.

(4) A second motion mechanism comprises: (a) a belt wheel 1076 mounted on the shaft 1011, where the belt wheel 1076 is concentric with the shaft 1011; (b) a belt wheel 1075; (c) a motor 1071 mounted on the frame 1042, wherein the motor 1071 is configured to rotate the belt wheel 1075 around the axis of the belt wheel 1075; wherein the belt wheel 1075 and the belt wheel 1076 are configured to have parallel axes; (d) a belt 1074 configured to envelope the belt wheels 1075 and 1076 as to link their axial rotations.

As the motor 1049 rotates the shaft 1047 in the apparatus 1000C, the shaft 1045 makes a rotational movement around the axis of the shaft 1047, which in turn drives the frame 1042 to oscillate around the axis of the shaft 1051, resulting in an oscillation in the shaft 1011 and hence in the cooking container. The motor 1054 is used to change the position of the support base of the motor 1049, as to adjust the amplitude of the oscillatory movement of the cooking container. To achieve an oscillatory movement of fixed amplitude, the motor 1054 must not move the shaft 1055, so the support component of the motor 1049 would stay fixed relative to the support component 1094.

It should be noted that the distance between the axes of the shafts 1045 and 1047 in the apparatus 1000C may be configured to be properly small. Except the rotation around the bearing housing 1012 produced by the motor 1071, the cooking container as a whole may be displayed by a small distance and by a small inclination change. On the other hand, the rotation speed of the motor 1049 may be properly large, as to produce a properly large acceleration in the movement of any point on the internal surface of the cooking container.

Although this is not a requirement, the cooking container 109 in the cooking apparatus 1000B or 1000C may be further configured to have a central axis so that the cooking container is rotationally symmetric around the central axis; and the axis of the shaft 1011 may be configured to coincide with the central axis.

Figure 20:
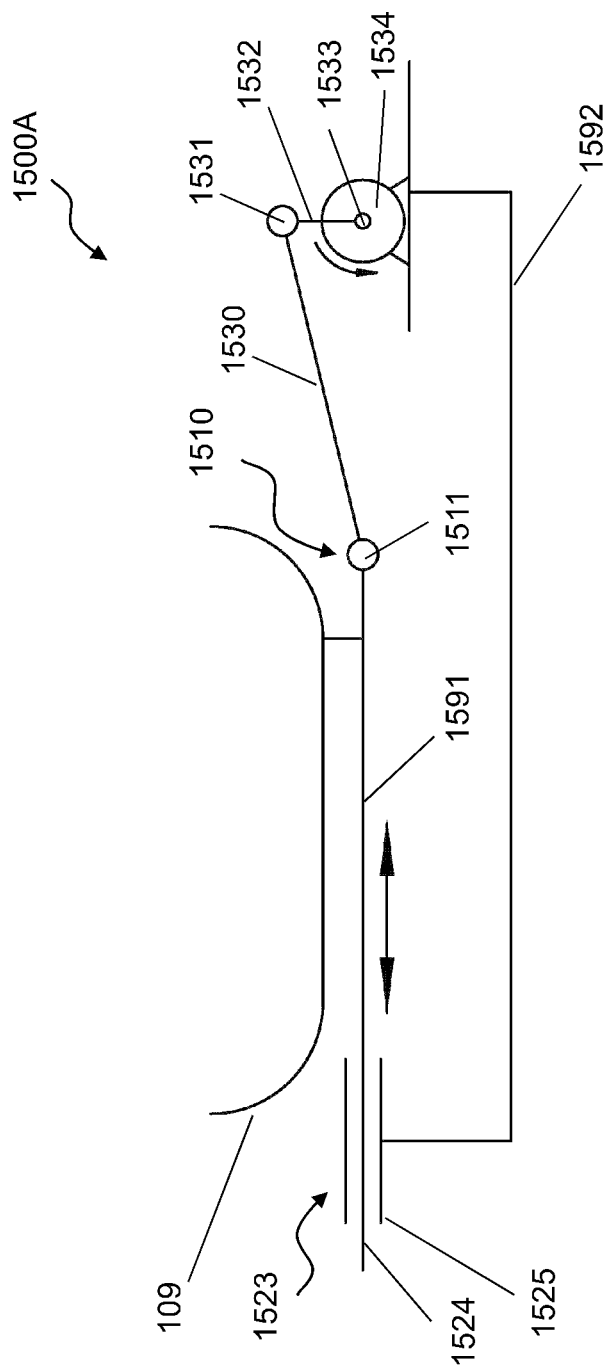
FIG. 20 shows a side view of an automated cooking apparatus that can produce linear oscillations in a cooking pan.

In some embodiments, referring to FIG. 20, a cooking apparatus 1500A comprises a cooking container 109 and a stirring motion mechanism comprising following parts:

(1) A first rotational mechanism 1510 comprising a shaft and a bearing housing, wherein the movement of the shaft relative to the bearing housing is constrained to be a rotation around the axis of the shaft;

(2) A motion mechanism comprises: (a) a rotational mechanism 1531 comprising a first mating part and a second mating part; (b) a rigid connector 1530 joining the bearing housing, as a second mating part of the first rotational mechanism 1510 with the first mating part of the rotational mechanism 1531; (c) a connector 1532 which is rigidly connected to the second mating part of the rotational mechanism 1531; (d) a shaft 1533 which is rigidly connected to the connector 1532; (e) a support component 1592, (f) a motor 1534 mounted on the support component 1592, wherein the motor 1534 is configured to rotate the shaft 1533 around the axis of the shaft 1533, relative to the support component 1592. The rotational mechanisms 1510 and 1531 and the shaft 1533 are configured to have parallel axes; and the distance between the axis of the rotational mechanism 1531 and the axis of the shaft 1533 is configured to be shorter than the distance between the axes of the rotational mechanisms 1531 and 1510;

(3) A connection mechanism comprising: (a) a sliding pair 1523 (as a second kinematic mechanism) comprising a linear or curved track 1524 and a slider 1525 configured to slide on the track 1524, (b) a connector 1591 which is configured to rigidly, fixedly, or otherwise connect the track 1524 which is a first mating part of the sliding pair 1523, the shaft which is a first mating part of first rotational mechanism 1510, and a cooking container 109; (c) a rigid component of the slider 1525 is rigidly connected to the support component 1592. The movement directions of the sliding pair 1523 are configured to be perpendicular to the axes of the rotational mechanisms 1511 and 1531. The connection mechanism constrains the connector 1591 to a linear movement relative to the support component 1592. The motor 1533 produces a rotational movement of the axis of the rotational mechanism 1531 around the axis of the shaft 1533, which in turn, oscillates the connector 1591 and the cooking container 109.

The distance between the axis of the rotational mechanism 1531 and the axis of the shaft 1533 in the apparatus 1500A may be configured to be properly small, so that the cooking container as a whole is displayed by a small distance and by small or no inclination change. On the other hand, the rotation speed of the motor 1534 may be properly large, as to produce a properly large acceleration in the movement of any point on the internal surface of the cooking container.

The stirring motion mechanism of the cooking apparatus 1500A can produce a motion of the cooking container 109 as to stir, mix or distribute food or food ingredients held in the cooking container. It should be noted the connection mechanism connects the connector 1591 to the support component 1592, wherein the connector 1591 is rigidly or fixedly connected to the first mating part of the first rotational mechanism 1510. The motion of the connector 1591 relative to the support component 1592 is constrained by the connection mechanism. Thus, the motion of said first mating part relative to the support component is also constrained.

Figure 21:
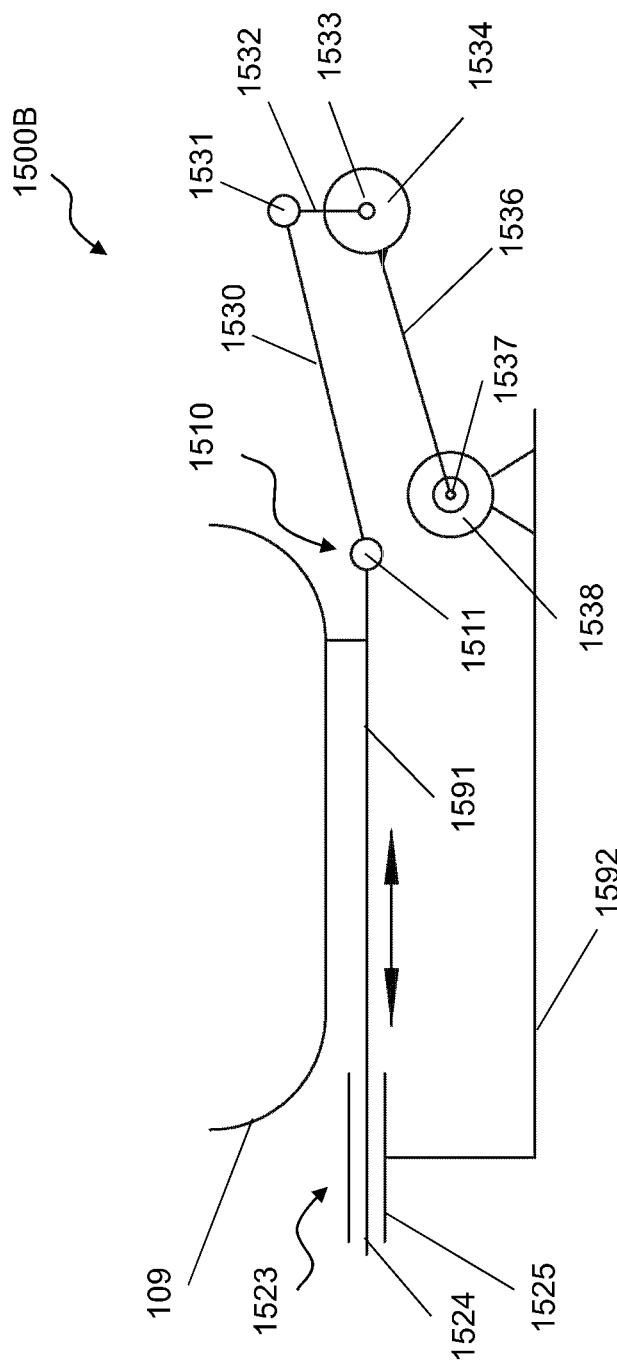
FIG. 21 shows a side view of an automated cooking apparatus that can produce linear oscillations in a cooking pan where amplitude of the oscillations can be adjusted.

In some embodiments, referring to FIG. 21, a cooking apparatus 1500B is built from the cooking apparatus 1500A by further adding an adjustment mechanism. The cooking apparatus 1500B comprises a cooking container 109 and a stirring motion mechanism comprising following parts:

(1) A first rotational mechanism 1510 comprising a shaft and a bearing housing, wherein the movement of the shaft relative to the bearing housing is constrained to be a rotation around the axis of the shaft;

(2) A motion mechanism comprising: (a) a rotational mechanism 1531 comprising a first mating part and a second mating part; (b) a rigid connector 1530 joining bearing housing, as a second mating part of the first rotational mechanism 1510 with the first mating part of the rotational mechanism 1531; (c) a connector 1532 which is rigidly connected to the second mating part of the rotational mechanism 1531; (d) a shaft 1533 which is rigidly connected to the connector 1532; (e) a motor 1534 comprising a support base, wherein the motor 1534 is configured to rotate the shaft 1533 around the axis of the shaft 1533, relative to the support base; (f) a shaft 1547 and a connector 1536 configured to rigidly connect the shaft 1547 with the support base of the motor 1534; (g) a support component 1592, and a motor 1538 configured to produce a rotation in the shaft 1547 around the axis of the shaft 1547, relative to the support component 1592. The rotational mechanisms 1511 and 1531 and the shafts 1533 and 1537 are configured to have parallel axes; and the distance between the axis of the rotational mechanism 1531 and the axis of the shaft 1533 is configured to be shorter than the distance between the axes of the rotational mechanisms 1531 and 1511.

(3) A connection mechanism comprising: (a) a sliding pair 1523 (as a second kinematic mechanism) comprising a linear or curved track 1524 and a slider 1525 configured to slide on the track 1524; (b) a connector 1591 which is configured to rigidly, fixedly, or otherwise connect the track 1524 which is a first mating part of the sliding pair 1523, the shaft which is a first mating part of first rotational mechanism 1510, and a cooking container 109; (c) a rigid component of the slider 1525 is rigidly connected to the support component 1592. The movement directions of the sliding pair 1523 are configured to be perpendicular to the axes of the rotational mechanisms 1511 and 1531. The connection mechanism constrains the connector 1591 to a linear movement relative to the support component 1592. The motor 1533 produces a rotational movement of the axis of the rotational mechanism 1531 around the axis of the shaft 1533, which in turn, oscillates the connector 1591 and the cooking container 109. A computer (not shown in figure) controls both motors 1534 and 1538. The motor 1538 is capable of braking the rotation of the shaft 1537 when needed. The motor 1538 is used to adjust the position of the support base of the motor, and thus adjust the amplitude of the oscillation of the shaft 1511 as driven by the motor 1534.

The distance between the axes of the shafts 1531 and 1533 in the apparatus 1500B may be configured to be properly small, so that the cooking container as a whole is displayed by a small distance and by no inclination change. On the other hand, the rotation speed of the motor 1534 may be properly large, as to produce a properly large acceleration in the movement of any point on the internal surface of the cooking container.

The stirring motion mechanism of the cooking apparatus 1500B can produce a motion of the cooking container 109 as to stir, mix or distribute food or food ingredients held in the cooking container.

It should be noted the connection mechanism connects the connector 1591 to the support component 1592, wherein the connector 1591 is rigidly or fixedly connected to the first mating part of the first rotational mechanism 1510. The motion of the connector 1591 relative to the support component 1592 is constrained by the connection mechanism. Thus, the motion of said first mating part relative to the support component is also constrained.

Figure 22:
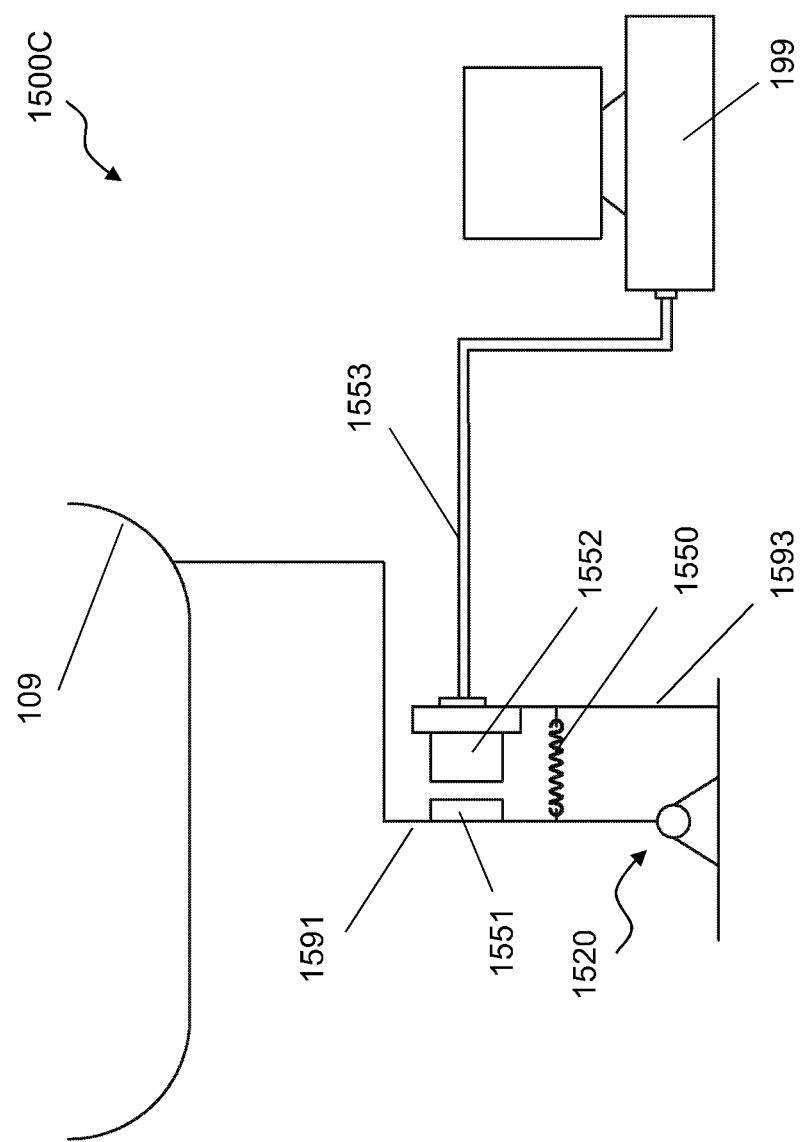
FIG. 22 shows a side view of an automated cooking apparatus that can produce rotational oscillations in a cooking pan.

In some embodiments, referring to FIG. 22, a cooking apparatus 1500C comprises a cooking container 109 and a stirring motion mechanism comprising following parts:

(1) A motion mechanism comprising: a support component 1593, a spring 1550 joining the connector 1591 with the support component 1593, an iron plate 1551 which is mounted on a connector 1591, and an electric magnet 1552 mounted on the support component 1993. The electric magnet 1552 applies a cyclic magnetic force on the iron plate 1551 to produce an oscillation in the iron plate.

(2) A connection mechanism comprises: (a) a rotational mechanism 1520 comprising a first mating part and a second mating part, wherein the second mating part is rigidly connected to the support component 1593; (b) a connector 1591 which is rigidly, fixedly, or otherwise connected to the first mating part of the rotational mechanism 1520 and a cooking container 109. The connection mechanism constrains the connector 1591 to rotate around the axis of rotational mechanism 1520. A computer 199 may be configured to controls a driver of the electric magnet through wires 1553 so that the magnitudes and frequencies of the oscillation may be adjusted.

The magnitudes of the oscillation of the electric magnet 1552 in the apparatus 1500C may be properly small, so that the cooking container as a whole is displayed by a properly small distance and by a small inclination change. The frequency of the oscillation may be properly large, as to produce a properly large acceleration in the movement of the internal surface of the cooking container.

The stirring motion mechanism of the cooking apparatus 1500C can produce a motion of the cooking container 109 as to stir, mix or distribute food or food ingredients held in the cooking container.

It should be noted the connection mechanism connects the connector 1591 to the support component 1593, wherein the connector 1591 is rigidly or fixedly connected to the first mating part of the first rotational mechanism 1520. The motion of the connector 1591 relative to the support component 1593 is constrained by the connection mechanism Thus, the motion of said first mating part relative to the support component is also constrained.

In some embodiments, referring to FIGS. 23A-23B, an automated cooking apparatus 1200 comprises a cooking container 109 and a stirring motion mechanism comprising following parts:

(1) A first rotational mechanism 1210 (as a first kinematic mechanism) comprising a shaft 1211 and a bearing housing 1212 as mating parts so that the shaft is constrained to rotate relative to the bearing housing around the axis of the shaft.

(2) A motion mechanism comprising: (a) a rotational mechanism 1245; (b) a rigid connector 1244 connecting the shaft 1211 with the first mating part of the rotational mechanism 1245; (c) a shaft 1247 and a connector 1246 which rigidly connects the shaft 1247 with the second mating part of the rotational mechanism 1245; (d) a motor 1249 comprising a support base, which is configured to rotate the shaft 1247 around the axis of the shaft 1247, relative to the support bases; (e) a shaft 1255 and a connector 1256 which rigidly connects the shaft 1255 with the support base of the motor 1249; (f) a support component 1292; (g) a motor 1254 mounted on the support component 1292 wherein the motor is configured to produce or brake a rotation in the shaft 1255 around the axis of the shaft 1255, relative to the support component 1292. The axes of the shafts 1251, 1211, 1247 and 1255, and the axis of the rotational mechanism 1245 are parallel to each other, and the distance between the axis of the rotational mechanism 1245 and the axis of the shaft 1247 is shorter than the distance between the axes of the rotational mechanisms 1245 and 1210.

(3) A connection mechanism comprising: (a) a second rotational mechanism 1250 (as a second kinematic mechanism) comprising a shaft 1251 and a bearing housing 1252 as mating parts so that the shaft is constrained to rotate relative to the bearing housing around the axis of the shaft, wherein the shaft 1251 is rigidly or fixedly connected to the support component 1292; (b) a connector 1291 which is rigidly or fixedly connected to the bearing housing 1252, as a first mating part of the second rotational mechanism 1250, the bearing housing 1211, as a first mating part of the first rotational mechanism 1210, and a cooking container 109. As the motor 1249 rotates the shaft 1247, the axis of the rotational mechanism 1245 makes a rotational movement around the axis of the shaft 1247; which in turn drives the connector 1291 to rotate back and forth around the axis of the shaft 1251, resulting in an oscillation in the cooking container 109. The motor 1254 is used to position the support base of the motor 1249, as to adjust the amplitude of the oscillatory movement produced by the motor 1249. To achieve an oscillatory movement of constant amplitude, the rotation of the shaft 1255 must be braked so the support base of the motor 1249 stays fixed relative to the support component 1292.

The distance between the axis of the rotational mechanism 1245 and the axis of the shaft 1247 in the apparatus 1200 may be configured to be properly small, so that the cooking container as a whole is displayed by a small distance and by a small inclination change during the movement. On the other hand, the rotation speed of the motor 1249 may be properly large, as to produce a properly large acceleration in the movement of any point on the internal surface of the cooking container.

The stirring motion mechanism of the cooking apparatus 1200 can produce a motion of the cooking container 109 as to stir, mix or distribute food or food ingredients held in the cooking container.

It should be noted that the connection mechanism connects the connector 1291 to the support component 1292, wherein the connector 1291 is rigidly or fixedly connected to the mating part 1212 of the first kinematic mechanism. The motion of the connector 1291 relative to the support component 1292 is constrained by the connection mechanism. Thus, the motion of the first mating part 1212 relative to the support component is also constrained.

Figure 24B:
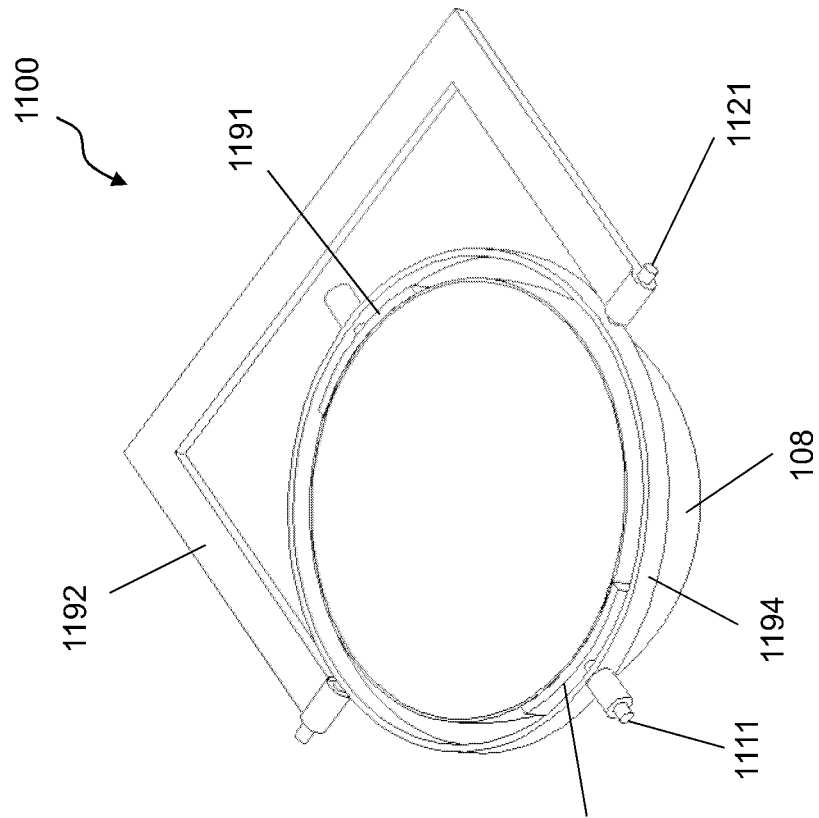
FIGS. 24A-24B respectively show top and aerial views of an automated cooking apparatus that can move a cooking pan by a composition of two oscillations.
Figure 24A:
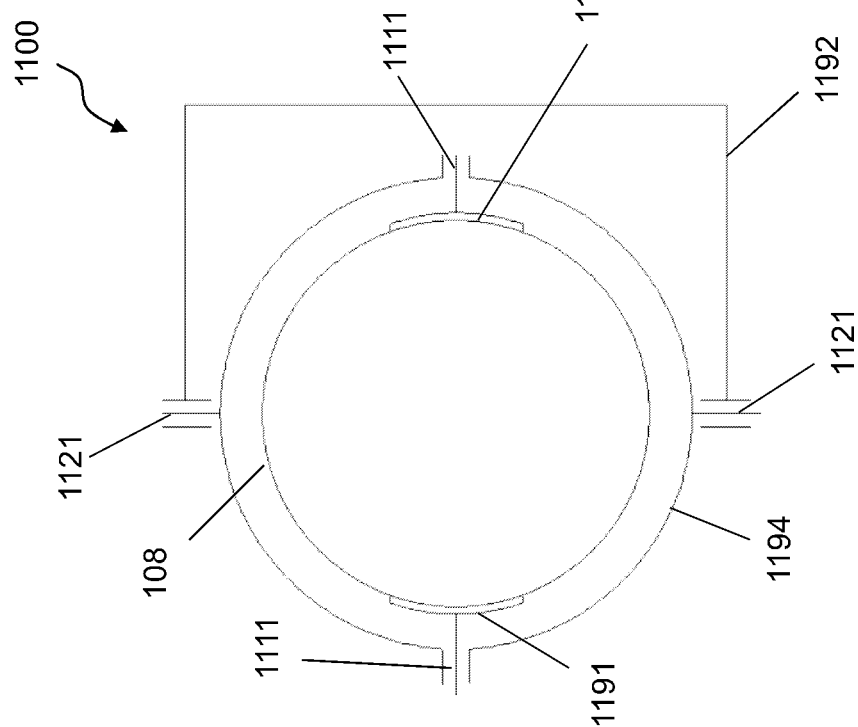

In some embodiments, referring to FIGS. 24A-24B, a cooking apparatus 1100 comprises a connector 1191 consisting of two curved plates attached to a cooking container 108 which is configured to contain or hold food or food ingredients during a cooking process. Two shafts 1111 of two first rotational mechanisms (as first kinematic mechanisms) are aligned along a same axis. The shafts 1111 are rigidly connected to the connector 1191. A frame 1194 rigidly joins the rotational mating parts of the shafts 1111 with the shafts 1121 of two other rotational mechanisms. The shafts 1121 have a same axis. The rotational mating parts of the shafts 1121 are rigidly connected to a support component 1192.

In the apparatus 1100, an oscillation motion mechanism mounted on the frame 1194 may produce a rotational oscillation of the shafts 1111 around their axis, and another oscillation motion mechanism mounted on the support component 1192 may produce a rotational oscillation of the shafts 1121 around their axis. The oscillations mechanisms may be powered by a pair of electric motors that are driven by drivers or controllers that produce some oscillatory electric currents for the motors, or by a pair of hydraulic, pneumatic, magnetic or other oscillators or vibrators (not shown in figure), and a computer (not shown in figure) may be used to control the magnitudes and frequencies of the oscillators. The magnitudes of the oscillations produced by both oscillation motion mechanisms in the apparatus 1100 may be configured to be properly small, so that the cooking container as a whole is displayed by a small distance and by a small inclination change during the oscillatory movements. On the other hand, the frequencies of the oscillations may be properly large, as to produce properly fast accelerations in the internal surface of the cooking container. It should be noted that in the special case when the shafts 1111 and 1121 intersect at a point, the cooking container makes spherical movements.

Figure 25A:
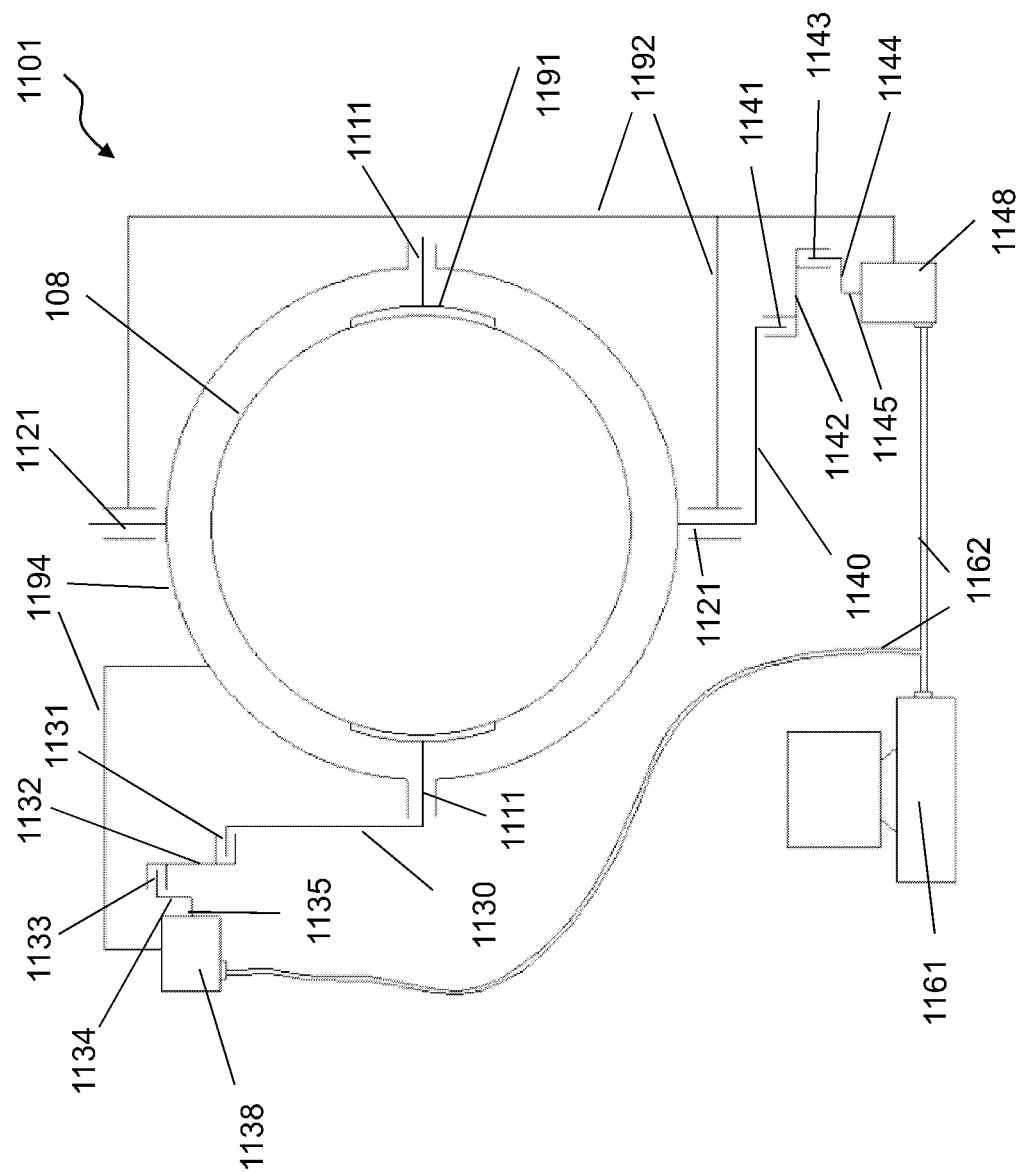
FIGS. 25A-25B respectively show top and aerial views of another automated cooking apparatus that can move the cooking pan by a composition of two oscillations.
Figure 25B:
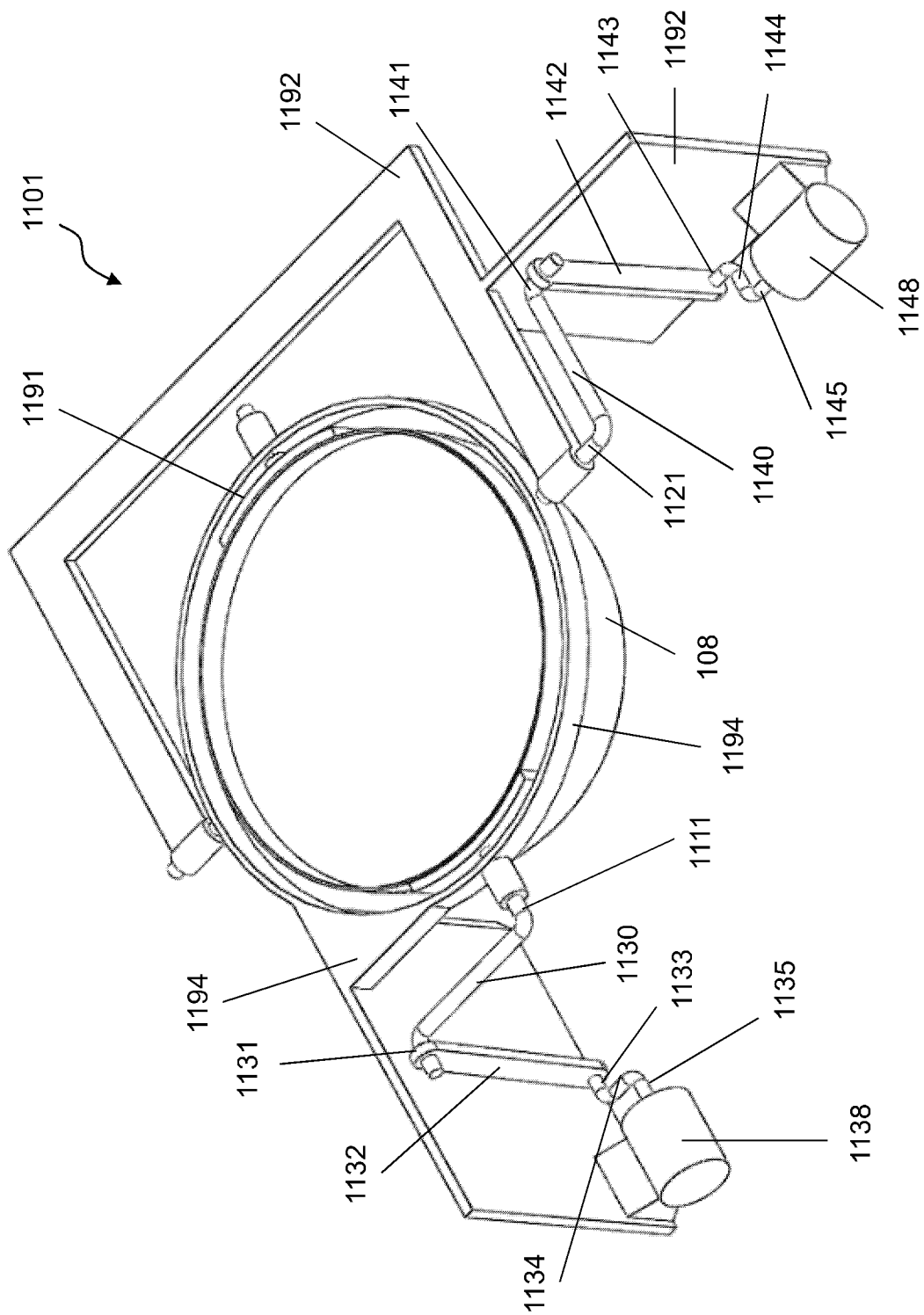

In some embodiments, referring to FIGS. 25A-25B, a cooking apparatus 1101 comprises a cooking apparatus 1100 and two crank-and-slider motion mechanisms.

The first crank-and-slider motion mechanism comprises: (1) a rotational mechanism comprising a shaft 1131 and a rotational mating part; (2) a rotational mechanism comprising a shaft 1133 and a rotational mating part; (3) a rigid connector 1130 which connects a shaft 1111 with the shaft 1131; (4) a rigid connector 1132 which connects the rotational mating part of the shaft 1131 with the rotational mating part of the shaft 1133; (5) a shaft 1135 and a rigid connector 1134 which connects the shafts 1133 and 1135; (6) a motor 1138 mounted on the frame 1194, wherein the motor 1138 is configured to rotate the shaft 1135 around the axis of the shaft 1135, relative to the frame 1194. The shafts 1111, 1131, 1133 and 1135 have parallel axes and the distance between the axes of the shafts 1133 and 1135 is shorter than the distance between the axes of the shafts 1133 and 1131. The continuous rotation of the shaft 1135 by the motor 1138 results in a back-and-forth movement of the shaft 1131 around the axis of the shaft 1111, which in turn oscillates the cooking container relative to the frame 1194.

The second crank-and-slider motion mechanism comprises: (1) a rotational mechanism comprising a shaft 1141 and a rotational mating part; (2) a rotational mechanism comprising a shaft 1143 and a rotational mating part; (3) a rigid connector 1140 which connects a shaft 1121 with the shaft 1141; (4) a rigid connector 1142 which connects the rotational mating part of the shaft 1141 with the rotational mating part of the shaft 1143; (5) a shaft 1145 and a rigid connector 1144 which connects the shafts 1143 and 1145; (6) a support component 1192; (7) a motor 1148 mounted on the support component 1192, wherein the motor 1148 is configured to rotate the shaft 1145 around the axis of the shaft 1145, relative to the frame 1192. The shafts 1121, 1141, 1143 and 1145 have parallel axes, and the distance between the axes of the shafts 1143 and 1145 is shorter than the distance between the axes of the shafts 1143 and 1141. The rotational movement of the shaft 1143 around the shaft 1145 translates into a back-and-forth rotation of the shaft 1141 around the shaft 1121, thus oscillating the frame 1194 around the shaft 1121. A computer 1161 is configured to control the motors 1138 and 1148 via wires 1162. When both motors make continuous rotations, the cooking container is moved by a composition of two rotational oscillations.

In the apparatus 1101, the distance between the axes of the shafts 1133 and 1135 and the distance between the axes of the shafts 1143 and 1145 in the apparatus 1101 may be configured to be properly small, so that the cooking container may be displayed by a small distance and by a small change of inclination angle. On the other hand, the rotation speed of the motors 1138 and 1148 may be properly large, as to produce a properly large acceleration in the movement of any point on the internal surface of the cooking container.

Figure 26:
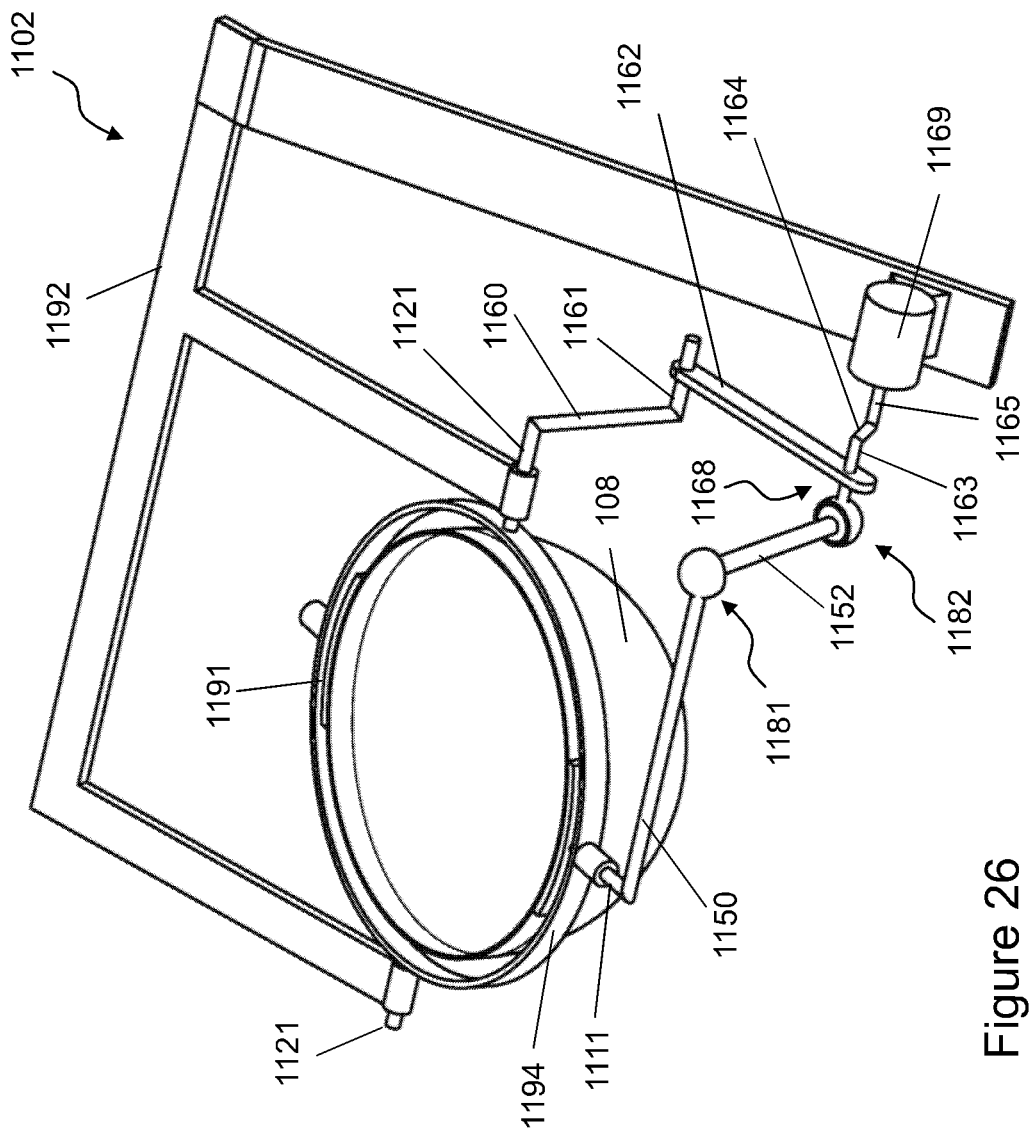
FIG. 26 shows an aerial view of an automated cooking apparatus of another automated cooking apparatus that can move the cooking pan by a composition of two oscillations; where the two oscillation motion mechanisms are mechanically linked.

In some embodiments, referring to FIG. 26, a cooking apparatus 1102 comprises a cooking apparatus 1100 and two crank-and-slider mechanisms that are mechanically linked and driven by a same motor, as follows. A rigid connector 1150 connects a shaft 1111 to a first mating part of a ball joint 1181. A second rigid connector 1152 connects the second mating part of the ball joint 1181 with a first mating part of another ball joint 1182. The second mating part of the ball joint 1182 is rigidly connected to a shaft 1163 of a rotational mechanism 1168. The center of the ball joint 1182 is on the axis of the shaft 1163. A third rigid connector 1164 connects the shaft 1163 to a shaft 1165. A motor 1169, mounted on a support component 1192, is configured to drive a rotation in the shaft 1165 around the axis of the shaft 1165, relative to the support component 1192. Similarly, a fourth rigid connector 1160 connects a shaft 1121 and a shaft 1161 in a rotational mechanism. A fifth rigid connector 1162 connects the rotational mating part of the shaft 1161 with the rotational mating part of the shaft 1163. The shafts 1121, 1161, 1163 and 1165 have parallel axes, and the distance between the axes of the shafts 1163 and 1165 is shorter than either the distance between the centers of the ball joints 1181 and 1182 or the distance between the axes of the shafts 1163 and 1161. A computer may be configured to control the motor 1169. The motor 1169 can produce an eccentric rotation in the shaft 1163, causing the connectors 1150 and 1160 to oscillate respectively around the axes of the shafts 1111 and 1121. The cooking container is moved by a composition of two rotational oscillations.

The distance between the axes of the shafts 1163 and 1165 in the apparatus 1102 may be configured to be properly small, so that the cooking container as a whole is displayed by a small distance and by a small inclination change in the oscillatory motions. On the other hand, the rotation speed of the motors 1169 may be properly large, as to produce a properly large acceleration in the movement of any point on the internal surface of the cooking container.

Figure 27:
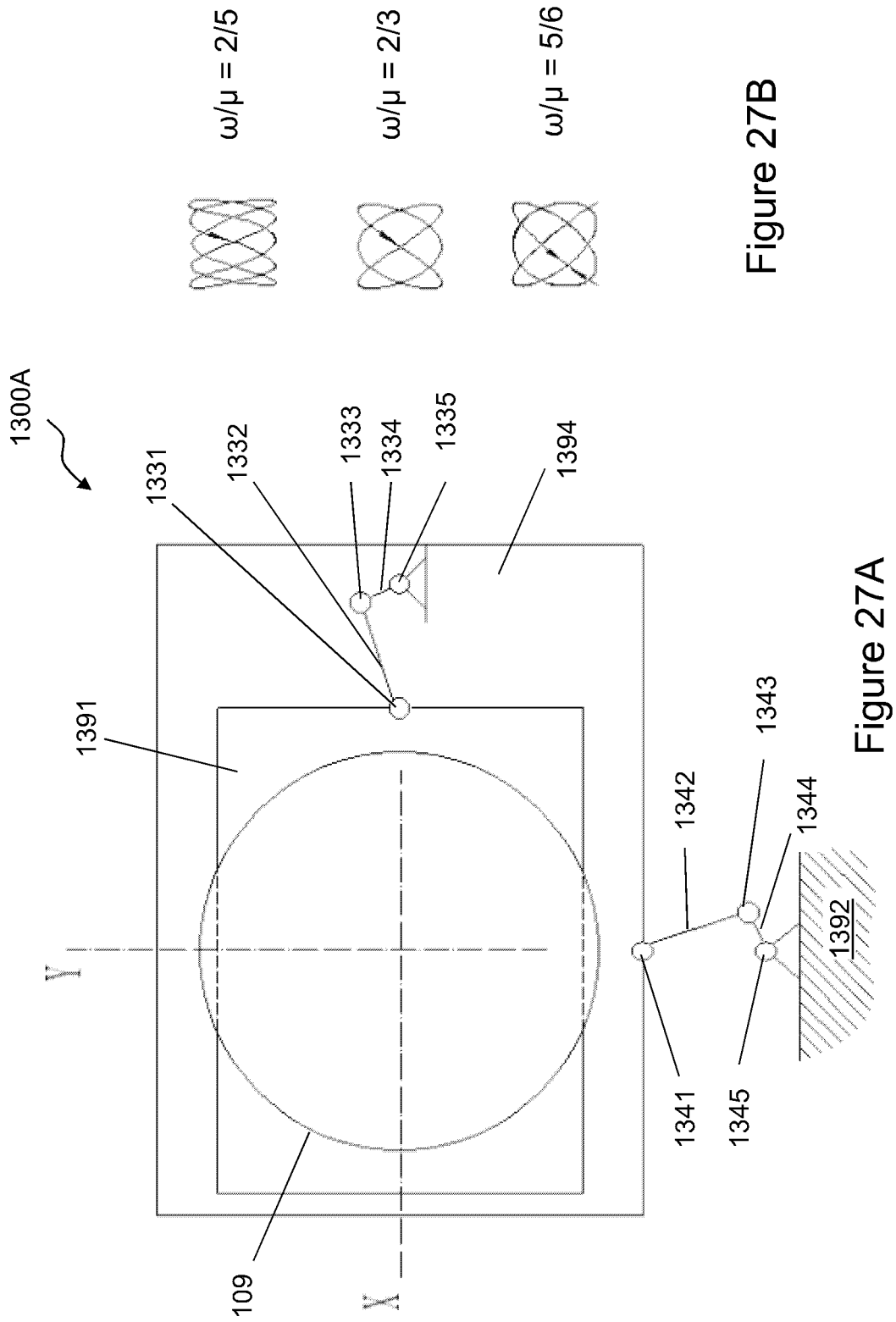
FIG. 27A shows a top view of an automated cooking apparatus that can produce a composition of two linear oscillations along X and Y axes in a cooking pan.
FIG. 27B shows exemplified movement paths for the cooking pan produced by the automated cooking apparatus in FIG. 27A.

Referring to FIG. 27A, an automated cooking apparatus 1300A comprises a cooking container 109 and a stirring motion mechanism comprising the following parts:

(1) A connector 1391 which is constrained to slide relative to a frame 1394 in the direction of a first horizontal axis, say X-axis, wherein the connector 1391 is rigidly or fixedly or otherwise connected to the cooking container 109. The frame 1394, in turn, is constrained to slide relative to a support component 1392 in the direction of a second horizontal axis, say Y-axis. The two axes are configured to not be collinear.

(2) A first crank-and-slider motion mechanism comprises: rotational mechanisms 1331 and 1333; a rigid connection of the connector 1391 with the first mating part of the rotational mechanism 1331; a rigid connector 1332 configured to connect the second mating part of the rotational mechanism 1331 with a first mating part of the rotational mechanism 1333; a shaft 1335; a rigid connector 1334 connecting the second mating part of the rotational mechanism 1333 and the shaft 1335; and a first motor (not shown in Figure) mounted on the frame 1394, configured to drive a rotation in a shaft 1335 around the axis of the shaft 1335, relative to the frame 1394. In some implementations, the axes of the shafts 1331, 1333 and 1335 may be all parallel, and perpendicular to the X axis. The distance between the axes of the shafts 1333 and 1335 is shorter than the distance between the axes of the shafts 1333 and 1331. The rotation of the shaft 1335 by the first motor produces a rotational movement of the shaft 1333 around the shaft 1335, and hence a linear oscillation of the connector 1391 relative to the frame 1394, along the X-axis.

(3) A second crank-and-slider motion mechanism comprises: two rotational mechanism 1341 and 1343, wherein the first mating part of the rotational mechanism 1341 is rigidly connected to the frame 1394; a rigid connector 1342 configured to connect the second mating part of the rotational mechanism 1341 with the first mating part of the rotational mechanism 1343; a shaft 1345 and a rigid connector 1344 configured to connect the shaft 1345 with the second mating part of the rotational mechanism 1343; a support component 1392; a second motor (not shown in figure) mounted on the support component 1392, configured to drive a rotation of the shaft 1345 around the axis of the shaft 1345, relative to the support component 1392. The axes of the shafts 1341, 1343 and 1345 are all parallel, and perpendicular to the Y axis. The distance between the axes of the shafts 1343 and 1345 is shorter than the distance between axes of the shafts 1343 and 1341. The continuous rotation of the shaft 1345 by the second motor (in the motion mechanism) produces a rotational movement of the shaft 1343 around the axis of the shaft 1345, and hence a linear oscillation of the frame 1394 relative to the support component 1392, along the Y-axis. In conclusion, the cooking container is moved by a composition of two horizontal oscillations.

Although this is not a requirement, the X-axis and Y-axis in the above paragraph may be configured to be perpendicular to each other.

In the apparatus 1300A, it is also possible to mechanically link the rotations of both crank-and-slider mechanisms so they are driven by a same motor. The distance between the axes of the shafts 1333 and 1335 and the distance between the axes of the shafts 1343 and 1345 can both be configured to be properly small, so that the cooking container as a whole is displayed by a small distance and by a small inclination change in the movement produced by the two oscillation motion mechanisms. On the other hand, the speeds of the above two motors may be properly large, as to produce a properly large acceleration in the movement of any point on the internal surface of the cooking container.

In case the motors produce constant rotational speeds, the movement paths of a point on the cooking container 109 in the automated cooking apparatus 1300A relative to the support component 1392 may be represented by the following equations: $X = A\cos(\omega t + \eta) + a$; $Y = B\sin(\mu t + \delta) + b$; where A is the distance between the axis of 1333 and the axis of 1335; and B is the distance between the axis of 1343 and the axis of 1345; $\omega$ and $\mu$ are respectively the frequencies of the rotations of shafts 1334 and 1344 around their bearing housings. The frequencies $\omega$ and $\mu$ may be the same or different from each other. A computer (not shown in figure) may be configured to control the speeds of rotations of the motors and hence the frequencies ($\omega$, $\mu$) in the oscillatory motions along the X and the Y directions according to the cooking needs. In the special case when the initial phases at time t=0 are both zero, then the initial displacements of X and Y are respectively A+a and b. Examples of such movement paths are displayed in FIG. 27B. Furthermore, if the ratio of the frequencies $\omega$ to $\mu$ may be represented by a constant fraction, the two-dimensional patterns for the movement path are referred to as Lissajous patterns (or Lissajous orbits, or Lissajous curves). It should be noted however that the presently disclosed automated cooking apparatus is not limited to a rational number for the ratio of the frequencies ($\omega$, $\mu$). Lissajous patterns comprise familiar patterns such as circles (A=B and $\omega=\mu$), ecliptics ($\omega=\mu$; A≠B).

The crank- and slider motion mechanisms in the cooking apparatus 1300A may be replaced by other oscillation motion mechanisms, such as magnetic, hydraulic, or pneumatic oscillators.

In some embodiments, a cooking apparatus comprises a stirring mechanism configured to produce a composition of three linear oscillations in the cooking container; wherein the first oscillation is in the direction of the X-axis, the second oscillation is in the direction of the Y-axis, and the third oscillation is in the direction of Z-axis; wherein the X-axis, Y-axis and Z-axis are three linearly independent axes in space. Although this is not a requirement, the three axes may further be configured to be perpendicular to each other.

Figure 28:
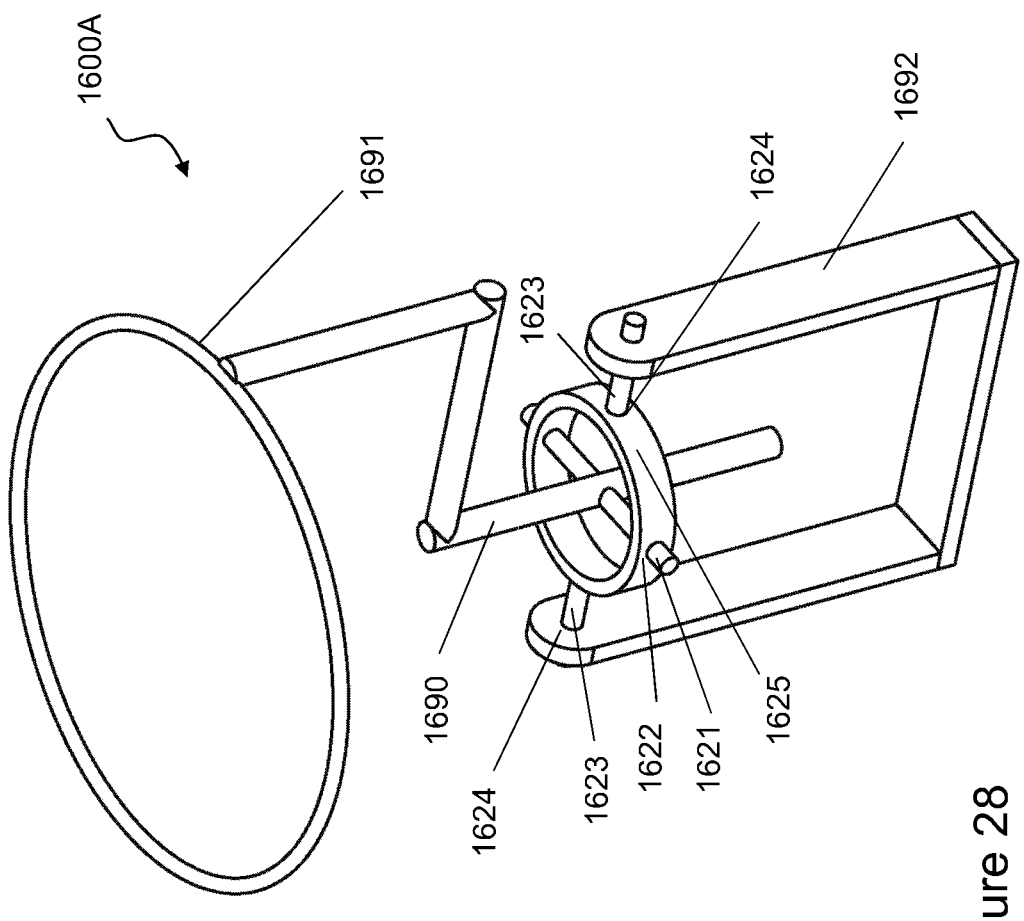
FIG. 28 shows an aerial view of a cooking apparatus 1600A with a connection mechanism which limits a cooking pan's movement.

In some embodiments, referring to FIG. 28, an apparatus 1600A comprises a connector 1691 which is rigidly or elastically connected (not shown in figure) and a connection mechanism as follows. A shaft 1621 is rigidly connected to a connector 1690; and the connector 1690 is rigidly connected to the connector 1691. Two segments of the shaft 1621 are linked to two bearing housings 1622 by two bearings, so the shaft 1621 and each of the two bearing housings are mating parts of a rotational mechanism. The apparatus comprises two shafts 1623 with a same axis, and two rotational mechanisms, each one configured to link a shaft 1623 and a rotational mating part 1624. A ring-shaped connector 1625 rigidly connects the bearing housings 1622 with the shafts 1623. The rotational mating parts 1624 of the shafts 1623 are rigidly connected to a support component 1692.

Figure 29:
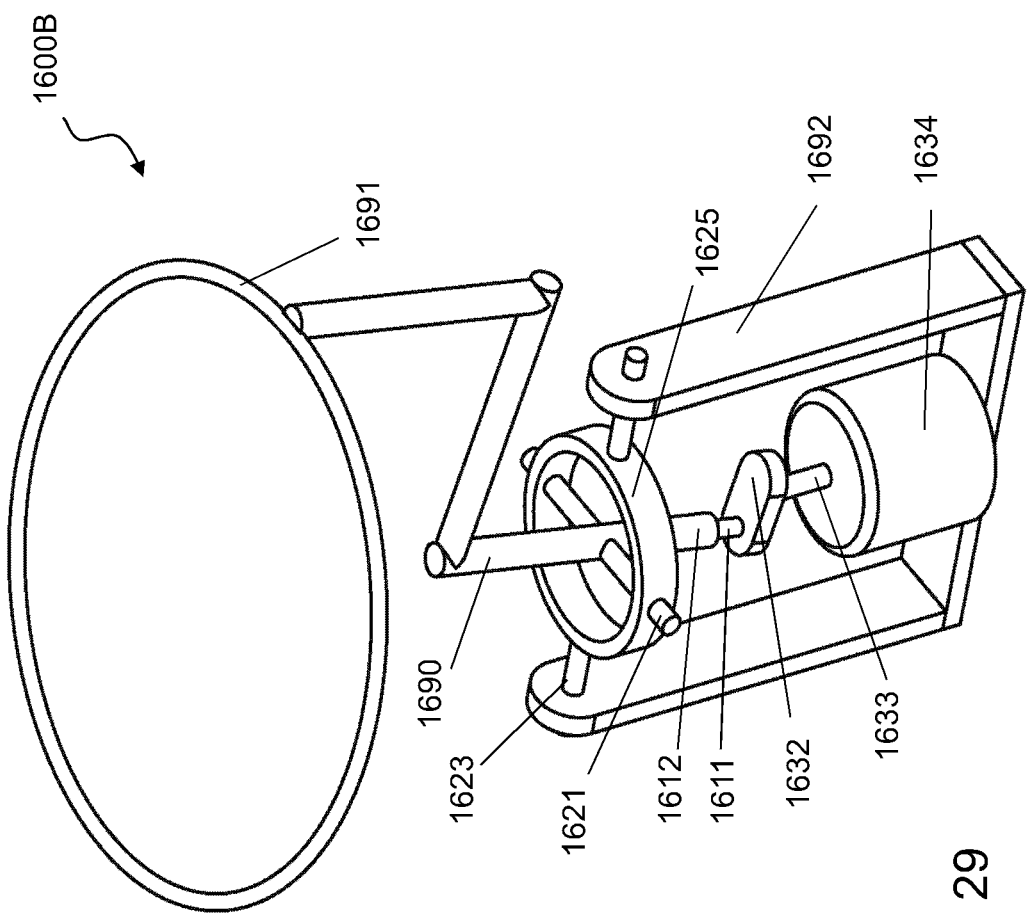
FIG. 29 shows an implementation of a cooking apparatus 1600B that can make a cyclic movement of a cooking pan.

In some embodiments, referring to FIG. 29, an automated cooking apparatus 1600B comprises an apparatus 1600A and a motion mechanism as follows. The connector 1690 is rigidly joined by a bearing housing 1612. A rotational mechanism comprises a shaft 1611 and the bearing housing 1612 as mating parts so that the shaft is constrained to rotate relative to the bearing housing around the axis of the shaft. A connector 1632 rigidly connects the shaft 1611 to a shaft 1633; and a motor 1634, mounted on the support component 1692, is configured to produce a rotation in the shaft 1633 around the axis of the shaft 1633, relative to the support component 1692. The shafts 1621, 1623, 1611 and 1633 are configured to intersect at a point. As the motor continuously rotate, the cooking container can make a circular movement with limited self-rotation.

The angle between the axes of the shafts 1611 and 1633 in the apparatus 1600B may be configured to be properly small, so that the cooking container as a whole is displayed by a small distance and by a small inclination change in the oscillatory motions. On the other hand, the rotation speed of the motors 1634 may be properly large, as to produce a properly large acceleration in the movement of any point on the internal surface of the cooking container.

It should be noted that the mechanism 501 in FIG. 10C may be modified to adjust the amplitude (angle) of the rotational movement.

Figure 30:
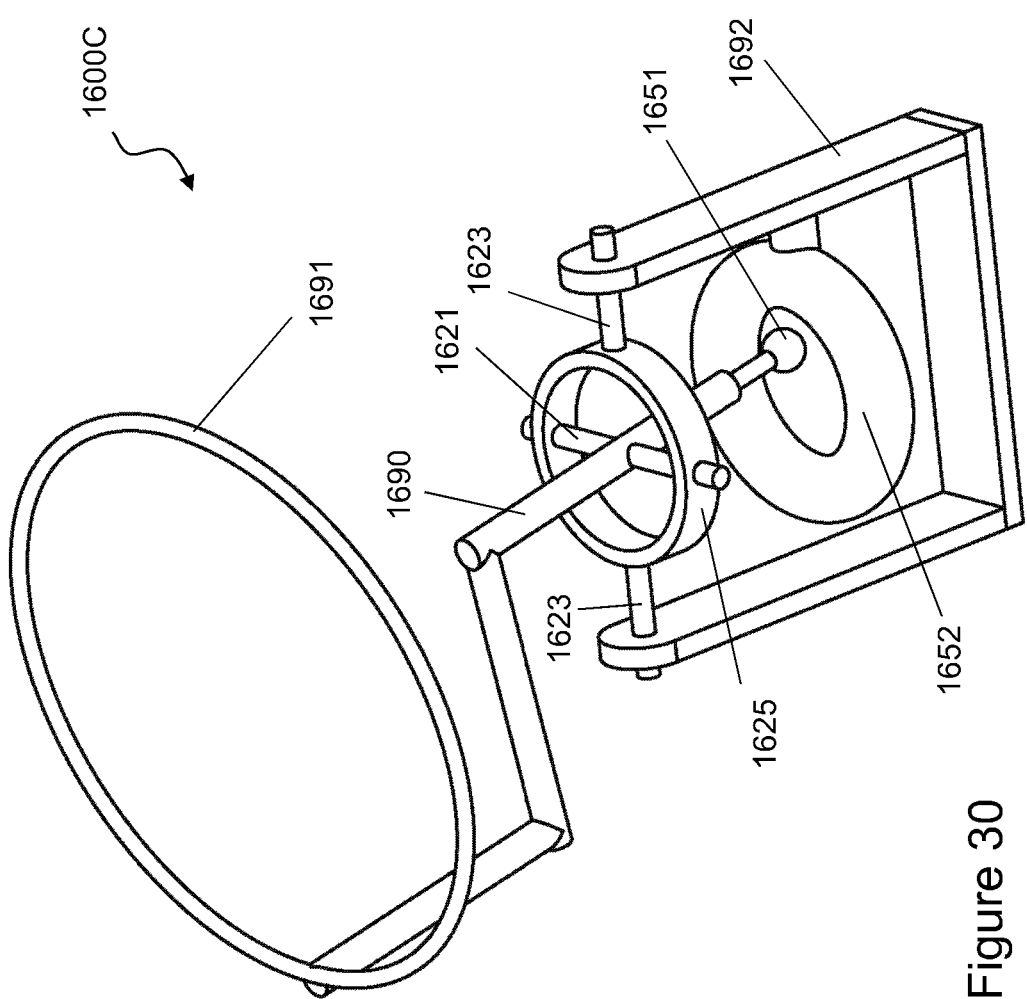
FIG. 30 shows an implementation of a cooking apparatus 1600C in which a controlled magnetic field can move a cooking pan.

In some embodiments, referring to FIG. 30, an automated cooking apparatus 1600C comprises an apparatus 1600A (FIG. 28) and a motion mechanism as follows. A magnet 1651 is fixedly attached to the connector 1690. A magnetic field generator 1652 is mounted on the support component 1692 to drive the movement of the magnet. A computer (not in figure) controls the magnetic field generator 1652. As the magnetic field generated by the generator 1652 changes, the magnet 1651 is induced to move, thus moving the connector 1690, the connector 1691 and the cooking container together with it.

The magnitudes of the movement of the magnet 1651 by the magnetic field generator 1652 in the apparatus 1600C may be configured to be properly small, so that the cooking container as a whole is displayed by a small distance and by a small inclination change in the oscillatory motions. On the other hand, the speed of the movement of the magnet 1651 may be configured to be properly large, as to produce a properly large acceleration in the movement of any point on the internal surface of the cooking container.

It should be noted that the magnet 1651 in apparatus 1600C may be substituted by an object or device that may be moved by a magnetic field. In particular, 1651 may be substituted by a second magnetic field generator. On the other hand, the pair 1651 and 1652 may be reversed, with the magnet 1651 connected to the support component 1692, and the magnetic field generator 1652 connected to the connector 1690.

It should also be noted that the magnetic field generator 1652 may consist of two or more wired electric magnets driven by separate magnetic drivers. Different magnetic drivers can produce cyclically changing magnetic fields in different electric magnets, with different directions and magnitudes, and different frequencies. A computer or other adjustment mechanism connected to the drivers may be used to dynamically adjust the directions, magnitudes, and frequencies of the magnetic fields.

Figure 31:
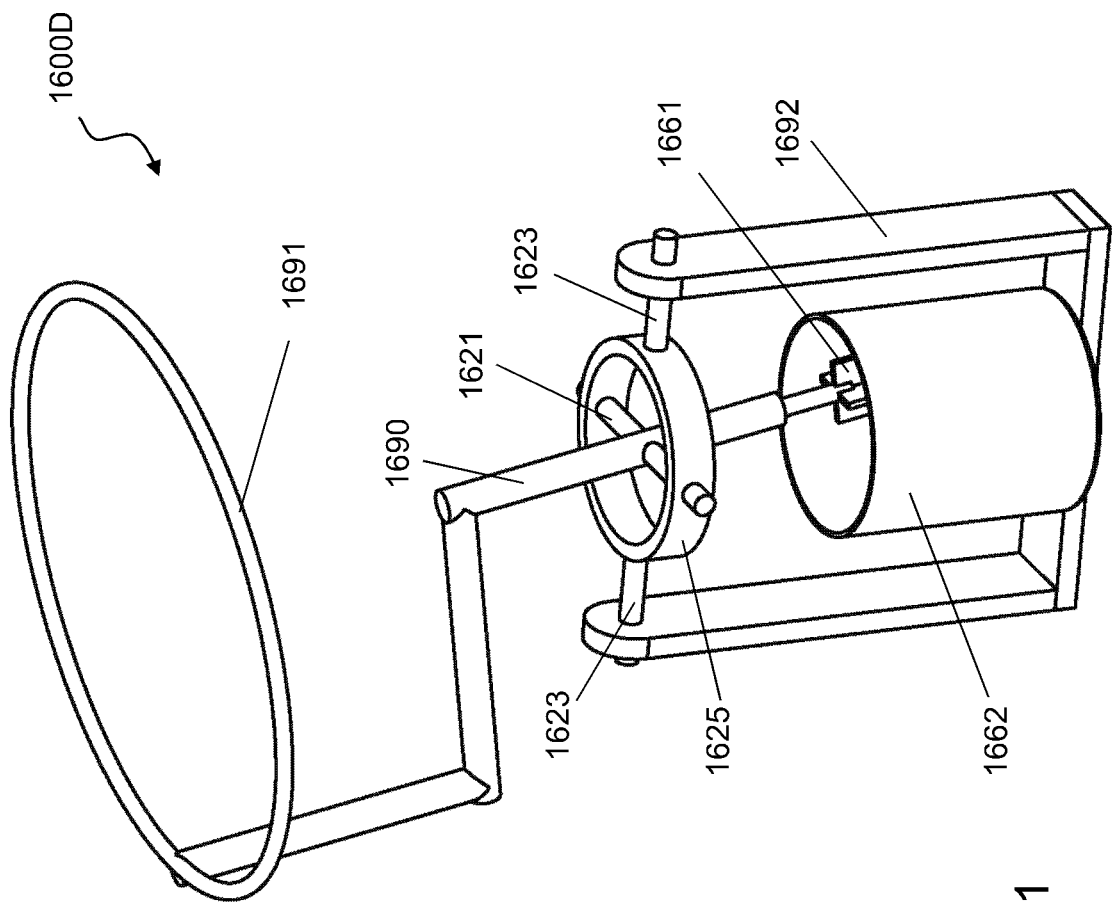
FIG. 31 shows an implementation of a cooking apparatus 1600D in which a controlled fluid flow can move a cooking pan.

In some embodiments, referring to FIG. 31, an automated cooking apparatus 1600D is built from the apparatus 1600A in FIG. 28, by further adding a motion mechanism as follows. A pedal 1661 is fixedly attached to the connector 1690 and is immersed in a liquid in a container 1662. A mechanism (not shown in figure) produces a flow in the fluid, and thus moves the pedal 1661, the connector 1690 and the connector 1691. The magnitudes of the movement of the pedal 1661 by the fluid flow may be configured to be properly small, so that the cooking container as a whole is displayed by a small distance and by a small inclination change in the oscillatory motions. On the other hand, the speed of the movement of the pedal 1661 may be configured to be properly large, as to produce a properly large acceleration in the movement of any point on the internal surface of the cooking container. A computer or other adjustment mechanism together with the controllers may be used to dynamically adjust the directions, magnitudes, and frequencies in the sources of the fluid flows.

It should be noted that the pedal 1661 can also be moved by gas flow or other non-contact forces through a medium. In some implementations, the liquid container or gas chamber 1662 may be configured to have a cylindrical shape as to move the pedal in rotational movement. A computer may be used to control the mechanisms or the sources that produce the fluid or gas flows.

Figures 32A, 32B:
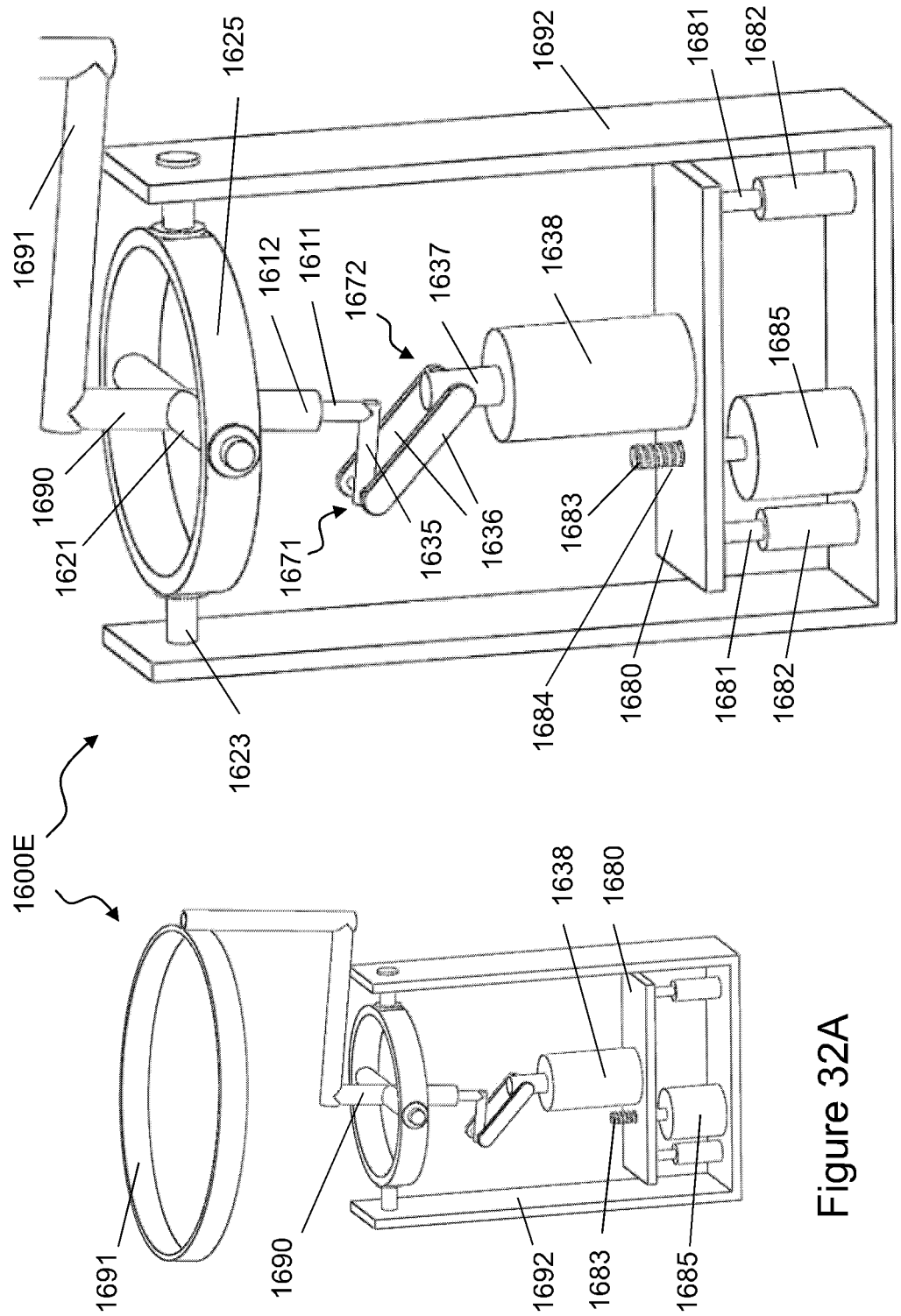
FIG. 32A shows an aerial view of an automated cooking apparatus that can make a circular movement of a cooking pan where the amplitude of the circular movement can be adjusted.
FIG. 32B displays details of a part of the cooking apparatus in FIG. 32A.

In some embodiments, referring to FIGS. 32A-32B, an automated cooking apparatus 1600E comprises an apparatus 1600A (FIG. 28) and a motion mechanism described as follows. A rotational mechanism comprises a shaft 1611 and a bearing housing 1612 as mating parts so that the shaft is constrained to rotate relative to the bearing housing around the axis of the shaft; where the bearing housing 1612 is rigidly connected to the connector 1690. A connector 1635 rigidly connects the shaft 1611 with a first mating part of an axial rotational mechanism 1671. The second mating part of the rotational mechanism 1671 is rigidly connected to two rigid connectors 1636. Thus, the connectors 1636 are rotatable relative to the connector 1635, around the axis of the rotational mechanism 1671. The rigid connectors 1636 are rigidly joined to a first mating part of an axial rotational mechanism 1672; and the second rotational mating part of the rotational mechanism 1672 is rigidly joined to a shaft 1637. Thus, the rigid connectors 1636 may be rotatable relative to the shaft 1637, around the axis of the rotational mechanism 1672. A motor 1638, mounted on a frame 1680, is configured to drive a rotation in the shaft 1637 around the axis of the shaft 1637, relative to the frame 1680. The axes of the shafts 1611, 1621, 1623 and 1637 are configured to meet at a point. The axes of the rotational mechanisms 1671 and 1672 are configured to be parallel to each other; and they are configured to be perpendicular to the axes of the shafts 1637 and 1611. (As a consequence, the shafts 1637 and 1611 are coplanar.) As the motor 1638 rotates the shaft 1637, the connectors 1636 and 1635, and the shaft 1611 make a rotational movement around the axis of the shaft 1637, thus moving the connector 1690 and the connector 1691 in a movement. On the other hand, a sliding pair comprises a pair of linear tracks 1681 and a pair of sliders 1682 configured to slide on the track 1681; where the tracks 1681 are rigidly connected to the frame 1680 and a rigid component of each slider 1682 is rigidly connected to the support component 1692. A motor 1685 mounted on the support component 1692 drives a rotation in a helical-screw 1683 around the axis of the helical-screw, relative to the support component 1692. A mating part 1684 (e.g., a nut) of the helical screw is rigidly connected to the frame 1680. The axis of the shaft 1637, the axis of the helical screw 1683 and the direction of motion of the sliding pairs (comprising tracks 1681 and sliders 1682) are configured to be parallel to each other. As the motor 1685 rotates the helical-screw 1683, the mating part 1684 and the frame 1680 make a linear movement in a direction parallel to the axis of the shaft 1637. This moves the shaft 1637 and the hinge joint 1672 along a direction parallel to the axis of the shaft 1637, and thus adjusts the angle between the axes of the shafts 1611 and 1637. The latter angle determines the amplitude of the movement of the shaft 1611, and hence that of the rotational movements of the connector 1690 and the connector 1691 produced by the motor 1638.

The angle between the axes of the shafts 1611 and 1637 in the apparatus 1600E may be adjusted to be properly small, so that the cooking container as a whole is displayed by a small distance and by a small inclination change in the movements. On the other hand, the rotation speed of the motor 1638 may be adjusted to be properly large, as to produce a properly large acceleration in the movement of any point on the internal surface of the cooking container.

In some embodiments, referring to FIG. 33A-33B, an automated cooking apparatus 700B comprises a cooking container 109 and a stirring motion mechanism comprising the following parts:

(1) Three rotational mechanisms (as first kinematic mechanisms) 715, 716 and 717, each comprising a cap as a first mating part and a ball as a second mating part. The three rotational mechanisms 715, 716 and 717 all have their second mating parts respectively joined to three iron plates 752, 762 and 772.

(2) Electric magnets 753, 763 and 773 rigidly mounted on a support component 794 and can move iron plates 752, 762 and 763, respectively.

(3) Three drivers (not shown in figure) are configured to drive the electric magnets 753, 763 and 763 to produce oscillations in the iron plates 752, 762 and 772. The movement directions of the three electric magnets are configured to be linearly independent, so the three oscillations produce a three-dimensional movement of the connector 793 together with the cooking container 109.

(4) A connection mechanism comprising: (a) three elastic connectors 751, 761 and 771 which connect the second mating parts of the rotational mechanisms 715, 716 and 717 respectively to the support component 794; (b) a connector 793 which is rigidly, fixedly or otherwise connected to the cooking container 109 and first mating parts of the three rotational mechanisms 715, 716 and 717.

A computer or other adjustment mechanism together with the three magnetic drivers may be used to dynamically change the magnitudes and frequencies of the oscillations of the three electric magnets.

The stirring motion mechanism of the cooking apparatus 700B can produce a motion in the cooking container 109 as to stir, mix or distribute food or food ingredients held in the cooking container.

It should be noted the connection mechanism connects the connector 793 to the support component 794, wherein the connector 793 is rigidly or fixedly connected to the first mating parts of the three rotational mechanisms 715, 716 and 717. The motion of the connector 793 relative to the support component 794 is constrained by the connection mechanism. Thus, the motion of said first mating parts relative to the support component are also constrained.

The magnitudes of the oscillatory motions in the apparatus 700B may be configured to be of proper size, so that the cooking container as a whole is displayed by a proper distance and by a small inclination change in the oscillatory motions. On the other hand, the frequencies or speeds of the oscillations of the iron plates 752, 762 and 772 may be configured to be properly large, as to produce a properly large acceleration in the movement of any point on the internal surface of the cooking container.

Figure 34:
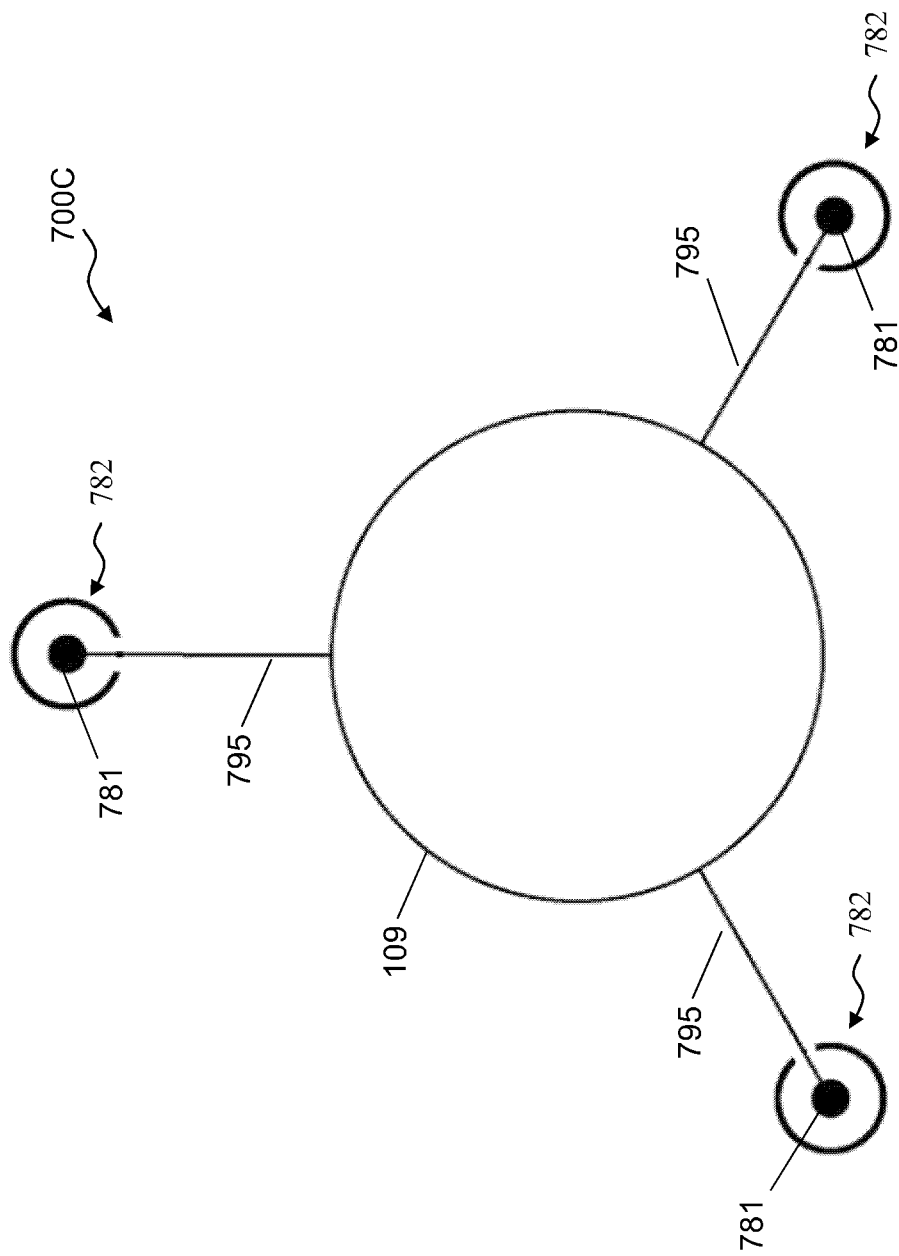
FIG. 34 shows an automated cooking apparatus in which three controlled magnetic fields can move a cooking pan.

In some embodiments, referring to FIG. 34, an automated cooking apparatus 700C comprises a cooking container 109. Three magnets 781 which are connected to the cooking container 109 by connectors 795; three magnetic field generators 782 which are mounted on a support component (not shown in figure) and can respectively move the magnets 781. The centers of the magnets 781, 782 and 783 are not positioned on a same line. Each magnetic field generator comprises one or more wired electric magnets which are driven by one or more drivers. Different drivers may drive different electric magnets to produce cyclic magnetic fields with different directions, magnitudes, and frequencies.

A computer (not shown in figure) or other adjustment mechanism together with the drivers may be used to dynamically change the directions, magnitudes and frequencies of the magnetic field generated by each electric magnet. The cooking container is then moved by a composition of oscillatory motions. The magnitudes of the movements of the magnets 781 may be configured to be properly small, so that the cooking container as a whole is displayed by a small distance and by a small inclination change in the composition of oscillatory motions. On the other hand, the speed of the movement of the magnets 781 may be configured to be properly large, as to produce a properly large acceleration in the movement of any point on the internal surface of the cooking container.

Alternatively, another apparatus may be built from the cooking apparatus 700C by substituting one of the three magnetic field generators 782 by a permanent magnet. In this case, the other two magnetic field generators 782s can produce controlled movements in the cooking container 109, while the permanent magnet substituting one of the 782s together with the respective magnet 781 may be used as a connection mechanism.

Figure 35:
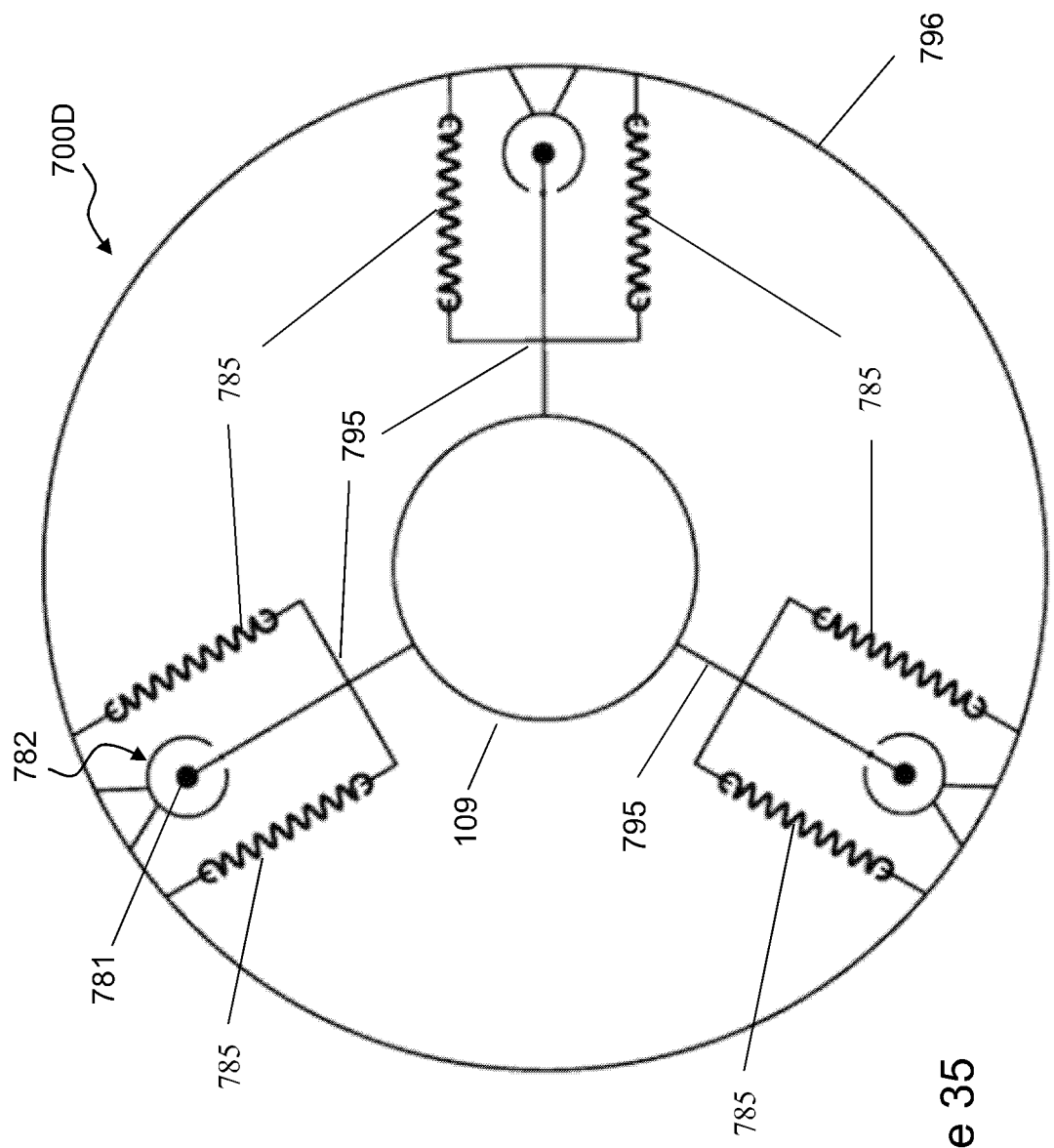
FIG. 35 shows another automated cooking apparatus in which some controlled magnetic fields can move a cooking pan.

In some embodiments, referring to FIG. 35, an automated cooking apparatus 700D comprises an apparatus 700C and a connection mechanism; wherein the connection mechanism comprises six elastic connectors 785 configured to connect the connector 795 to the support component 796.

It should be noted that in the apparatus 700C or 700D, it is possible to have more than three magnets 781, and corresponding magnetic field generators 782, or (in case of apparatus 700D) more elastic connectors 786.

In some embodiments, referring to FIGS. 36A and 36B, an automated cooking apparatus 1300 comprises a cooking container 109 and a stirring motion mechanism comprising the following parts:

(1) A connector 1391 which is constrained to slide relative to a frame 1394 along the X-axis via a sliding pair; wherein the X-axis is a horizontal direction wherein the connector 1391 is rigidly or fixedly or otherwise connected to the cooking container 109. The frame 1394 is constrained to slide relative to a support component 1392 along Y-axis via another sliding pair; wherein the Y-axis is another horizontal direction;

(2) A first linear motion mechanism comprising: a two-way motor 1319 and a helical-screw mechanism 1318. The base component of the two-way motor 1319 is mounted on the frame 1394 and is configured to produce a rotation in a helical-screw mechanism 1318 that translates the rotation into a translational movement of 1391 along the X-axis direction.

(3) A second linear motion mechanism comprising: a two-way motor 1329 and a which helical-screw mechanism 1328. The base component of the two-way motor 1329 is mounted on a support component 1392 and is configured to produce a rotation in a helical-screw mechanism 1328 that translates the rotation into a translational movement of 1391 along the Y-axis direction.

The cooking container 109 can thus be moved by a composition of two linear oscillations, respectively along the X-axis and Y-axis by the stirring motion mechanism. The motors 1319, 1329 are driven by drivers 1340 which produce oscillatory currents for the motors so the motors may rotate back and forth in oscillations. The drivers 1340 are controlled by a computer 1350 which adjusts the magnitudes and frequencies of the oscillations. It is possible to mechanically link the rotations of the helical-screw mechanisms 1318 and 1328 through a transmission mechanism, so they are driven by a same motor. The oscillations of the motors 1319 and 1329 are configured to be of proper size, so the cooking container as a whole is moved by a proper displacement and no inclination change at all times. On the other hand, the speed of the movement of the oscillations may be configured to be properly large, as to produce a properly large acceleration in the movement of any point on the internal surface of the cooking container.

Figure 37:
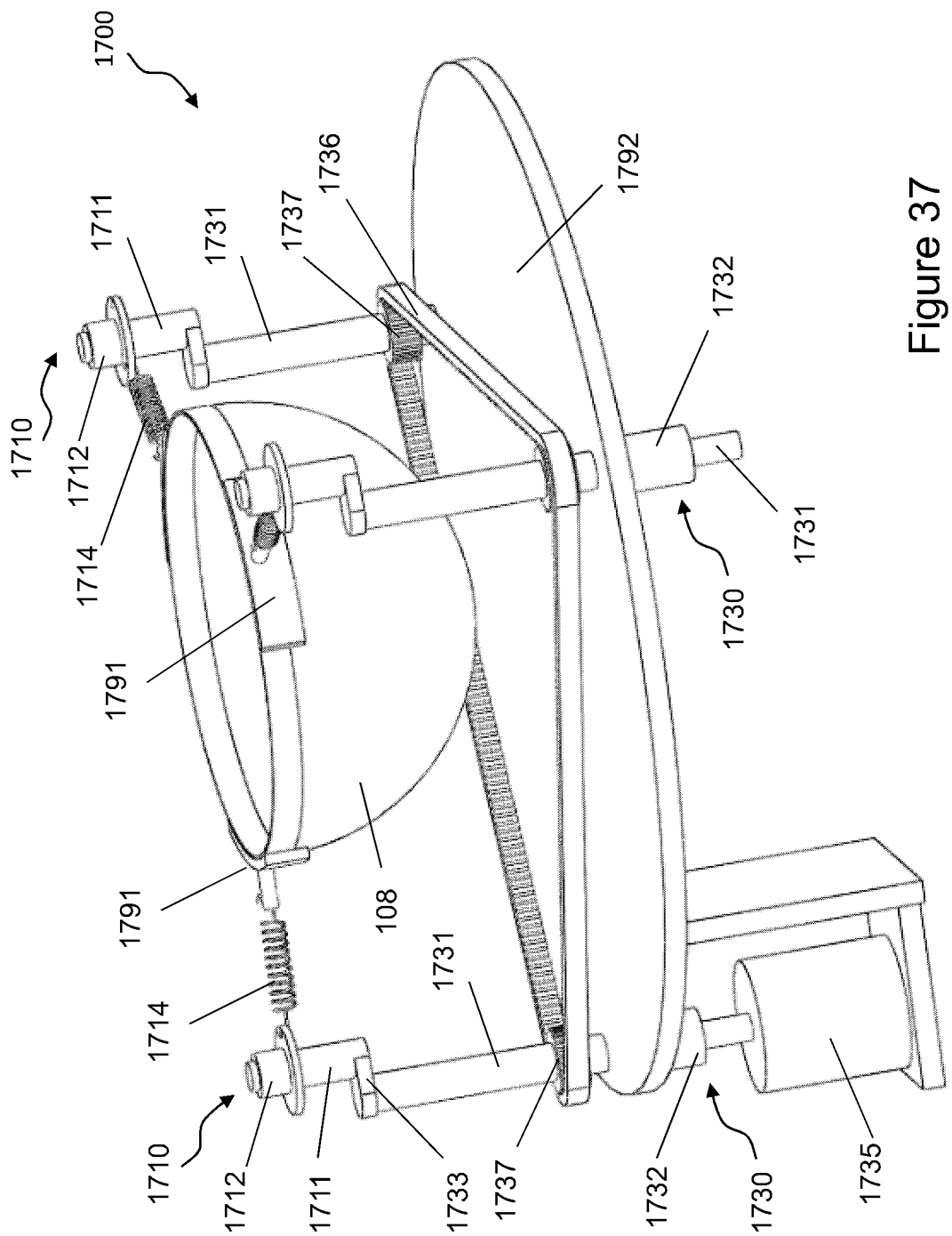
FIG. 37 shows an automated cooking apparatus in which can produce a combination of circular movement and vibrations in a cooking pan.

In some embodiments, referring to FIG. 37, an automated cooking apparatus 1700 comprises a cooking container 108 and a stirring motion mechanism comprising the following parts:

(1) Three rotational mechanisms 1710 (as first kinematic mechanisms), each comprising a shaft 1711 and a bearing housing 1712 as mating parts so that the shaft is constrained to rotate relative to the bearing housing around the axis of the shaft; where the bearing housings 1712 are respectively connected to the three plates 1791 by three elastic connectors 1714;

(2) Three rotational mechanisms 1730 where each rotational mechanism 1730 comprises a shaft 1731 and a bearing housings 1732. The bearing housings 1732 are rigidly connected to a support component 1792. Each shaft 1711 is rigid connected to a shaft 1731, such that the axes of the shafts 1711 and 1731 are all parallel to each other, and the distance between the axis of a shaft 1711 and the axis of the corresponding shaft 1731 is the same for all three pairs;

(3) Three belt wheels 1737 and a timing belt 1736 wherein each of the belt wheels 1737 is rigidly connected to, and concentric with each shaft 1731. All three belt wheels 1737 have the same diameter. The timing belt 1736 envelops the three belt wheels 1737 so the three belt wheels can rotate synchronously;

(4) A motor 1735 mounted on the support component 1792 which can drive the rotation of a shaft 1731 (any one of the three shafts 1731) around the axis of the shaft 1731. As the motor 1735 rotates one of shafts 1731, all three shafts 1731 are rotated synchronously via the timing belt 1736, resulting in synchronous, eccentric rotational movements in the three shafts 1711, and a movement of the cooking container 108.

(5) Three connectors 1791 which are rigidly or fixedly connected to the cooking container 108, and three elastic connectors 1714 comprising springs. Each elastic connectors 1714 is configured to connect a bearing housing 1712, as a first mating part of a respective rotational mechanism 1710, to a bearing housing 1712, as a first mating part of a respective rotational mechanism 1710.

The distance between the axis of a shaft 1711 and the respective shaft 1731 in the apparatus 1700 may be configured to be properly small, so that the cooking container as a whole is displayed by a small distance and by a small inclination change at all times. On the other hand, the rotation speed of the motor 1735 may be configured to be properly large, as to produce a properly large acceleration in the movement of any point on the internal surface of the cooking container.

It is possible to have more than 3 rotational mechanisms 1710, 1730, or corresponding parts in the cooking apparatus of FIG. 37.

Figure 38A:
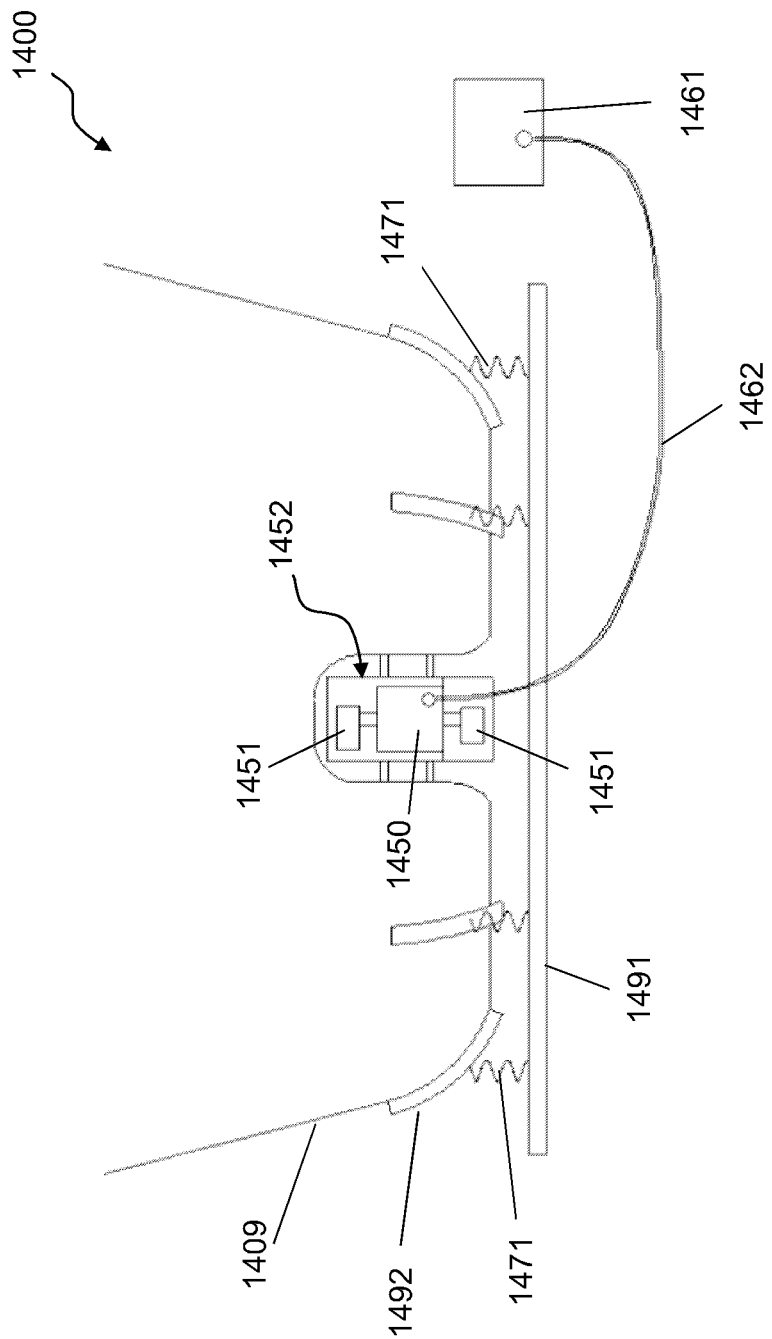
FIG. 38A illustrates an automated cooking apparatus comprising a rotary vibration mechanism near the center of the cooking pan.

FIG. 38A is a schematic side view of an automated cooking apparatus 1400 where a rotary vibration mechanism is built at the bottom center of a cooking container. A rotationally symmetric cooking container 1409 with a vertical axis is flexibly mounted on a support component 1491 using springs 1471 and some curved boards 1492. The cooking container 1409 can contain or hold food or food ingredients. The support component 1491 has a shape of a ring that is concentric with the cooking container 1409. The external surface of the cooking container 1409 has a cup-shaped recess at the center of its bottom surface. A vibration mechanism 1452 is mounted in the cup-shaped recess at the center of the cooking container 1409. The vibration mechanism 1452 comprises a motor 1450 rotating some eccentric blocks 1451, and a driver 1461 which drives the motor 1450 via a connector 1462; and a computer (not shown in figure) controls the driver. The motor 1450 can comprise a hydraulic motor, an air motor, an electric motor, or other motor; and the motor driver may be a hydraulic pump, an air pump, an electric motor driver accordingly. When the motor 1450 rotates the unbalanced eccentric blocks 1451, a three-dimensional vibration pattern is produced in the cooking container, thus stirring and mixing the food ingredients.

Figure 38B:
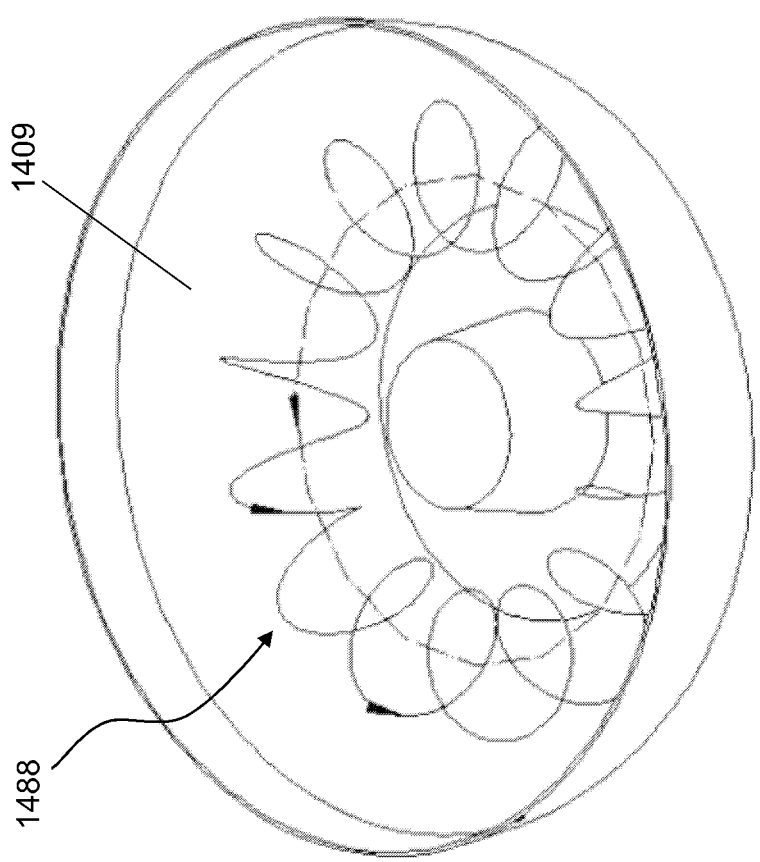
FIG. 38B displays exemplified movement paths of the food ingredients when the cooking pan is vibrated by the mechanisms in FIG. 36A.

FIG. 38B displays a helical pattern of an exemplified movement path 1488 in the food ingredients when the cooking container is vibrated by the mechanism in FIG. 38A.

Figure 39:
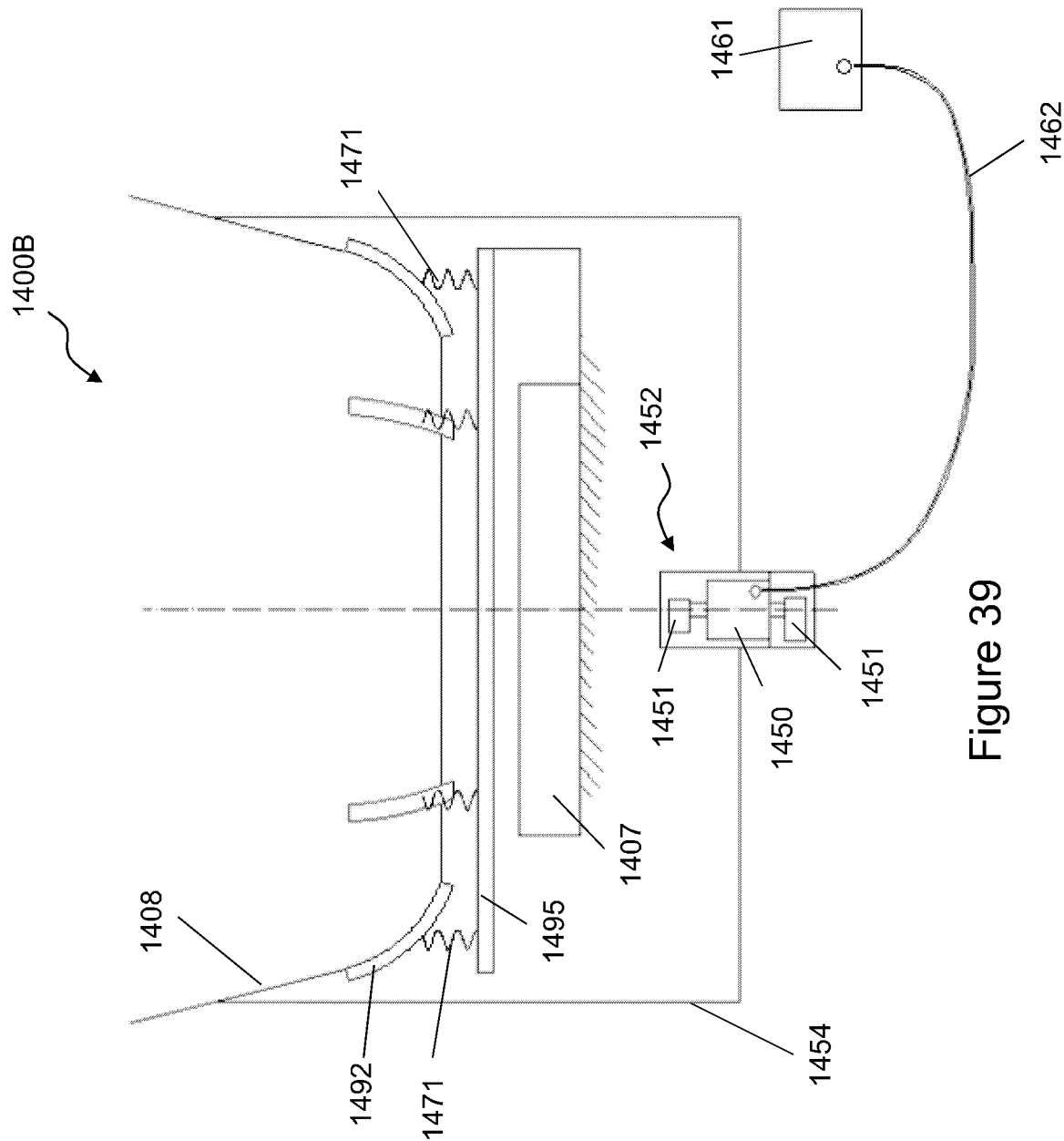
FIG. 39 shows an automated cooking apparatus with a rotary vibration mechanism similar to that in FIG. 38A.

In some embodiments, referring to FIG. 39, an automated cooking apparatus 1400B, similar to the apparatus 1400, includes a cooking container 1408 which flexibly mounted on a support component 1495 using springs 1471 and some curved boards 1492. The cooking container 1408 can hold food or food ingredients during cooking. The support component 1495 has a top part in the shape of a ring that is concentric with the cooking container 1409. A connector 1454 connects a vibration mechanism 1452 to the side wall of the cooking container 1408. The vibration mechanism 1452 is positioned at below the center of the cooking container, leaving a space between the vibration mechanism and the cooking container so that a stove 1407 may be mounted on a bottom part of the support component 1495, above the vibration mechanism. The vibration mechanism comprises a motor 1450 rotating some eccentric blocks 1451, and a motor driver 1461 which drives the motor 1450 via a connector 1462. When the motor 1450 rotates the unbalanced eccentric blocks 1451, a three-dimensional vibration pattern is produced in the cooking container, thus stirring and mixing the food ingredients.

Figures 40A, 40B:
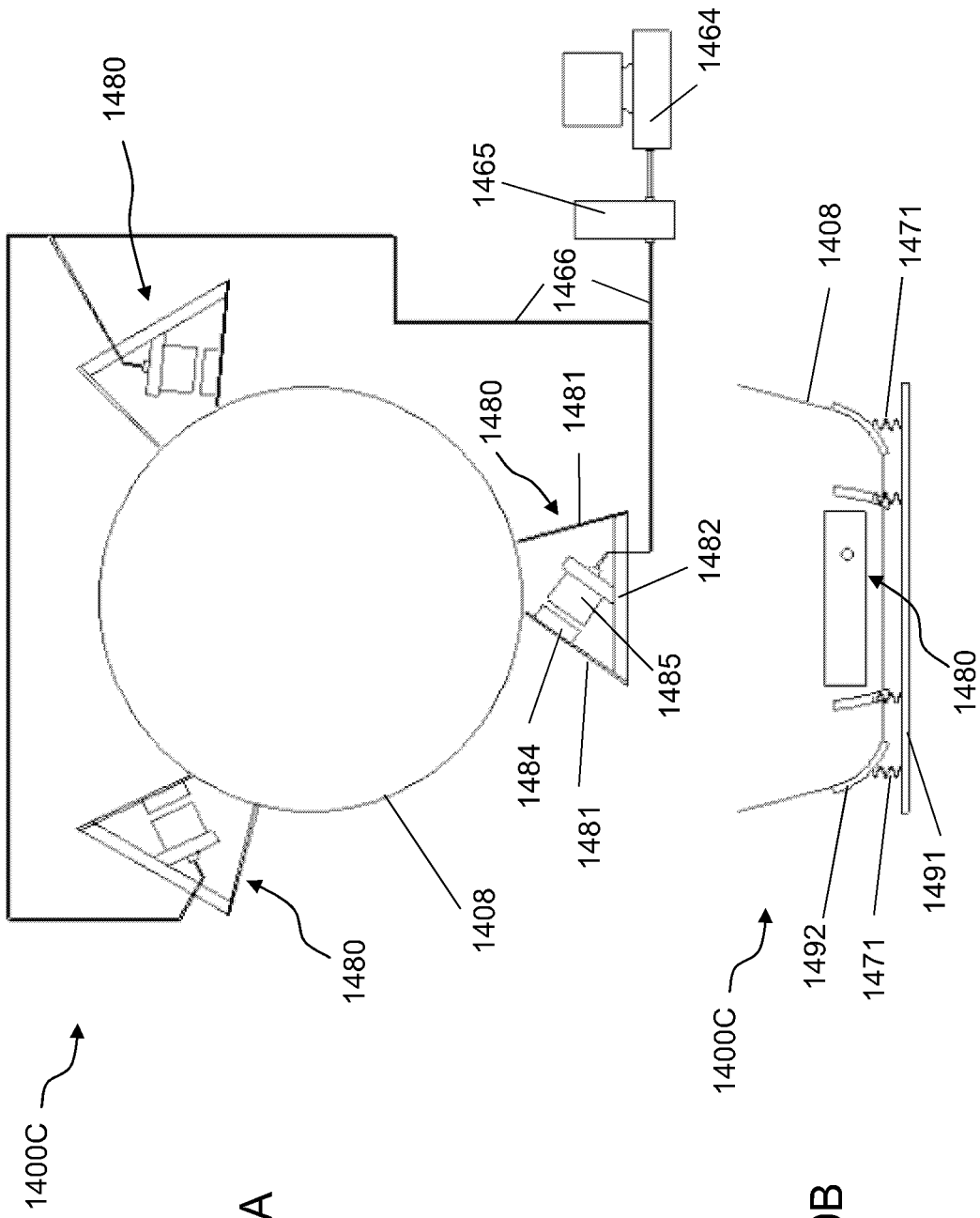
FIG. 40A-40B respectively show top and side views of an automated cooking apparatus comprising some vibration mechanisms mounted on the side wall of the cooking pan.

In some embodiments, referring to FIGS. 40A-40B, an automated cooking apparatus 1400C includes a cooking container 1408 which is flexibly mounted on a support component 1491 using springs 1471 and some curved boards 1492. The support component 1491 has a shape of a ring that is concentric with the cooking container 1408. Some vibration mechanisms 1480 are mounted on the side of the cooking container 1408. Each vibration mechanism 1480 comprises elastic plates 1481 connecting the outer wall of the cooking container with a frame 1482, an iron plate 1484 mounted on an elastic plate 1481, and an electric magnet 1485 mounted on the frame 1482. The electric magnet 1485 applies a variable force on the iron plate 1484 to produce an oscillation in the iron plate. The electric magnet is rigidly or fixedly connected to a driver 1465 via a connector 1466. A computer 1464 is linked to the driver 1465. The vibration mechanisms 1480 can produce a three-dimensional vibration pattern in the cooking container, thus stirring and mixing the food ingredients.

It should be noted that the magnetic vibration mechanisms 1480 may be replaced by other vibration mechanisms, such as electric, hydraulic, pneumatic mechanisms. The mechanisms in FIG. 39 and in FIGS. 40A-40B can produce movement paths of similar helical patterns for the food ingredients as the one displayed in FIG. 38B.

In the apparatus discussed above, a first rotational mechanism is a special case of first kinematic mechanism. Similarly, a second (or third, or fourth) rotational mechanism is a special case of second (or third, or fourth) kinematic mechanism.

Two components are said to be in constant contact with each other, if two components touch each other at all times.

In each of the cooking apparatus (including automated cooking apparatus) described above which comprises a first kinematic mechanism (e.g., a first rotational mechanism) and a connection mechanism, no rigid component of a connection mechanism is fixedly connected to the second mating part of a first kinematic mechanism. In fact, no component of a connection mechanism is fixedly connected to the second mating part of a first kinematic mechanism. The second mating part of the first kinematic mechanism is not in constant contact with any component in the respective cooking apparatus, other than (possibly) the first mating part of the first kinematic mechanism, which is fixedly connected to a rigid component of a connection mechanism. Moreover, any component of a cooking apparatus which is fixedly connected to the second mating part of a first kinematic mechanism is not in constant contact with a component of the connection mechanism. Any component of a cooking apparatus which is fixedly connected to the second mating part of a first kinematic mechanism is not in constant contact with a rigid component in the cooking apparatus, other than (possibly) the first mating part of the first kinematic mechanism, which is fixedly connected to a rigid component of the connection mechanism.

A connection mechanism is a special case of a limiting mechanism which restricts the motion of the cooking container relative to a support component.

In some embodiments, a cooking apparatus may comprise: a cooking container configured to contain or otherwise hold food or food ingredients; a first kinematic mechanism (e.g., a rotational mechanism) comprising a first mating part and a second mating part where the first mating part is rigidly or fixedly connected to the cooking container; a motion mechanism comprising a support component wherein the motion mechanism is configured to produce a motion of the second mating part of the first kinematic mechanism relative to the support component; a limiting mechanism configured to constrain or restrict the relative motion of a pair of components; wherein one of the mating parts of the first rotational mechanism is configured to not be fixedly connected to a rigid component of the limiting mechanism; wherein the first kinematic mechanism, the motion mechanism and the limiting mechanism in combination are configured to move the cooking container as to stir, mix or distribute the food or food ingredients held in the cooking container.

In some embodiments, a cooking apparatus may comprise: a cooking container configured to contain or otherwise hold food or food ingredients; a first kinematic mechanism (e.g., a rotational mechanism) comprising a first mating part and a second mating part where the first mating part is rigidly or fixedly connected to the cooking container; a motion mechanism comprising a support component wherein the motion mechanism is configured to produce a motion of the second mating part of the first kinematic mechanism relative to the support component; a limiting mechanism configured to restrict or constrain the relative motion of a pair of components; wherein one of the mating parts of the first rotational mechanism is configured to not be in constant contact with any rigid component of the connection mechanism; wherein one of the mating parts of the first rotational mechanism is configured to not be in constant contact with any rigid component, except the other mating part of the first kinematic mechanism, which is fixedly connected to a rigid component of the connection mechanism; wherein the first kinematic mechanism, the motion mechanism and the limiting mechanism in combination are configured to move the cooking container as to stir, mix or distribute the food or food ingredients held in the cooking container.

It should be noted that in the cooking apparatus described in the previous paragraph, one should not imply that the two mating parts of the first kinematic mechanism are in constant contact with each other. It is possible, but not required, for the two mating parts of the first kinematic mechanism to be in constant contact with each other.

For the purpose of present patent application, an elastic connection between two solid components refers to a connection comprising an elastic connector such as a spring, but not comprising a kinematic mechanism.

It should be noted that in the cooking apparatus described in this patent application which comprises a first kinematic mechanism and a connection mechanism, the connection mechanism may be configured so that a component of the connection mechanism is fixedly connected or elastically connected to a cooking container. Moreover, the first mating part of the first kinematic mechanism may be configured to be fixedly or elastically connected to the cooking container. Thus, the connection mechanism comprises a component which is fixedly or elastically connected to the first mating part of the kinematic mechanism Such a rigid or elastic connection does not comprise a kinematic mechanism.

It should be noted that in the cooking apparatus described in this patent application which comprises a first and a second kinematic mechanism, the first mating parts of the first and second kinematic mechanism may be configured to be fixedly or elastically connected to the cooking container. A connection of the first mating part of a first or second kinematic mechanism with the cooking container, using a kinematic mechanism, is not desirable. In particular, the first mating part of the first or second kinematic mechanism may be fixedly or elastically connected to the first mating part of the first kinematic mechanism.

It should be further noted that due to the cyclic or oscillatory nature of movements in the cooking container in many of our disclosed cooking apparatus from FIG. 2A to FIG. 40, a degree of vibration of similar geometric pattern exists, even without the presence of a spring. Such vibration may produce helical movement paths in food ingredients, similar to the helical path shown in FIG. 38B. In addition, these movements have the additional effect of making and maintaining a consistent distribution of a balanced pattern in the food ingredients in the cooking container, which is especially suitable for heated cooking. In case of a cooking container comprising a vertical rotational axis, the distribution pattern may be close to a pattern that is rotationally symmetric around the vertical axis of the cooking container. In particular, the food ingredients are not pushed to a particular side of the cooking container.

More automated cooking apparatus may be built using similar methods. For example, a cooking container may be connected to the first mating part of a curved sliding pair (as a first kinematic mechanism), and a motion mechanism can move the second mating part of the curved sliding pair by an oscillation relative to a support component. A motion mechanism can drive an oscillation in a mating part relative to the other mating part of the sliding pair. The cooking container is thus moved by a combination of two oscillations.

In another example, a connection mechanism consists of a connector joining the first mating part of a planar pair (as a second kinematic mechanism) to a connector of a cooking container, and another connector joining the second mating part of the planar pair to a support component. Two motion mechanisms using magnetic or other forces may produce a combination or two oscillations or other movements in the connector.

In another example, a connection mechanism consists of three or more elastic connectors connecting a cooking container to a support component. One or more motion mechanisms may move the cooking container.

In some embodiments, a cooking apparatus comprises: a cooking container; a first kinematic mechanism comprising a first mating part, a second mating part and a mechanism configured to constrain the relative movement of the mating parts; a connection of the first mating part of the first mechanical mechanism with the cooking container; a motion mechanism comprising a support component where the motion mechanism is configured to move the second mating part of the first kinematic mechanism relative to the support component; and a connection mechanism. The connection mechanism comprises: (1) a second kinematic mechanism comprising a first mating part, a second mating part and a mechanism configured to constrain the relative motion of the mating parts to planar motions; (2) a rigid connection of the cooking container with the first mating part of the second kinematic mechanism; and (3) a rigid connection of the second mating part of the second kinematic mechanism with the support component of the motion mechanism.

In some embodiments, a cooking apparatus comprises: a cooking container; a first kinematic mechanism comprising a first mating part, a second mating part and a mechanism configured to constrain the relative movement of the mating parts; a connection of the first mating part of the first mechanical mechanism with the cooking container; a motion mechanism comprising a support component where the motion mechanism is configured to move the second mating part of the first kinematic mechanism relative to the support component; and a connection mechanism. The connection mechanism comprises: (1) a second kinematic mechanism comprising a first mating part, a second mating part and a mechanism configured to constrain the relative motion of the mating parts to a linear motion of a first direction; (2) a rigid connection of the cooking container with the first mating part of the second kinematic mechanism; and (3) a third kinematic mechanism comprising a first mating part, a second mating part and a mechanism configured to constrain the relative motion of the mating parts to a linear motion of a second direction; (4) a rigid connection of the first mating part of the third kinematic mechanism with the second mating part of the second kinematic mechanism; (5) a connection of the second mating part of the third kinematic mechanism with the support component of the motion mechanism; wherein the first direction and the second direction are configured to not be parallel to each other. It is desirable, but not required, for the first direction and the second direction to be horizontal directions; and for the two directions to be perpendicular to each other.

In some embodiments, an automated cooking apparatus may comprise: (1) a cooking container configured to contain or otherwise hold food or food ingredients for cooking; (2) a first axial rotational mechanism comprising a first mating part and a second mating part and a mechanism configured to constrain the relative movement of the mating parts to an axial rotation; wherein the first mating part of the first rotational mechanism is configured to be connected to the cooking container; (3) a rotational motion mechanism configured to move the second mating part of the first rotational mechanism.

For the present patent application, the term "displacement" of a moving point is the distance between the position of the moving point and its original position before it is moved by the motion mechanism. The positions of a point before and after it is moved may be relative to the support component of the motion mechanism.

In the above described automated cooking apparatus, the internal surface of the cooking container may comprise a "center" point that is displaced by a properly small displacement during the movement produced by the motion mechanism. Indeed, in many of the above automated cooking apparatus, with proper configurations, each point of the internal surface of the cooking container (which is intended to be in contact with food ingredients) may be displaced by a properly small displacement. It is not easy to quantify what is a properly small displacement, as this may depend on the shape of cooking container, the heater, the types of food ingredients, and styles of cooking. In some cases, the center point on the internal surface of the cooking container may be displaced by less than a half of the diameter of the heating source at all times. Since the diameter of a heating source may be about one half of the diameter of the cooking container, the center point on the internal surface of the cooking container is required to be displaced by less than a quarter of the diameter of the cooking container. An advantage of such a design, besides the benefits of mixing and stirring and distributing the food ingredients, is that the food ingredients may be heated by a same heater in case the heater is fixed to a support component. (It is however not a requirement that the heater be fixed to a support component during the cooking process.)

If the automated cooking apparatus comprises an adjustment mechanism to adjust the magnitude of the movements of the cooking container produced by the motion mechanism, the displacement of a center point on the internal surface of the cooking container (in the movement produced by the motion mechanism) may be adjusted between a lower bound and an upper bound. For such a cooking apparatus, there is no need to restrict the upper bound at all. It is only required for the lower bound to be configured small (or to be zero).

A feature of the above automated cooking apparatus is that, the speeds of movements of any point of the internal surface of the cooking container (which is intended to be in contact with food ingredients) may be made properly large while the amplitude of the movement of the cooking container may stay small. The directions of velocity vectors are changed frequently, thus producing some properly big accelerations in the internal surface of the cooking container (more precisely, in the part of the internal surface of the cooking container that may be in contact with the food ingredients in the stirring and mixing process) as to stir, mix and distribute the food ingredients contained in the cooking container.

Another feature of the above automated cooking apparatus is that the points of the internal surface of the cooking container that may be in contact with food ingredients during the stirring and mixing process are evenly moved. Except a possible phase difference, the magnitudes of the acceleration of a point on the internal surface of the cooking container (that may be in contact with food ingredients during the mixing and stirring process) is comparable with the magnitude of the acceleration of any other point on the internal surface of the cooking container (that may be in contact with food ingredients during mixing and stirring process). In particular, all points on the internal surface of the cooking container are moved in the mixing and stirring process. Compared with our apparatus disclosed above, the traditional motion mechanism that rotates a cooking container around a vertical axis of the cooking container does not move the point of the cooking container intersected with the vertical axis; nor can it move the points of the internal surface of the cooking container evenly, as the points of the cooking container near the rotation axis are barely moved.

Another feature of the above automated cooking apparatus is that the inclinations of any axis on the cooking container is only displaced by a small angle. Again, it is not easy to quantify what is perceived to be a small angle, as it depends on the shape of the cooking container, the heater, the food ingredients, and the style of cooking. We estimate the inclination of any axis on the cooking container is displaced by less than 60 degrees (in fact much, much less, or no inclination change at all in many applications), but in no case equal to or more than 90 degrees. Compared to our applications, the rolling cylinder used as a cooking container can change the inclination of an axis by 180 degrees, turning the axis upside down.

For the present patent application, the inclination angle of an axis is the angle between the axis and the horizontal plane. In the cooking apparatus 100A, 100B, 100C, 100D, 100E, 200A, 200, 300, 400, 401, 500, 600, 800, 800B, 900A, 900B, 1000B, 1000C, 1600E or 1700, the axis of the first rotational mechanism may be configured to be vertical, in which case the inclination angle of the axis is 90 degrees, or nearly vertical; although this is not a strict requirement. In the case when the axis of the first rotational mechanism has an inclination angle larger than 45 degrees, then the inclination angle of any axis of the cooking container is moved by less than 90 degrees. (An axis of a cooking container refers to an axis which passes through any two distinct points of the cooking container. If a cooking container moves, then an axis of the cooking container may also move.)

It should be further noted that in each of the cooking apparatus 100A, 100B, 100C, 100D, 100E, 200A, 200, 300, 400, 401, 500, 600, 800, 900, 900B, 700, 1600B and 1600E comprises a first rotational mechanism, wherein the second mating part of the first rotational mechanism is moved by a motion mechanism in a rotation around an axis which is different from the axis of the first rotational mechanism. The rotation of the second mating part of the first rotational mechanism by the motion mechanism is referred to as an eccentric rotation; as the axis of rotation of the motion mechanism is configured to be different from the axis of the first rotational mechanism. In some applications, the two axes are configured to be coplanar. It should be noted that the rotation of the second mating part of the first rotational mechanism in any of these apparatus is usually configured to be properly fast, with a frequency of more than a few hertz, for a duration of more than a few seconds each time. In particular, the second mating part of the first rotational mechanism may be rotated (around the axis of the motion mechanism) by an angle from 0 to a multiple of 360 degrees.

In any of the apparatus mentioned in the previous paragraph, it should be noted that the first rotational mechanism and the mechanical part of the motion mechanism may be configured so that a rotation, of any angle of any degrees, of the first mating part of the first rotational mechanism around the axis of rotation of the motion mechanism does not change an inclination angle of an axis of the cooking container by 90 degrees or more.

It should be noted that support component in the above disclosed automated cooking apparatus may be moved by a further motion mechanism, sometimes for purposes other than stirring, mixing, and distributing the food ingredients.

For the present patent application, the phrase "cooking apparatus" can mean an apparatus for cooking with a heat source (including but not limited to: frying, steaming, boiling, roasting etc.), an apparatus for mixing salad, or an apparatus for mixing cooked food. In case of mixing of salad or cooked food, or boiling noodle or dumplings, or steaming, the cooking container may be a container which may hold the salad or cooked food, or boiling noodle or dumplings, or the food or food ingredients which are steamed.

For the purpose of present patent application, a cooking container may be any container, of any shape, which can contain or otherwise hold food or food ingredients.

It should be noted that the connectors 191, 291, 391, 491, 691, 791, 891, 991, 1091, 1191, 1291, 1391, 1491, 1691, and 1791, etc., in above described cooking apparatus can be connected to a cooking container in different ways. For example, the container may be fixed to a said connector by some devices (e.g., clamps, screws, etc.), by a magnet, by bolts and nuts. A said connector may be formed by two or more pieces that are separately connected to the container. A said connector may be welded with a cooking container. A said connector may be made as a part of the cooking container. A said connector may be joined to the cooking container with some other component in the cooking apparatus.

A cooking container can have a different shape than pictured in the figures, and the motion mechanism or connection mechanism is not required be positioned at a height that is lower than a cooking container. This remark generally applies to many other cooking apparatus disclosed in the following.

In some embodiments, the cooking container is driven by a motion mechanism during cooking to move in pre-configured movements (e.g. oscillations, cyclic, etc.) that are capable of changing moving directions, of no less than 90 degrees (usually 180 or 360 degrees) in a fraction of a second or less. (In fact, the speed of change in moving directions may be substantially higher, depending on types of food ingredients, styles of cooking or other factors.) The frequent changes of moving directions accompany accelerations in the cooking container's motion. The friction between the internal surface of the accelerated cooking container and the non-accelerated food ingredients, and the internal forces exerted on the food ingredients by each other, together with gravitational or other forces, can cause the food ingredients to stir, turn, flip, mix, or jump.

In some embodiments, the motion of the cooking container may be configured to move on a cyclic path, or back and forth in a vibration, etc., with a high frequency. The movements of the cooking container with a high frequency and with relatively small amplitudes can replace the relatively less frequent and large amplitude stirring mechanisms using a spatula or like.

In some embodiments, the internal surface of the cooking container (or other type of container of food or food ingredients) may be further structured as to effectively obstruct the food ingredients in motion for the purpose of more robust stirring and mixing. The internal surface of the cooking container may be rugged, textured, bumped, or have one or more barriers built on or near it. Barriers may be constructed on the internal surfaces of cooking container. The barriers can have different shapes and dimensions and constructed at different positions in the container. The barriers in the cooking container can work in conjunction with the other features disclosed above in relation to FIGS. 1-40.

It should be noted that a bearing in the present patent application may be any type of bearing, including but not limited to: ball bearing, roller bearing or rolling-element bearing, plain bearing, bushing, journal bearing, sleeve bearing, rifle bearing, fluid bearing, magnetic bearing, flexure bearing, spherical bearing, and a hinge joint bearing.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made without deviating from the spirit of the present invention. For example, the term cooking container is used to generally refer to a device for containing or holding food or food ingredients during cooking. A cooking container can be a wok, cooking pot, cookware, cooking pan, a cooing basket, a cup, a jar, or a board, etc. can also be used to describe the cooking device. The cooking is also not limited to any particular ethnic styles such as stir fry or fry. In addition, the cooking container may be selected to best suit the types of food ingredients and style of cooking. A cooking container may comprise a barrier.

It should be noted that the cooking pan in the above described apparatuses may be substituted by other type of cooking container.

Furthermore, the movements of the cooking container or cooking container can have other configurations from the examples given above. For example, the radius of a rotational movement can vary depending on the types of food ingredients and style of cooking. Furthermore, the movements of any or all motors or mechanisms described above may be controlled by a programmed computer or controllers, according to the types of food.

For the present patent application, a food ingredient refers to any of the foods or substances that are combined to make a particular food. A food ingredient can be raw or pre-cooked. A food ingredient can be solid, powder, liquid, or a mixture, etc. Examples of food ingredient can be raw meat, sausage, fresh vegetable, dry vegetable, cooking oil, vinegar, soy source, water, or salt, etc.

It should be noted that in each cooking apparatus disclosed above, the first mating part of a kinematic mechanism is not the same object as the first mating part of another kinematic mechanism. Similarly, the second mating part of a kinematic mechanism is not the same object as the second mating part of another kinematic mechanism Thus, the first mating part of a second (or third) kinematic mechanism is not the same object as the first mating part of a first kinematic mechanism. The first mating part of a third kinematic mechanism is not the same object as the first mating part of a second kinematic mechanism. Similarly, the second mating part of a second (or third) kinematic mechanism is not the same object as the second mating part of a first kinematic mechanism. The second mating part of a third kinematic mechanism is not the same object as the second mating part of a second kinematic mechanism. These distinctions also apply to the claims.

What is claimed is:
1. An automated cooking apparatus, comprising:
  a cooking container configured to contain or hold food or food ingredients; and
  a stirring motion mechanism configured to produce a motion of the cooking container as to stir or mix the food or food ingredients held or container in the cooking container; said stirring motion mechanism comprising:

a first kinematic mechanism comprising a first mating part and a second mating part which is connected to the first mating part, wherein the movement of the second mating part relative to the first mating part is configured to be constrained;
a motion sub-mechanism comprising a support component and a motor,
wherein the motion sub-mechanism is configured to produce a movement of the second mating part of the first kinematic mechanism relative to the support component; and
a connection mechanism comprising a non-rigid connection configured to connect the first mating part of the first kinematic mechanism to said support component;
wherein the connection mechanism is configured to constrain, restrict, or limit the movement of the first mating part of the first kinematic mechanism relative to the support component;
wherein the cooking container is configured to be rigidly, fixedly, elastically, or otherwise connected to the first mating part of the first kinematic mechanism.

2. The automated cooking apparatus of claim 1, wherein the first mating part of the first kinematic mechanism is constrained to rotate relative to the second mating part of the kinematic mechanism.

3. The automated cooking apparatus of claim 1, wherein the motion sub-mechanism is configured to produce a rotation of the second mating part of the first kinematic mechanism relative to the support component.

4. The automated cooking apparatus of claim 1, wherein the motion sub-mechanism is configured to produce a linear motion of the second mating part of the first kinematic mechanism relative to the support component.

5. The automated cooking apparatus of claim 1, wherein the motion sub-mechanism is configured to move the second mating part of the first kinematic mechanism in an oscillatory movement or a combination of oscillatory motions.

6. The automated cooking apparatus of claim 1, wherein the connection mechanism comprises:
a second kinematic mechanism comprising a first mating part and a second mating part which is connected to the first mating part, wherein the motion of the first mating part is constrained relative to the second mating part; and
a connector configured to rigidly, elastically, fixedly, or otherwise connect the first mating part of the second kinematic mechanism, the first mating part of the first kinematic mechanism, and the cooking container;
wherein the second mating part of the second kinematic mechanism is configured to be connected to said support component.

7. The automated cooking apparatus of claim 6, further comprising a motion sub-mechanism configured to produce a movement of the second mating part of the second kinematic mechanism relative to the support component.

8. The automated cooking apparatus of claim 6, further comprising a transmission mechanism configured to link the motion of the second mating part of the second kinematic mechanism relative to the support component with the motion of the second mating part of the second kinematic mechanism relative to the support component.

9. The automated cooking apparatus of claim 6, wherein the motion of the first mating part of the second kinematic mechanism relative to the second mating part of the second kinematic mechanism is constrained to be a linear motion or sliding motion.

10. The automated cooking apparatus of claim 6, wherein the connection mechanism further comprises an elastic connector, a rope, a magnetic connector, a chain, another type of connector, or a combination thereof configured to connect the second mating part of the second kinematic mechanism to the support component.

11. The automated cooking apparatus of claim 6, where the connection mechanism further comprises:
a third kinematic mechanism comprising a first mating part and a second mating part, wherein the movement of said first mating part is constrained relative to said second mating part; and
a connector configured to connect the second mating part of the second kinematic mechanism to the first mating part of the third kinematic mechanism;
wherein the second mating part of the third kinematic mechanism is configured to be connected to said support component.

12. The automated cooking apparatus of claim 6, wherein the first mating part of the second kinematic mechanism is constrained to move linearly relative to the second mating part of the first kinematic mechanism.

13. The automated cooking apparatus of claim 1;
wherein the motion of the first mating part of the first kinematic mechanism relative to the second mating part of the first kinematic mechanism is constrained to be a rotation around an axis, henceforth referred to as a first axis;
wherein the motion of the second mating part of the first kinematic mechanism relative to the support component produced by the motion sub-mechanism is configured to be a rotation around an axis, henceforth referred to as a second axis;
wherein the connection mechanism comprises:
a second rotational mechanism comprising a first mating part and a second mating part which is connected to the first mating part, wherein the movement of the second mating part relative to the first mating part is constrained to be a rotation around an axis, henceforth referred to as a third axis;
a third rotational mechanism comprising a first mating part and a second mating part which is connected to the first mating part, wherein the movement of the second mating part relative to the first mating part is constrained to be a rotation around an axis, henceforth referred to as a fourth axis;
wherein the second mating part of the second rotational mechanism is configured to be connected to the first mating part of the third rotational mechanism;
wherein the second mating part of the third rotational mechanism is configured to be connected to said support component of the motion sub-mechanism.

14. The automated cooking apparatus of claim 13, wherein the first axis, the second axis, the third axis, and the fourth axis are configured to intersect at a same point, wherein the angle between the first axis and the second axis is not equal to the angle between the third axis and the fourth axis.

15. The automated cooking apparatus of claim 13, wherein the first axis, the second axis, the third axis, and the fourth axis are configured are configured to be parallel to each other, wherein the distance between the first axis and the second axis is less than or equal to the distance between the third axis and the fourth axis.

16. The automated cooking apparatus of claim 15, wherein the distance between the first axis and the second axis is equal to the distance between the third axis and the fourth axis, the automated cooking apparatus further comprising a transmission mechanism configured to link the rotation of the first mating part of the third kinematic mechanism relative to the second mating part of the third kinematic mechanism to the rotation of the motion sub-mechanism.

17. The automated cooking apparatus of claim 1, wherein the first mating part of the first kinematic mechanism is constrained to move linearly relative to the second mating part of the first kinematic mechanism.

18. An automated cooking apparatus, comprising:
a cooking container configured to contain or hold food or food ingredients; and
a stirring motion mechanism configured to produce a motion of the cooking container as to stir or mix the food or food ingredients held or container in the cooking container; said stirring motion mechanism comprising:
a support component;
a connection mechanism configured to connect the cooking container and the support component, said connection mechanism comprising:
a first kinematic mechanism comprising a first mating part and a second mating part which is connected to the first mating part, wherein the motion of the first mating part relative to the second mating part is constrained;
a second kinematic mechanism comprising a first mating part and a second mating part which is connected to the first mating part, wherein the motion of the first mating part relative to the second mating part is constrained; and
a connector configured to connect the first mating part of the first kinematic mechanism to the cooking container;
wherein the second mating part of the first kinematic mechanism is configured to be connected to the first mating part of the second kinematic mechanism;
wherein the second mating part of the second kinematic mechanism is configured to be connected to the support component; and
a powered mechanism comprising an electric, magnetic, hydraulic, or pneumatic component, said powered mechanism being configured to exert a force on said connector as to move said connector while the motion of said connector relative to the support component is constrained by the connection mechanism.

19. The automated cooking apparatus of claim 18, wherein the motion of the first mating part of the first kinematic mechanism relative to the second mating part of the first kinematic mechanism is constrained to be a rotation around an axis, wherein the motion of the first mating part of the second kinematic mechanism relative to the second mating part of the second kinematic mechanism is constrained to be a rotation around an axis.

20. An automated cooking apparatus, comprising:
a cooking container configured to contain or hold food or food ingredients; and
a stirring motion mechanism configured to produce a motion of the cooking container as to stir or mix the food or food ingredients held or container in the cooking container; said stirring motion mechanism comprising:
a first kinematic mechanism comprising a first mating part and a second mating part which is connected to the first mating part, wherein the movement of the second mating part relative to the first mating part is configured to be constrained;
a motion sub-mechanism comprising a support component, wherein the motion sub-mechanism is configured to produce a motion of the second mating part of the first kinematic mechanism relative to the support component; and
a connection mechanism comprising a non-rigid connector, a rope, a chain, a spring, a magnetic connector, an elastic connector or other connector, a kinematic pair, and/or a combination thereof, said connection mechanism being configured to connect the first mating part of the first kinematic mechanism;
wherein said connection mechanism is configured to constrain, restrain, or limit the movement of the second mating part of the first kinematic pair relative to the support component;
wherein the cooking container is configured to be rigidly, fixedly, elastically, or otherwise connected to the first mating part of the first kinematic mechanism.

* * * * *